(12) United States Patent
Rucker

(10) Patent No.: US 10,257,899 B2
(45) Date of Patent: Apr. 9, 2019

(54) AUTOMATICALLY RECONFIGURING LIGHT-EMITTING CIRCUIT

(71) Applicant: Liteideas, LLC, Mansfield Center, CT (US)

(72) Inventor: Paul D Rucker, Roanoke, VA (US)

(73) Assignee: LiteIdeas, LLC, Mansfield Center, CT (US)

( * ) Notice: Subject to any disclaimer, the term of this patent is extended or adjusted under 35 U.S.C. 154(b) by 0 days.

(21) Appl. No.: 15/637,642

(22) Filed: Jun. 29, 2017

(65) Prior Publication Data

US 2018/0007758 A1    Jan. 4, 2018

Related U.S. Application Data

(60) Provisional application No. 62/356,165, filed on Jun. 29, 2016.

(51) Int. Cl.
*H05B 33/08* (2006.01)

(52) U.S. Cl.
CPC ..... *H05B 33/0851* (2013.01); *H05B 33/0815* (2013.01)

(58) Field of Classification Search
None
See application file for complete search history.

(56) References Cited

U.S. PATENT DOCUMENTS

| | | | |
|---|---|---|---|
| 7,688,002 B2 | 3/2010 | Ashdown et al. | |
| 7,936,135 B2 | 5/2011 | Hum et al. | |
| 8,106,599 B2 | 1/2012 | Radermacher et al. | |
| 8,901,834 B2 * | 12/2014 | Frias, Sr. | H05B 37/02 315/192 |
| 9,055,641 B2 | 6/2015 | Shteynberg et al. | |
| 9,060,401 B2 | 6/2015 | Shteynberg et al. | |
| 9,161,404 B2 | 10/2015 | Wong et al. | |
| 2013/0200812 A1* | 8/2013 | Radermacher | H05B 33/0824 315/186 |
| 2013/0334976 A1* | 12/2013 | Lin | H05B 37/02 315/193 |
| 2015/0042234 A1* | 2/2015 | Lee | H05B 33/0824 315/193 |
| 2015/0257226 A1 | 9/2015 | Shteynberg et al. | |
| 2015/0296584 A1 | 10/2015 | Darras et al. | |

OTHER PUBLICATIONS

International Search Report and Opinion, International Application No. PCT/US2017/040057, dated Oct. 12, 2017.

* cited by examiner

*Primary Examiner* — Minh D A
*Assistant Examiner* — James H Cho
(74) *Attorney, Agent, or Firm* — Brake Hughes Bellermann LLP

(57) ABSTRACT

An automatically reconfiguring light-emitting circuit includes a first and second block of electric lights, a switching mechanism, the switching mechanism having (i) a first state in which the switching mechanism electrically connects the first block of electric lights in parallel with the second block of electric lights and (ii) a second state in which the switching mechanism electrically connects the first block of electric lights in series with the second block of electric lights, a current regulator that generates a current control signal in response to a current in the first group of lights and second group of lights, and a controller electrically connected to the switching mechanism, the controller configured to switch the switching mechanism between the first state and the second state based on the current control signal.

12 Claims, 35 Drawing Sheets

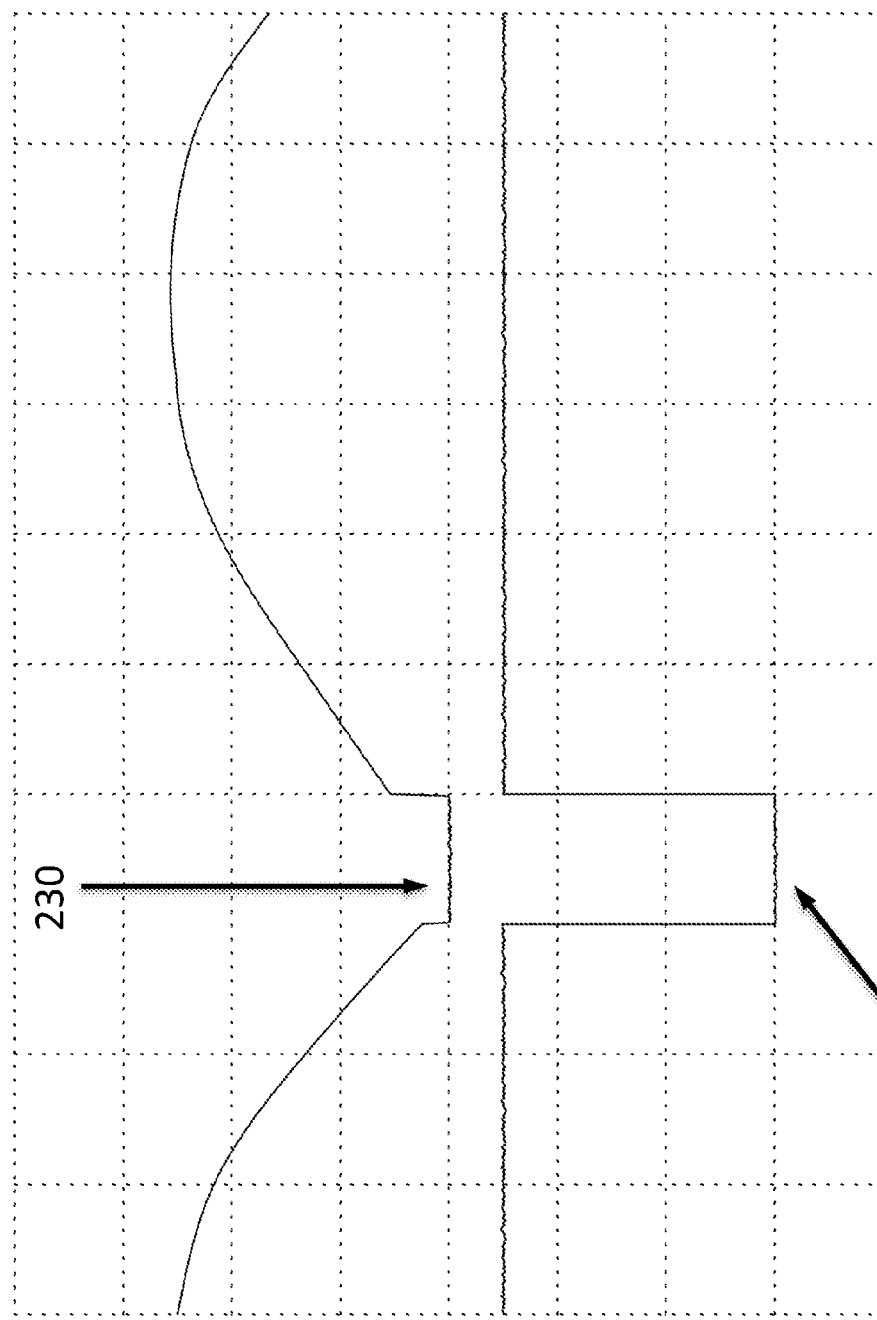

500

```
Sensing, by a Processor Coupled to a Modified Alternating
Current Line Having a Modified Alternating Current Signal, an
Off Time in the Modified Alternating Current Signal
501
                    ↓
Emitting, by the Processor, a Control Signal Based on the
Detected Off Time
502
```

FIG. 5

1100 

Receiving, by a Controller Connected to a Switching Mechanism Having a First State Connecting a First Block of Lights in Parallel with a Second Block of Lights and a Second State Connecting the First Block of Lights in Series with the Second Block of Lights, a Current Control Signal Generated by a Current Regulator in Response to a Current in the First Group of Lights and Second Group of Lights
1101

Switching, by the Controller, the Switching Mechanism Between the First State and the Second State Based on the Current Control Signal
1102

*FIG. 11A*

AUTOMATICALLY RECONFIGURING LIGHT-EMITTING CIRCUIT

TECHNICAL FIELD

The device and methods disclosed herein relate electrical lighting, and particularly to an automatically reconfiguring light-emitting circuit.

BACKGROUND ART

Semiconductor-based lighting such as that using light-emitting diodes (LEDs) has recently become popular because of its durability and efficiency. LED-based lighting can last thousands of hours longer even than fluorescent lighting, while consuming far fewer watts per lumen. However, LED lighting presents challenges of its own. LEDs have a minimum forward voltage that must be applied before the LEDs begin to emit light. When being driven by a sinusoidal voltage waveform, such as those typically available from alternating current line voltages, networks of LEDs can have gaps in light transmission at points in time when the voltage waveform drops below the total forward voltages of the meshes. This can create a noticeable vibration-like effect that some people find irritating, and reduce the overall light output of the LED-based lighting.

Thus, there remains a need for a lighting circuit and driver that can efficiently utilize a greater portion of a power signal having a varying voltage.

SUMMARY OF THE EMBODIMENTS

In one aspect, an automatically reconfiguring light-emitting circuit includes a first block of electric lights, a second block of electric lights, a switching mechanism, the switching mechanism includes a first state in which the switching mechanism electrically connects the first block of electric lights in parallel with the second block of electric lights and a second state in which the switching mechanism electrically connects the first block of electric lights in series with the second block of electric lights, a current regulator that generates a current control signal in response to a current in the first group of lights and second group of lights, and a controller electrically connected to the switching mechanism, the controller configured to switch the switching mechanism between the first state and the second state based on the current control signal.

In a related embodiment, the current regulator includes at least one power transistor through which the current in the first group of lights and second group of lights flows, the at least one power transistor having a control terminal, and the current control signal is a signal at the control terminal of the at least one power transistor.

According to other aspects of the present invention, the current regulator can further include at least one regulator transistor having an output terminal; and the current control signal is a signal generated at the output terminal of the at least one regulator transistor. The at least one current regulator further includes at least one operational amplifier incorporating the at least one regulator transistor. The circuit can further include a negative feedback network supplying negative feedback based on the current to the current regulator. The current regulator can be a current sink. The circuit can further include a control signal scaler.

A method for automatically reconfiguring light-emitting circuit is also disclosed. The method includes the steps of receiving, by a controller connected to a switching mechanism having a first state connecting a first block of lights in parallel with a second block of lights and a second state connecting the first block of lights in series with the second block of lights, a current control signal generated by a current regulator in response to a current in the first group of lights and second group of lights; and switching, by the controller, the switching mechanism between the first state and the second state based on the current control signal.

BRIEF DESCRIPTION OF THE DRAWINGS

The following detailed description of the disclosed device and method will be better understood when read in conjunction with the attached drawings. It should be understood that the invention is not limited to the precise arrangements and instrumentalities shown.

FIG. 2F is an oscilloscope display depicting an embodiment of a pulse-width modulated signal matched up with a corresponding rectified modified AC waveform as described herein;

FIG. 3I is a schematic diagram depicting an embodiment of a modified AC encoder as described herein;

FIG. 5 is a flow diagram illustrating a method for decoding a modified alternating current signal;

FIG. 11A is flow diagram illustrating a method for automatically reconfiguring a light-emitting circuit;

DETAILED DESCRIPTION OF SPECIFIC EMBODIMENTS

Embodiments of the disclosed smart dimming system provide a convenient and efficient way to dim high-efficiency lighting driven by an AC power source. In some embodiments, elements of the disclosed system can be incorporated in preexisting electrical networks within homes or businesses, controlling new fixtures using the newly installed system while permitting operation of legacy fixtures by previous means. Some embodiments of the system allow dimming of smart fixtures and full operation of other fixtures or appliances on the same circuit. Embodiments of the dimmable power source draw very little power for controls, increasing the efficiency of the system.

Figure 1A:
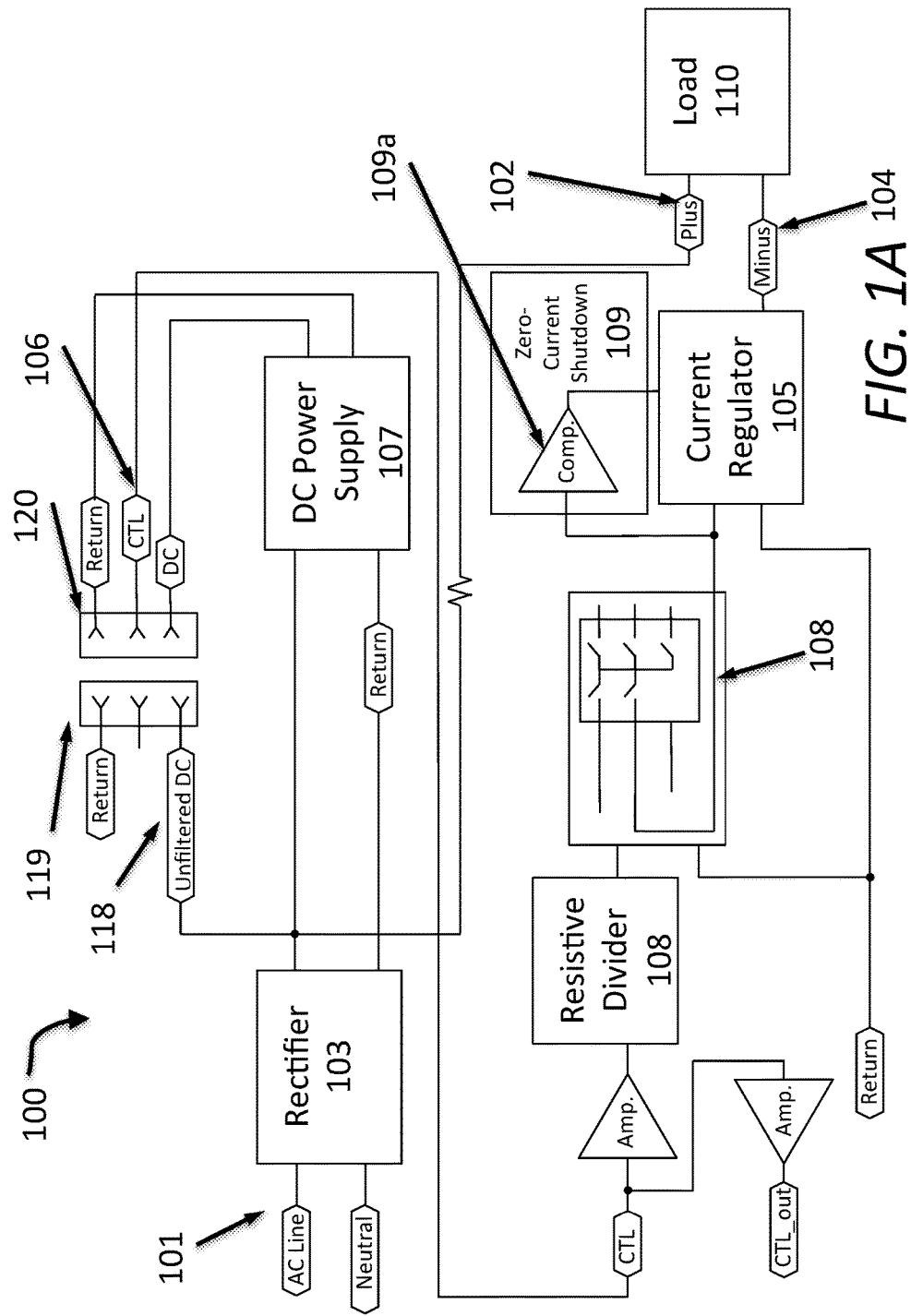
FIG. 1A is a block diagram depicting an embodiment of a driver as described herein.

FIG. 1A presents a block diagram of an embodiment of a driver 100 for high-efficiency lighting. The driver 100 has a power input 101 that receives AC power. The driver has supplies power to a load 110, with a first terminal 102 and a second terminal 104. The first output terminal 102 may be connected to the power input 101 by a rectifier 103, and provides rectified voltage from the power input 101. The second output terminal 104 provides a return path from the load 110 by way of at least one current regulator 105 that regulates current in response to commands received via a control input 106. In some embodiments, the driver 100 also includes a direct current power supply 107 that receives power from the rectifier 103; in some embodiments, the direct current power supply 107 provides the driver 100 with power to operate. The driver 100 may connect via the first output terminal 102 and the second output terminal 104 to the load 110.

The load 110 may include at least one electric light. The at least one electric light may include at least one electroluminescent light, such as an LED. The at least one electric light may include a plurality of electroluminescent lights; for instance, the at least one electric light may include a mesh of LEDs connected in series and in parallel by conductors. In some embodiments, the load is incorporated in an automatically reconfiguring light-emitting circuit as set forth in further detail below in reference to FIGS. 6-7B.

Figure 1B:
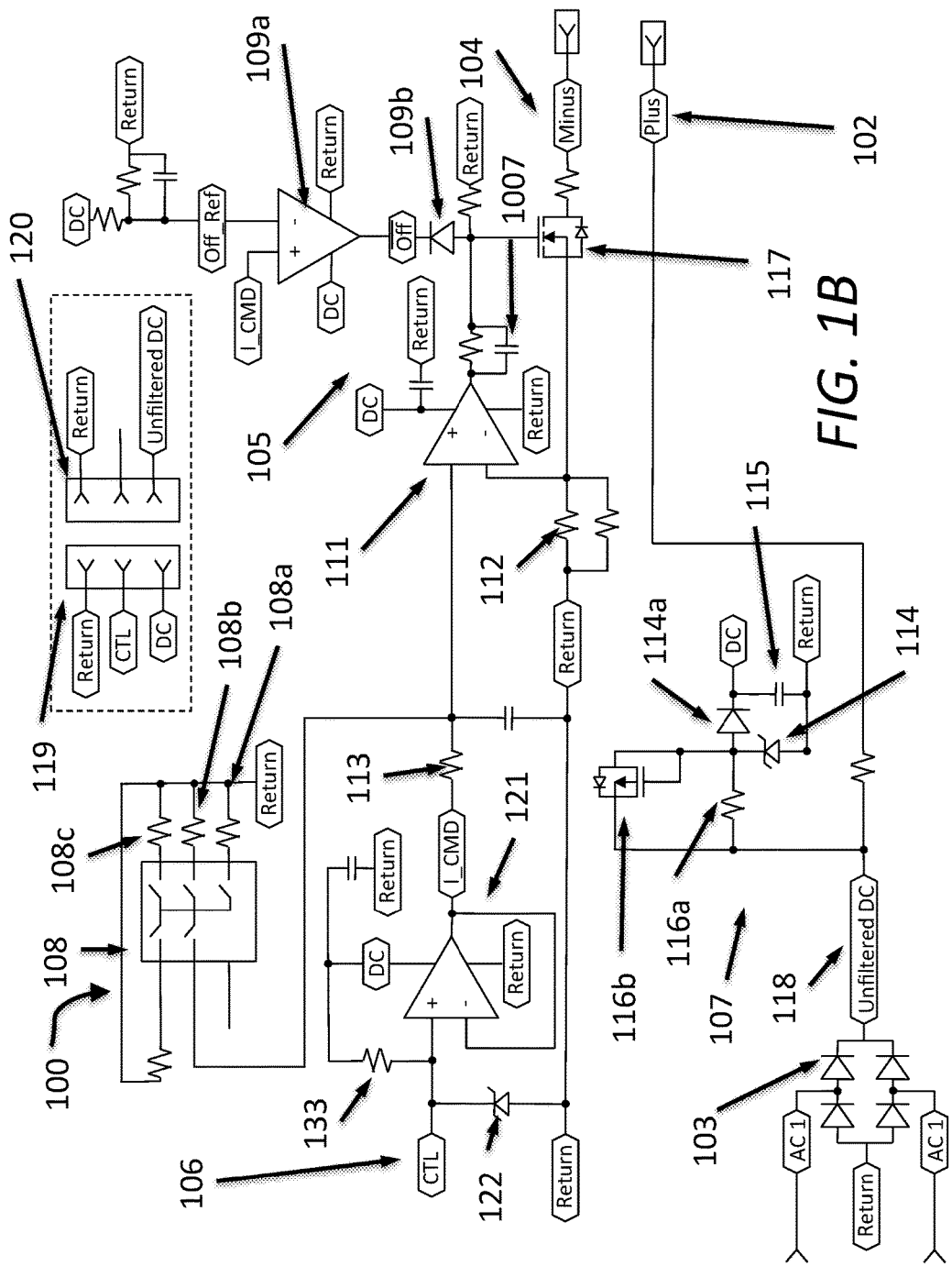
FIG. 1B is a schematic diagram depicting an embodiment of a driver circuit as described herein.

The rectifier 103 may be a full-wave rectifier. The rectifier 103 may be a bridge rectifier. In some embodiments, the rectifier 103 is a high-power rectifier; as an example, the rectifier 103 may have a maximum average rectified forward current of at least 1 Ampere. The rectifier 103 may have a maximum average rectified forward current of at least 1.5 A. The rectifier 103 may have a maximum non-repetitive peak forward surge current of at least 50 A. The rectifier 103 may have a maximum repetitive reverse voltage level of at least 1000 V. The rectifier 103 may have a maximum root-mean-square ("RMS") bridge input voltage of at least 700 V. The rectifier 103 may have a maximum DC reverse voltage of at least 1000 V. As a non-limiting example, as shown in FIG. 1B, the rectifier 103 may be an MB10S bridge rectifier as manufactured by Fairchild Semiconductor Corporation of San Jose, Calif., or a rectifier with similar properties. In some embodiments, the driver 100 includes a filter (not shown) to produce a substantially constant DC voltage output; the filter may restrict fluctuations in DC voltage to a particular range substantially less than the fluctuations present in the unfiltered output from the rectifier 103.

The control input 106 receives a control signal. In some embodiments, the control signal is a pulse width modulated signal. In other embodiments, the control signal is a voltage controlled signal; the voltage controlled signal may have a range of possible values between a minimum value and a maximum value. As a non-limiting example, the voltage control signal may be a 0-10 VDC signal. The minimum voltage of the voltage control signal may be ground voltage. The minimum voltage of the voltage control signal may be a virtual ground or reference voltage, such as the return voltage of the driver 100. The minimum voltage may be positive, negative or zero. The maximum voltage may likewise be positive, negative, or zero. Without limitation, the voltage control signal may range from 0 to 10, from 0 to −10, or any other range of voltages.

In some embodiments, the at least one current regulator 105 modifies the current flowing through the at least one current regulator 105 from the second output terminal 104 in response to the control signal. As illustrated in FIG. 1B, the at least one current regulator 105 may include a transistor 117 that modifies the current as determined by a voltage derived from the control signal. For example, the at least one current regulator 105 may apply a voltage based on the control signal at the base of the transistor 117 where the transistor 117 is a bipolar junction transistor. The at least one current regulator 105 may apply a voltage based on the control signal at the gate of the transistor 117 where the transistor 117 is a field-effect transistor. In some embodiments, the transistor 117 is a metal-oxide-semiconductor field-effect transistor ("MOSFET"). The transistor 117 may be a transistor capable of operating at high currents; for instance, the transistor 117 may be a MOSFET capable of a maximum continuous drain current of 6 A or more at an operating temperature of 25 degrees Celsius. The transistor 117 may be a MOSFET capable of a maximum continuous drain current of 3.8 A or more at an operating temperature of 100 degrees Celsius. The transistor 117 may be a MOSFET capable of a maximum pulsed drain current of 24 A. The transistor 117 may be a MOSFET capable of a maximum current during a repetitive or signal pulse avalanche of 2 A. The transistor 117 may be a MOSFET capable of sustaining a pulse having a single pulse avalanche energy of 88 millijoules. As a non-limiting example, the transistor 117 may be a STD7N80K5 MOSFET, as manufactured by ST Microelectronics, of Geneva, Switzerland.

The at least one current regulator 105 may include an operational amplifier 111. In some embodiments, the amplifier 111 has an output 111a supplying voltage based on the control signal to the control terminal of the transistor 111; the control terminal is the terminal of the transistor 117 used to regulate current through the transistor, such as the base of a bipolar junction transistor or the gate of a MOSFET. As an example, where the transistor 117 is a field-effect transistor, the amplifier output 111a may connect to the gate of the transistor 117. Where the transistor 117 is a bipolar junction transistor, the output 111a may connect to the base of the transistor 117. In some embodiments, the where the control signal is a voltage control signal, the control signal is applied to the non-inverting input 111a of the amplifier 111, resulting in a gain proportional to the control signal. The at least one current regulator may provide voltage based on the current returning from a load to the second output terminal 102, resulting in the amplifier 111 to produce the necessary output voltage to cause the transistor 117 to permit current to match the control voltage at the non-inverting input 111b. For instance, the input to the inverting terminal may be part of a loop including one or more resistors 112, such that the amplifier 111 produces an output that causes transistor 117 to produce a current which causes the voltage drop across the at least one resistor 112 to match the voltage at the non-inverting input. The at least one resistor 112 may be a plurality of parallel resistors. Continuing the example, in some embodiments, where the power supplied by the driver 100 is rectified, the operational amplifier creates whatever positive output it needs on the gate of the transistor 117 to make the current flowing through the at least one resistor 112 produce the same voltage as the voltage signal at the non-inverting input of the amplifier 111; assuming that a sufficiently high DC current can be drawn from the load, the voltage drop across the at least one resistor 112 may match the voltage at the non-inverting input of the amplifier 111.

Further continuing the example, in embodiments where the power supplied by the driver 100 is in the form of unfiltered rectified voltage, the voltage at the first output terminal 102 varies between 0 and the amplitude of the rectified voltage wave. The voltage at the transistor 117 may be the voltage at the first output terminal 102 minus the voltage drop across the load; for instance, where the load is a mesh of LEDs, the voltage drop is determined by the forward voltage of the LEDs. Further continuing the example, in some embodiments, the voltage coming into the transistor 117 thus varies from 0 to a value equal to the output voltage minus the voltage drop across the load, and the transistor 117, as modulated by the amplifier, acts as a variable resistor, limiting the current to values producing the requisite voltage drop across the at least one resistor 112. Where the voltage drops near to 0, the transistor 117 may switch all the way on; the current through the transistor 117 may nonetheless drop to 0 due to the lack of electric potential. As a result, the voltage across the resistors 112 over time may resemble a square wave, with a mostly constant voltage punctuated by periodic drops to zero. The resulting current through the transistor 117, and thus power to the load may appear to be constant to a user, because of the rapidity of the oscillation and the relative brevity of the moments with zero voltage. In some embodiments, in the absence of a control signal, the transistor 117 conducts at full power; in some embodiments, this is because a resistor 133 located at the control signal input 106 is connected to the power source 107, creating a DC signal in the absence of a control signal.

In some embodiments, the at least one current regulator 105 includes a capacitor 1007 in parallel with the resistor supplying voltage to the control terminal of the at least one transistor 117. The capacitor 1007 may act to reduce sudden changes in the current provided by the at least one transistor 117. For instance, when the AC waveform voltage increases enough for the load 110 to begin conducting, the transistor 117 may be completely on, and the current initially allowed by the transistor 117 may be relatively high, and the operational amplifier 111 may not be able to modify its gain in response to the negative feedback network quickly enough to avoid a spike in the current through the transistor 117; the capacitor 1007 may act to bring down the voltage provided to the control terminal of the at least one transistor 117, reducing the resultant spike in current. The capacitor and resistor may be selected to reduce the current spike to produce a light output to a given standard regarding flicker or other changes in light output that are visible to the user.

In some embodiments, as shown in FIG. 1A, the driver 100 includes a zero-current shutdown 109 that causes the current flowing through the at least one current regulator 105 to drop to zero. In some embodiments, where the control signal is a voltage control signal, the zero-current shutdown 109 switches off the current through the at least one current regulator 105 when the control signal drops down to within a few tens of millivolts of zero. In some embodiments, the zero-current shutdown 109 includes a comparator 109a that looks at the voltage of the control signal input, compares it to a reference voltage, and causes the at least one current regulator 105 to shut off all power to the load 110 upon the control signal voltage dropping below the reference voltage; the reference voltage may be within a few millivolts of zero. As illustrated in FIG. 1B, the comparator 109a may output sufficient voltage to reverse-bias a switching diode 109b as long as the control signal is above the reference voltage, preventing conduction through the switching diode 109b; when the control signal falls below the reference voltage, the comparator output may switch to the return voltage, forward-biasing the switching diode 109b, and causing the voltage supplied to the gate or base of the transistor 117 to drop to near zero, shutting off current to the load 110.

Figure 1C:
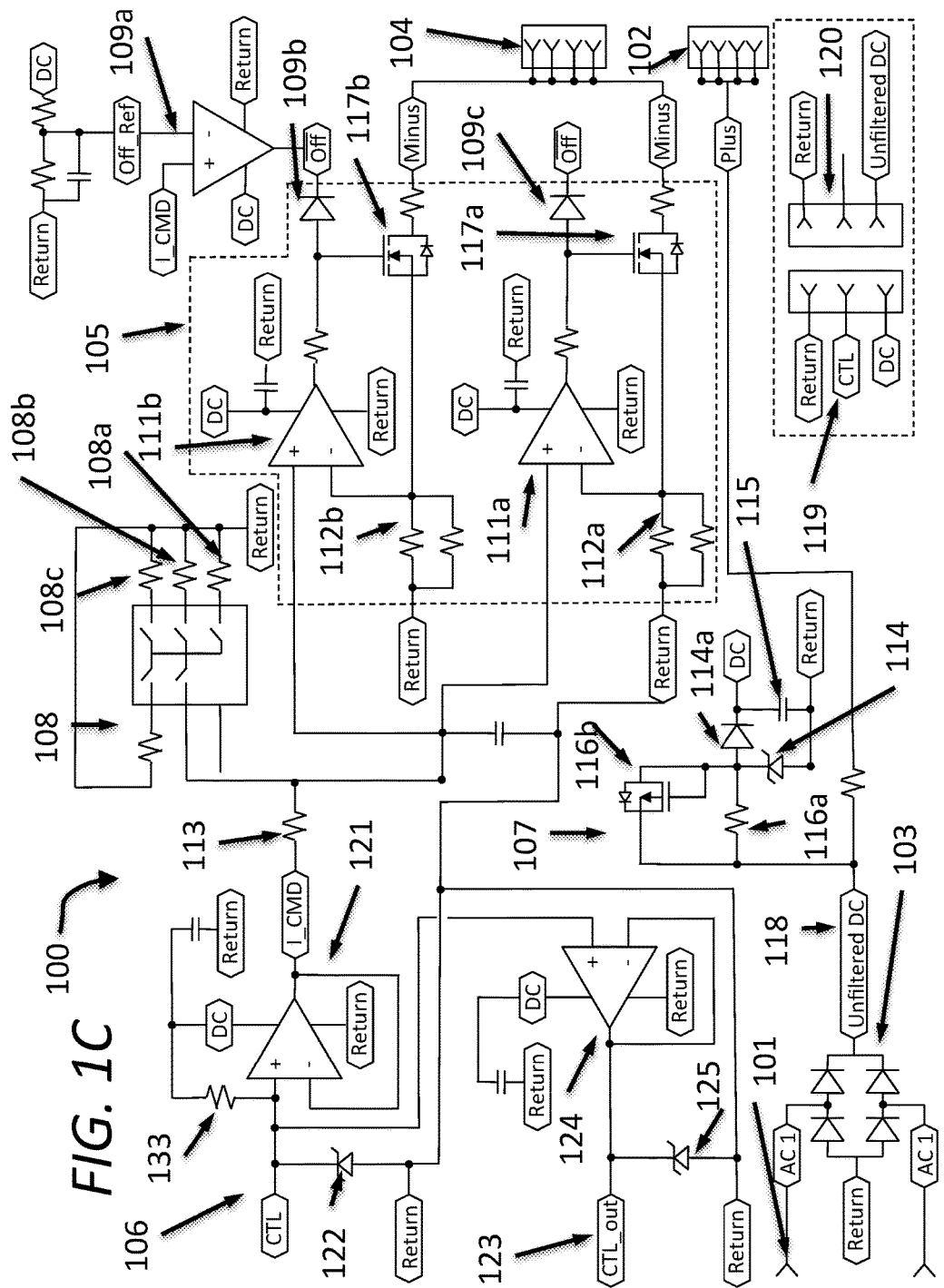
FIG. 1C is a schematic diagram depicting an embodiment of a driver circuit as described herein.

In some embodiments, as shown in FIG. 1C, the at least one current regulator 105 includes a plurality of current regulators 105. For instance, the circuit of the driver 100 may branch to include a first current regulator 105a and a second current regulator 105b. The impedance of the first current regulator 105a may be substantially equal to the impedance of the second current regulator 105b, so that the control signal is distributed equally to each regulator. In some embodiments, the first current regulator 105a has a first transistor 117a that regulates the current as directed by an input voltage based on the divided control signal at its base or gate. The first transistor 117a may be any transistor suitable for use as the transistor 117 described above in reference to FIG. 1B. The first current regulator 105a may have an operational amplifier 111a supplying voltage based on the divided control signal to the base or gate of the first transistor 117a; the operational amplifier 111a may function in the same way as the operational amplifier 111 described above in connection with FIG. 1B. The operational amplifier 111a may use negative feedback supplied to its inverting terminal, such that the operational amplifier compares the voltage drop across at least one resistor 112a due to the current through the at least one resistor 112a as supplied by the transistor 117a, as described above in reference to FIG. 1B; the resistance of the at least one resistor 112a may be less than the resistance of the at least one resistor 112 to match the divided control signal. As an example, where the at least one resistor 112 in the current regulator 105 receiving an undivided control signal is 10Ω, the at least one resistor 112a in the current regulator 105a receiving a divided control signal may be 3.9Ω.

The second current regulator 105b may have a second transistor 117b; the second transistor 117b may be as described above in reference to the first transistor 117a. The second current regulator 105b may have a second amplifier 111b, which may function in the same way as the first amplifier 111a; the second amplifier 111b may use negative feedback to match the voltage across a second at least one resistor 112b based on the current from the second transistor 117b to the divided control signal, as described above in reference to the first current regulator 105a.

Figure 7A:
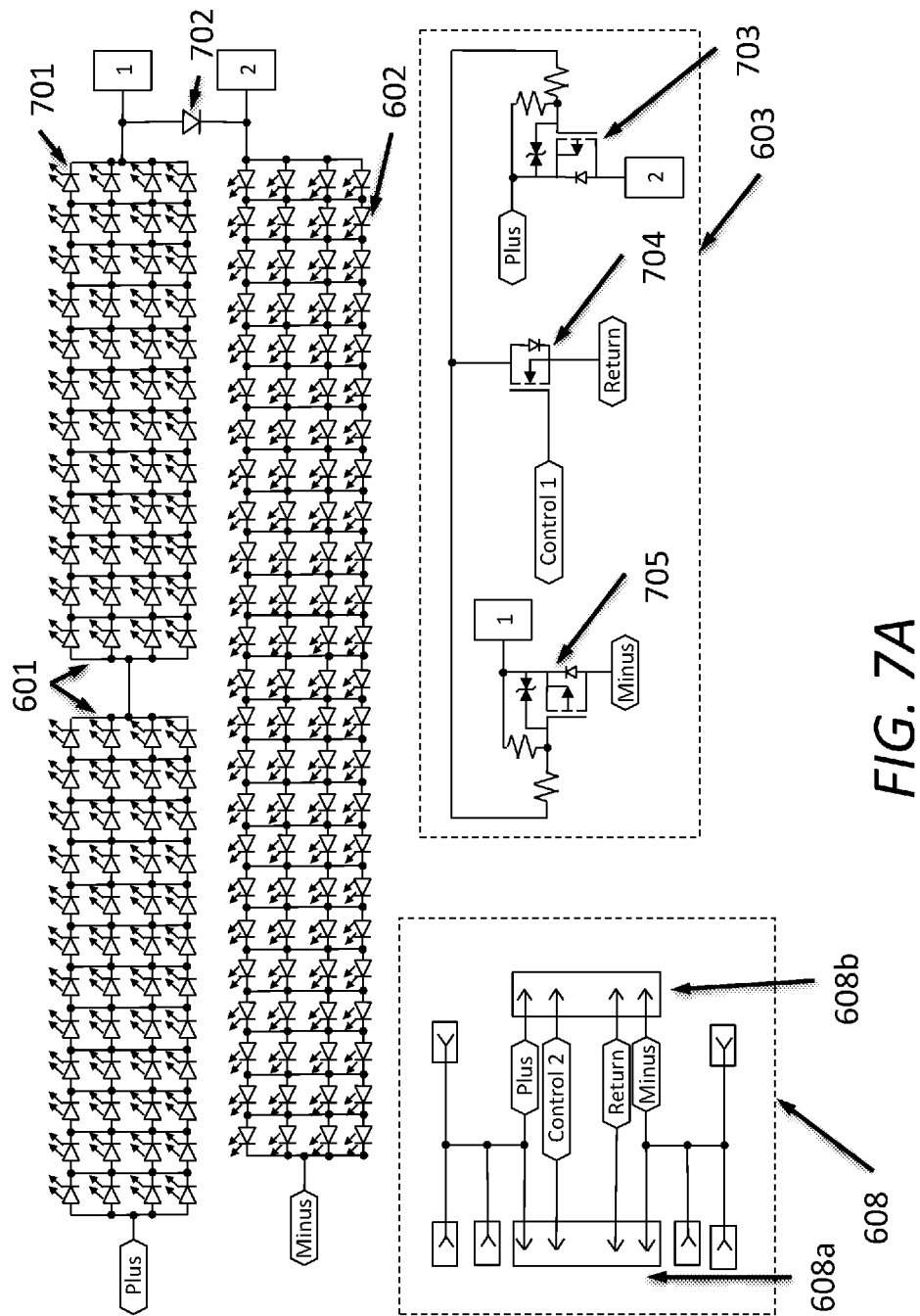
FIG. 7A is a schematic diagram illustrating part of an embodiment of an automatically reconfiguring light-emitting circuit.

In some embodiments, the zero-current shutoff 109 also branches to both current regulators 105a-b; for instance, the comparator 109a may have sufficient voltage to reverse-bias a first switching diode 109b connected to the path from the first amplifier 111a to the first transistor 117a, and to reverse-bias a second switching diode 109c connected to the path from the second amplifier 111b to the second transistor 117b while the control signal is greater than a reference voltage, as described above in connection with FIG. 1B. The comparator 109a may supply return voltage to both switching diodes 109b-c when the control signal falls below the reference voltage, forward biasing both switching diodes 109b-c and causing the voltage at the base or gate of each of the first transistor 117a and second transistor 117b to drop to near zero, shutting off current through the first transistor 117a and second transistor 117b. In other embodiments, as shown in FIG. 7C, the two switching diodes 109b-c are replaced with a dual switching diode 109d connecting the zero-current shutoff both amplifiers 111a-b.

In some embodiments, the use of a plurality of current regulators 105 for load-balancing permits the driver 100 to supply a greater quantity of power to the load 110, by sharing the current substantially equally among the plurality of current regulators 105. The driver 110 may provide multiple first output terminals 102 and multiple second output terminals 104, allowing the driver 100 to drive several loads (not shown) simultaneously; for instance, the driver 100 may have four first output terminals 102 and four second output terminals 104. The load 110 or loads may be configured to take advantage of the load-balancing properties provided by a plurality of current regulators 105a; for instance, where the load 110 is an LED mesh, the load 110 may be made up of two or more separate circuits, each connected to a different first output terminal 102 and second output terminal 104; as result, a failure of one circuit in the LED mesh may not compromise a second circuit in the LED mesh, permitting the mesh to continue emitting light.

In some embodiments, the load 110 or loads and driver 100 are configured such that the load or loads typically run at a fraction, such as 60%, of the maximum rated power of the components of the load or loads. Thus, power surges through the driver 100 to the load 110 or loads may be absorbed by the load or loads themselves, using the excess power consumption available in the load 110 or loads. In some embodiments, the failure of a component of the load or loads causes more power to be diverted to the remaining components of the load or loads. For instance, where an LED in a mesh fails, ending conduction through that LED, power through each LED or set of LEDs in parallel with the failed LED increases as a result; unlike in conventional LED meshes which run at or near the maximum power rating for each LED, the other LEDs in the mesh may absorb the additional current, increasing their power consumption to a higher, but still manageable, rate without failing as well. As a result, the load or loads may not suffer cascading component failures when a single component fails, resulting in negligible performance loss from isolated failures, and a greater useable lifetime for the load or loads. In some embodiments, the load or loads combine the use of multiple circuits driven by the multiple output terminals 102, 104 with driving at power below the maximum ratings to provide multiple categories of robustness; the failure of any single circuit due to a single component failure is reduced by the use of fractional power consumption, and the failure of an entire circuit in the load or loads does not prevent the remaining circuits or circuit from operating normally.

In some embodiments where the control signal is a voltage control signal, as shown in FIG. 1A, the driver 100 includes a resistive divider switch 108. The resistive divider switch 108 places a voltage divider between the control signal input 106 and the at least one current regulator 105. In some embodiments, the resistive divider 108 has the effect of reducing the voltage of the voltage control signal provided to the at least one current regulator 105 based on the resistance of the resistive divider switch 108; the resistive divider switch 108 may have a selectable resistance, permitting the use of the resistive divider switch 108 to a power output level for the at least one current regulator 105 using the resistance of the resistive divider switch 108. In some embodiments, the resistive divider switch 108 draws negligible current. As a non-limiting example, the resistive divider switch 108 may permit the selection of a value causing the at least one current regulator 105 to produce 100% power by the inclusion of a first resistor 108a in the resister divider switch 108 circuit; for instance, where a series resistor 113 has a resistance of 909 KΩ and the first resistor 108a has a resistance of 100 KΩ the voltage provided to the at least one current regulator 105 may be approximately 100% of the voltage control signal voltage, and the at least one current regulator 105 may be calibrated to provide full power when the control signal provided to the at least one current regulator 105 is 1 V. Likewise, the resistive divider switch 108 may permit the selection of 75% power by inclusion of a second resistor 108b in the resister divider switch 108 circuit, of 50% power by inclusion of a third resistor 108c in the resistor divider switch 108 circuit, or of 25% power by including a fourth resistor 108d. The driver 100 may include a manual switch (not shown) permitting a user to select the resistance of the resistive divider switch 108. For instance, the user may be able to turn a knob, such as a 4-position rotary switch, between positions indicating 100% power, 75% power, 50% power, and 25% power. The resistors in the resistive divider switch 108 may be chosen to produce any percentage output desired. In some embodiments, the resistors are replaced with a potentiometer or similar device having adjustable resistance to allow continuous adjustment of the power level. In still other embodiments, the resistive divider switch is replaced with a single resistor, making a fixed resistive divider, leaving current regulation entirely to the control signal.

In some embodiments, as shown in FIGS. 1A-C, the driver 100 includes a power supply 107 that provides DC power to the driver 100. The power supply 107 may provide DC power to other components connected to the driver 100, such as an adapter 200 or signal receiver 300 as described in further detail below in connection with FIGS. 3A-3H. The power supply 107 may draw rectified voltage from the rectifier 103. In some embodiments, as shown in FIG. 1B, the power supply 107 includes a transient voltage suppressor 114; the transient voltage suppressor 114 may clamp the voltage provided by the power supply 107 at a desired constant value. For instance, the transient voltage suppressor 114 may limit the voltage across it at about 11 volts, DC. In some embodiments, the transient voltage suppressor 114 is an SMF9.0A produced by Littlefuse, Inc. of Chicago, Ill., or a transient voltage suppressor with similar properties. In other embodiments, the transient voltage suppressor 114 is a Zener diode. The transient voltage suppressor 114 may be any circuit element or set of circuit elements that acts to regulate voltage. The transient voltage suppressor 114 may also protect circuits using the power supply 107 from power surges. In some embodiments, the power supply 107 includes a capacitor 115 to filter the voltage signal and set a constant value; the constant voltage may be 10 V DC. In some embodiments, the power supply 107 includes a diode 114a to further reduce the voltage to the required steady value. The power supply 107 may include a resistor 116a; the resistor 116a may act to limit the current through the power supply 107, so that the power supply 116a can provide substantially constant current over varied voltage inputs. In other embodiments, the power supply 107 includes a depletion-mode MOSFET 116b or similar transistor wired to provide an Idss of 1-2 mA; the depletion-mode MOSFET 116b may enable the power supply 107 to provide a constant current regardless of input voltage, to supply all of the current needed by components using the power supply 107. Although the resistor 116a and the depletion-mode MOSFET 116b are shown in parallel in FIGS. 1B-1C, in some embodiments the power supply 107 includes the MOSFET 116b without the resistor 116a or the path containing the resistor 116a. Likewise, in some embodiments, the power supply 107 includes the resistor 116a but does not include the MOSFET 116b or the path containing the MOSFET 116b.

In some embodiments, the power supply 107 includes a power regulator 720 as illustrated in FIG. 7C. The power regulator 720 may reduce the voltage output by the power supply 107 to a lower constant voltage; for instance, the power regulator 720 may reduce a voltage of approximately 10 volts to a voltage of approximately 5 volts at its output. In some embodiments, the power supply 107 has a first output at a first voltage level and a second output at a second voltage level; for instance, the second output may be the output of a power regulator 720. The two outputs may correspond to DC voltage levels needed for two or more different components, such as an operational amplifier that requires ten volts DC and a microcontroller that requires 5 volts DC as a power supply.

In some embodiments, the driver 100 has an unfiltered DC output terminal 118, which enables the driver 100 to provide the voltage from the rectifier 103 to an additional device, such as the modified AC decoder 200 described below in connection with FIGS. 2A-2F. In some embodiments, the driver 100 includes one or more of its various input or output terminals into headers that can plug into another device. As a non-limiting example, the control signal input, return wire, and power output from the power supply 107 may be supplied to one three-pin header 119, and the unfiltered DC from the rectifier 103 and a return may be supplied to two pins of a second three-pin header 120; without limitation, the first three-pin header 119 may be a 91614-303G header, as manufactured by FCI Americas Technology, LLC of Carson City, Nev., and the second three-pin header may be a 91614-303G header; the header may be a similar product.

In some embodiments, the driver 100 the control signal input 106 connects to the input to a voltage follower 121. The voltage follower 121 may ensure that the driver 100 does not reduce the voltage of the control signal to any non-negligible degree, by presenting an extremely high input impedance to the control signal, while drawing the necessary current to maintain a signal to the at least one control circuit 105 that matches the voltage of the control signal. The input to the voltage follower may include a parallel transient voltage suppressor 122. In some embodiments, the transient voltage suppressor 122 has a minimum clamping voltage of 19.1 V, a maximum clamping voltage of 25 V, and a peak power dissipation of 300 W; the transient voltage suppressor may be a T12S5, produced by Diodes, Incorporated of Dallas, Tex., or a similar device. The control signal input may be a separate port from the headers; in other embodiments, the headers supply the only control signal input.

In some embodiments, the driver 100 also includes a control signal output port 123 that relays the control signal from the control signal input 106; in some embodiments, the output terminal 123 receives the control signal by connecting between the input port 106 and the voltage follower 121. The driver 100 may include a second voltage follower 124 whose output goes to the output port 123; the second voltage follower 124 may ensure that the necessary current is supplied, for instance from the power source 107 to maintain the voltage level of the control signal, while presenting the driver circuit 100 with a high input impedance so that the control signal to the voltage follower 121 is not reduced. The output port 123 may have a parallel transient voltage suppressor 125; the transient voltage suppressor 125 may be as described above for a transient voltage suppressor 122. In other embodiments, there is no control signal output port 123.

The control signal output port 123 may permit a second device capable of receiving a control signal to receive the control signal from the driver 100a. The second device may be a second driver 100b; the second driver 100b may be constructed as disclosed above for a driver 100 in connection with FIGS. 1A-1D. In some embodiments, the control signal output port 123 is wired directly to the control input 106b of the second driver 100b. In other embodiments, the control signal output port 123 of the first driver 100a connects to the control signal input 106b of the second driver 100b by way of an adapter 126. As illustrated in FIG. 1F, the adapter 126 may have an input port 127 that receives a control signal, and an output port 128 that outputs a control signal. In some embodiments, the adapter 126 has a voltage follower 129 that receives the control signal from the input port 127 and outputs a control signal to the output port 128; in some embodiments, the voltage follower 129 ensures that the adapter 126 has an extremely high input impedance, ensuring that the control signal received is unchanged by the adapter 126, while supplying the current necessary to maintain a substantially identical control signal to the output port 128 as required by the device receiving the signal from the output port 128. Where the adapter 126 is connected to the second driver 100b, the adapter 126 may draw power from the power supply 107 of the second driver 100b via a power supply input. In some embodiments, the adapter 126 has a transient voltage suppressor 130a across its input port 127. The adapter 126 may have a transient voltage suppressor 130b across its output port 128. Each of the transient voltage suppressors 130a-b may be as described above for a transient voltage suppressor 122 in reference to FIGS. 1B-1D. In some embodiments, some of the inputs and outputs of the adapter 126 are provided as headers; the headers may be adapted to connect to corresponding headers of the driver 100b. For instance, the adapter 126 may have a first three-pin header 131 having a return on the first pin, a control signal output on the second pin, and a power supply input on the third pin. The adapter 126 may have a second three-pin header 132 having a return to on the first pin and an unfiltered DC input on the second pin; the unfiltered DC input may not connect to anything in the adapter 126. The headers 131, 132 may be adapted to connect to the headers 119, 120 of the driver 100b; for instance, where the headers 119, 120 of the driver 100b are 91614-303 female headers as described above in connection with FIGS. 1A-1D, the headers 131, 132 of the adapter 126 may be 95293-101-03G headers, as manufactured by FCI Americas Technology, LLC of Carson City, Nev. In some embodiments, the control signals are very low power and may be conveyed using small-gauge wires. The connection between one driver and another may include isolation circuitry (not shown) that isolates the control signal from the power circuitry at each driver.

The driver 100a may receive the control signal from any device capable of outputting a control signal. The driver 100a may receive the control signal from a second driver. The driver 100a may receive the control signal by means of an adapter 126. In some embodiments, the driver 100a receives the control signal from a wireless receiver (not shown) that translates a wireless signal into a control output; the wireless receiver may be a digital receiver. In some embodiments, a user can transmit power level command wirelessly to the wireless receiver using a wireless transmitter (not shown); for instance, wireless receiver may be configured to receive a near-field communication signal from a mobile device, such as a smartphone, configured to send such a signal, and to translate the received signal into a control signal. A mobile application running on a mobile device may permit a user to interact with a user interface. The user interface may enable the user to select a power level for the driver 100a from a list of power levels, such as a drop-down list. In some embodiments, the driver 100a receives the control signal only from the modified AC decoder 200 as described below in connection with FIGS. 2A-2F. In other embodiments, the driver 100a may receive a control signal input from a circuit (not shown) that contains electronics to isolate the circuit from the driver 100a while the circuit generates the control signal.

In some embodiments, the driver 100a receives the control signal from a modified AC decoder 200. FIG. 2A illustrates one embodiment of a modified AC decoder 200. FIG. 2B is a schematic diagram of the circuit in an embodiment of a modified AC decoder 200. In some embodiments, the modified AC decoder 200 decodes a modified AC Line signal pattern to extract a control signal command for dimming control of the driver 100. In some embodiments, the modified AC decoder 200 receives the modified AC line signal pattern as an unfiltered rectified DC voltage signal from a driver 100 as described above in reference to FIGS. 1A-1F. The modified AC decoder 200 may operate by detecting a length of time, referred to herein as the "off time," during which the voltage of the AC voltage waveform is substantially equal to zero and interpreting that length of time and converting into a control signal. The off time may occur at or near the zero-crossing point of each half-cycle in the modified AC voltage waveform. The off time may be substantially centered about the zero-crossing point of the AC waveform; in other words, the portion of the off time preceding the zero-crossing point may be substantially equal to the portion of the off time following the zero-crossing point. In other embodiments, the portion of the off time preceding the zero-crossing point is slightly shorter or longer than the portion of the off time immediately following the zero-crossing point. The modified AC voltage waveform may be modified from a conventional sinusoidal waveform to a wave form that switches to 0 V for a certain amount of time before and after each zero-intercept in the sinusoidal waveform; the length of time the wave form is at 0 volts may be set by a modified AC encoder 300 as set forth in further detail below in connection with FIGS. 3A-3H.

In some embodiments, the modified AC decoder 200 includes a processor 201 that measures the length of the off time and translates that length into a pulse width modulated signal; the pulse width modulated signal may be constant-on "logic 1" signal when the off time length is of a value indicative of a control signal (e.g. the maximum command possible in a voltage control signal). The processor 201 may be any processor suitable for performing the algorithm described in reference to FIGS. 2A-2F, using the circuit elements described in reference to FIGS. 2A-2F. As a non-limiting example, the processor 201 may be a microprocessor. The processor 201 may be a microcontroller. The processor 201 may be a central processing unit (CPU). The processor 201 may be a neural net. The processor 201 may be any other kind of processor used in computing devices, including, for instance, a graphical processing unit (GPU). As a non-limiting example, the processor 201 may be a PIC12F1822 microprocessor, as manufactured by Microchip Technology, Inc., of Chandler, Ariz., or a similar product.

Figure 2A:
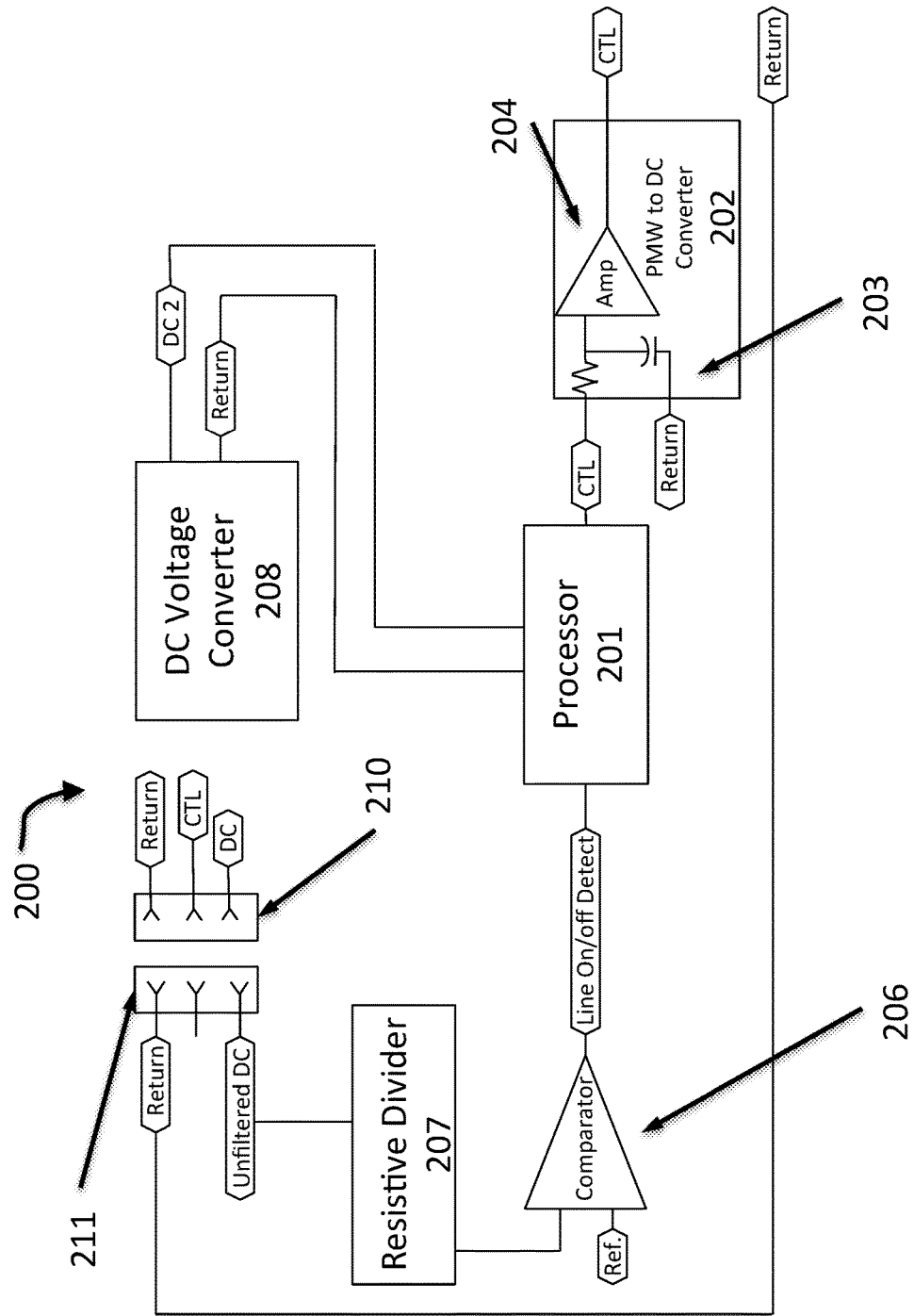
FIG. 2A is a block diagram depicting an embodiment of a modified AC decoder as described herein.
Figure 2B:
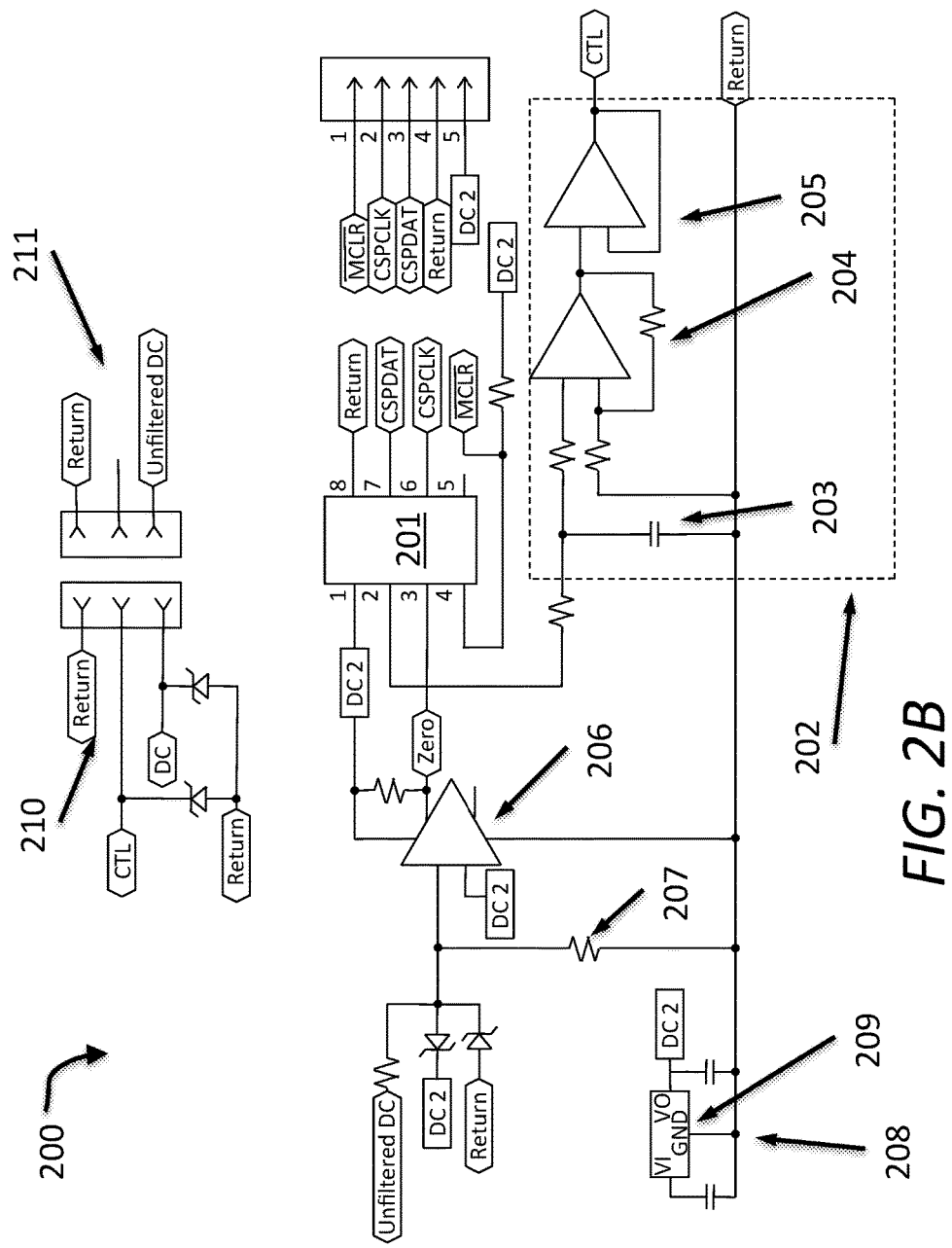
FIG. 2B is a schematic diagram depicting an embodiment of a modified AC decoder as described herein.
Figure 2C:
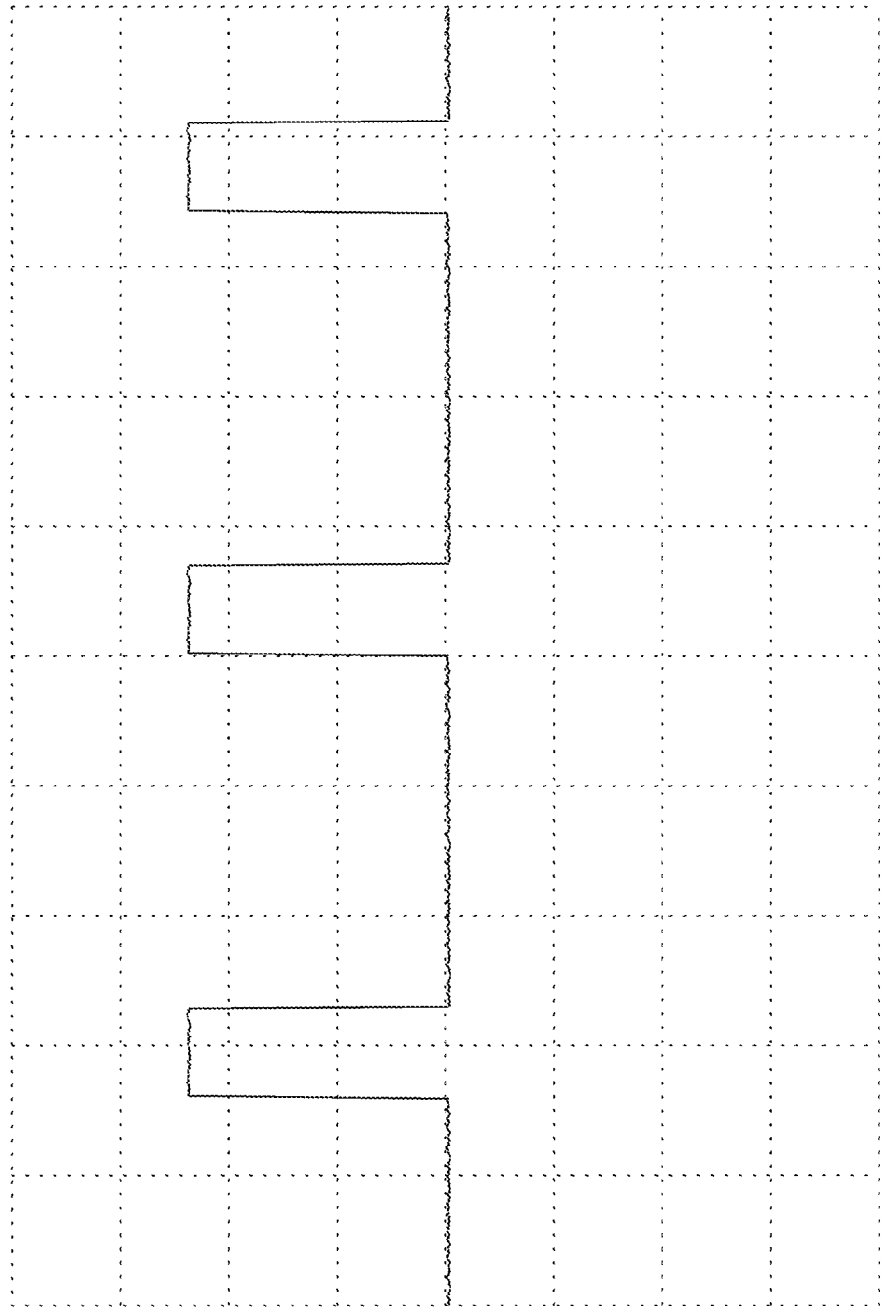
FIG. 2C is an oscilloscope display depicting an embodiment of a pulse-width modulated signal as described herein.
Figure 2D:
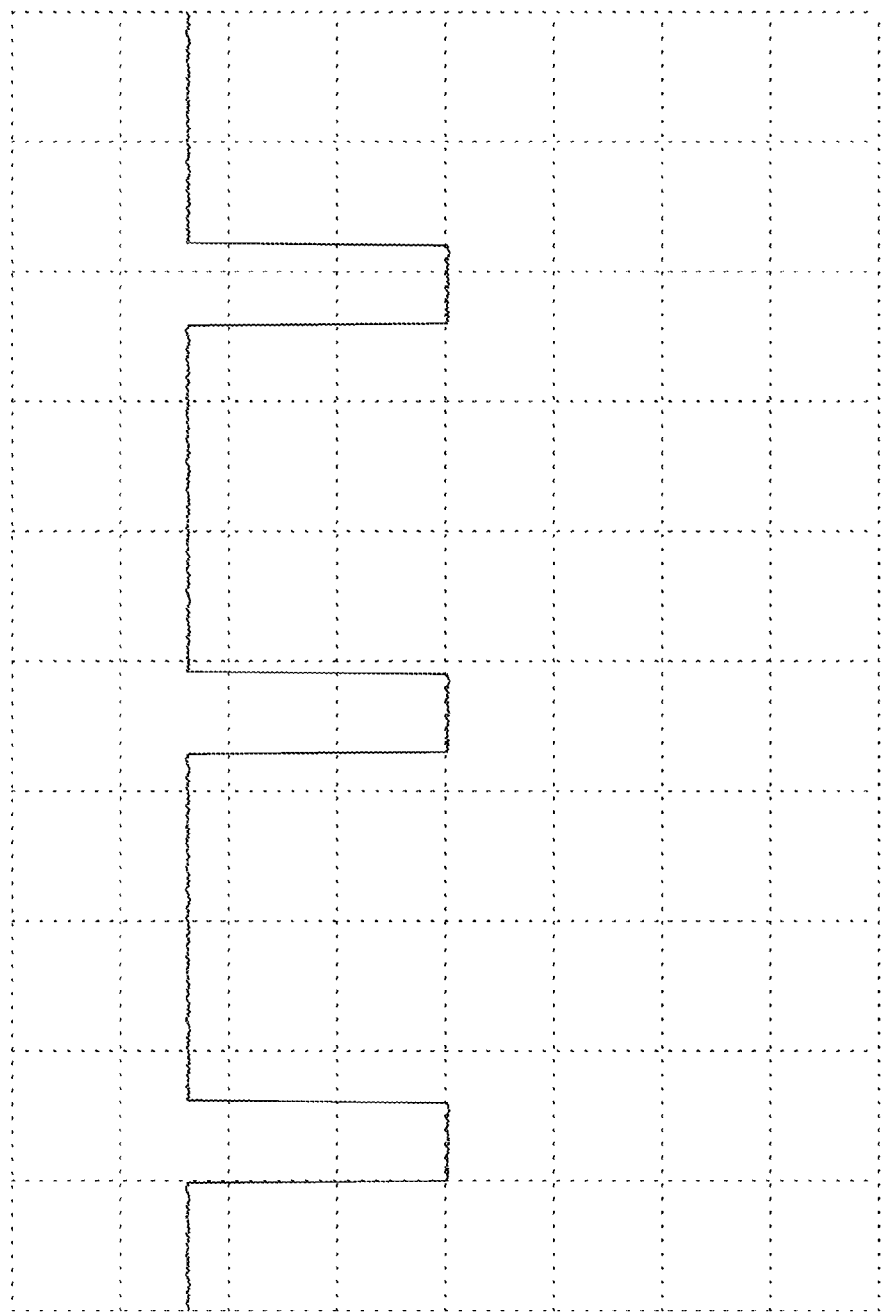
FIG. 2D is an oscilloscope display depicting an embodiment of a pulse-width modulated signal as described herein.

In some embodiments, the control signal output by the processor is a pulse width modulated signal. FIG. 2C shows the pulse width modulated output from the processor 201 associated with an off time corresponding to one control signal. FIG. 2D shows the pulse width modulated output from the processor 201 associated with another off time corresponding to another control signal. The pulse width modulated signal may correspond to a voltage control signal to which the pulse width modulated signal will be converted, for instance produced by a PMW to DC converter 202 as described below, as set forth in further detail below. As a non-limiting example, in some embodiments, when the processor 201 detects an off time of 1 millisecond it produces an output that results in a maximal voltage control signal (e.g. a signal of 10 VDC in a 0-10 VDC control signal); in some embodiments, when the processor 201 detects an off time of 2 milliseconds, the processor produces an output that results in a minimal signal, such as 0-VDC signal, or in a signal close to 0 VDC, in a 0-10 VDC signal range. Continuing the example, intermediate off time lengths between 1 and 2 milliseconds may correspond to voltage control output having an intermediate value between the minimum and maximum voltage levels; in some embodiments, the control signal output varies as a substantially linear function of the off time. The processor may receive a signal having one substantially constant voltage value per half-cycle indicating the off time (logic 0), and a second substantially constant voltage value per half-cycle indicating on time (logic 1).

In some embodiments, the processor 201 uses a running averaging software filter to provide smooth operation and to minimize flicker due to noise transients. In some embodiments, a running average filter replaces values of discrete data points, taken from a range centered on a selected data point, with the average of their values; as a result, the running average filter may sample the off times coming in and averages over a set of previous samples, such as the previous 31 samples, producing a number equal to the average over that set of previous samples. As a result, if the off time length changes from 1 to 1.5 ms for a transient period of time, such as might be produced by a random fluctuation of voltage in the AC input, the effect may be minimized, and the control signal output may change a negligible amount; if changed off time persists, average may shift to reflect the persistent change, resulting in a modified control signal output.

The modified AC decoder 200 may include a PMW to DC converter 202 that converts the pulse width modulated signal into a voltage control signal. The PMW to DC converter 202 may include an RC network 203 made up of at least one resistor and at least one capacitor, which averages the pulse width modulated signal to produce a constant voltage. In some embodiments, the constant voltage is at a level between 0 V and the "on" or "logic 1" voltage of the pulse width modulated signal; where the "on" voltage is equal to the maximum voltage of the voltage control signal, the constant voltage output by the RC network may be a value within the range of the voltage control signal. The processor may be programmed to produce the pulse necessary produce an average voltage equal to the voltage control signal to which the detected off time corresponds. The pulse width modulated signal example from FIG. 2C may result in a lower constant voltage output from the PWM to DC converter 202 than the pulse width modulated signal example from FIG. 2D. In embodiments where the "on" (logic 1) voltage of the pulse width is not equal to the maximum voltage control value, the PMW to DC converter 202 may include an amplifier 204 that maps the constant voltage to the voltage control range; e.g., the amplifier may map a constant voltage produced on a range between 0 and 5 VDC onto a 0-10 VDC range. For instance, where the processor 201 outputs pulses having an "on" voltage of approximately 5 VDC, or slightly less than 5 VDC, the amplifier 204 may have a gain of 2, or slightly more than 2, modifying the constant voltage to a voltage between 0 and 10 V. As shown in FIG. 2B, the amplifier 204 may be an operational amplifier with a negative feedback network causing the gain of the amplifier to produce a voltage such that the voltage produced by the feedback network at the inverting input equals the input at the inverting input of the operational amplifier; persons skilled in the art will be aware that the selection of the resistors making up the voltage divider permits the gain of the operational amplifier to be calibrated to any desired number up to the driving voltage of the amplifier. The amplifier 204 may be powered by the power supply 107 of a driver 100 as described above in reference to FIGS. 1A-1F. The PWM to DC converter 202 may include a voltage follower 205 that replicates the output of the converter 202; the voltage follower 205 may present a high input impedance to the converter 202, ensuring that the voltage control signal is not reduced by a load, such as a driver 100, connected to the modified AC decoder, while providing current necessary to maintain the control signal output at the output of the voltage follower 205. The voltage follower 205 may also be powered by the power supply 107 of a driver 100 as described above in connection with FIGS. 1A-1F. In some embodiments, the voltage output by the PWM to DC converter never reduces completely to 0; in some embodiments, where the control signal is a voltage control signal, the driver 100 may use the zero-current shutdown 109 to detect voltages near zero in the control signal and switch off the current from the a least one current regulator 105, as shown above in reference to FIGS. 1A-1F. In other embodiments, the driver 100 imitates a traditional triac dimmer in the sense that it reduces the light output to a very faint level but does not shut off.

The modified AC decoder 200 may include a comparator 206 that detects the beginning and end of the off time in the modified AC signal, and switches logic level at the output of the comparator 206 both at the beginning and at the end of the off time. As a non-limiting example, where the modified AC signal has been rectified by the rectifier 103 described above in connection with FIGS. 1A-1F, the comparator 206 may have an internal voltage threshold below which the comparator 206 switches output logic level to logic 0; for instance, the comparator may have an internal voltage threshold of 0.4 V, so that it outputs the logic 0 signal for a range of rectified voltage between 0.4 V and 0 V. In some embodiments, the switch in logic level by the comparator results in a clear signal to the processor 201 delineating the off time conveyed in the modified AC signal. The modified AC decoder 200 may also include a resistive divider 207 prior to the comparator 206. The resistive divider 207 may reduce the overall voltage of the modified AC waveform that is conveyed to the comparator 206. In some embodiments, the resistive divider 207 enables the comparator 206 to capture the true width of the off time, and to provide solid Logic 0 outputs to the processor 201. The resistive divider 207 may also enhance noise immunity for the modified AC decoder 200. FIGS. 2E and 2F illustrate oscilloscope outputs showing the rectified, modified AC signal, as divided down by the resistive divider 207, above the corresponding logic signal as output by the comparator 206, which is input to the processor 201; in some embodiments, the use of a comparator 206 and resistive divider 207 enhances the ability of the processor 201 to convert the off time delineations 230 in the rectified modified AC signal into crisp and reproducible logic 1 and 0 delineations 231. In some embodiments, a first resistive divider 207 may be used to convert a modified AC signal of a first amplitude to the required amplitude for the comparator 206, and a second resistive divider 207 may be used to convert a modified AC signal having a second amplitude to the required amplitude for the comparator 206; as a non-limiting example, one resistive divider may be installed for 120 V line voltage, a second resistive divider may replace the first resistive divider for 220 V line voltage, a third resistive divider may be swapped in for 277, and a fourth resistive divider may be installed for 480 V line voltage. In some embodiments, the only necessary step to make the modified AC decoder 200 function in a new line voltage is the installation of a new resistive divider 207. In some embodiments, the resistive divider 207 is adjustable; for instance, in some embodiments, the modified AC decoder 200 includes a switch (not shown) that allows a user to connect select a resistive divider 207 as necessary to make the modified AC decoder 200 function in particular line voltage. The switch may function as described above for a resistive divider switch 108 in reference to FIGS. 1A-1C; for instance, the resistive divider may include a potentiometer. The potentiometer may be controlled by a manual knob, with markings to indicate the position of the knob that places the potentiometer at the right resistance level to allow the modified AC decoder 207 to function with a given line voltage.

In some embodiments, the modified AC decoder 200 includes a DC voltage converter 208. The DC voltage converter 208 may convert the DC power received from the power supply 107 of a driver 100 as described above in reference to FIGS. 1A-1F to a different DC voltage as required for one or more components of the modified AC decoder 200. The DC voltage converter 208 may include a voltage reference 209. For instance, in some embodiments, the processor 201 has an operating voltage of 5 VDC, rather than 10 VDC; the DC voltage converter 208 may include a voltage reference 209 that outputs 5 VDC. As a non-limiting example, the voltage reference 209 may be a MAX6105 5 VDC reference, as manufactured by Maxim Integrated, Inc. of San Jose, Calif. In some embodiments, some components are powered by the output of the DC voltage converter 208, while others are powered by the power supply 107 input; as a non-limiting example, the processor 201 and comparator 206 may be powered by the DC voltage converter 208, while the components of the PWM to DC converter 202 may be powered by the power supply voltage.

The modified AC decoder 200 may collect one or more of its input and output terminals into headers for connection to other devices. As a non-limiting example, the modified AC decoder 200 may have a first three-pin header 210 having a return on the first pin, a control signal output on the second pin, and a power supply input on the third pin. The modified AC decoder 200 may have a second three-pin header 211 having a return on the first pin and an unfiltered DC input on the second pin. The headers 210, 211 may be adapted to connect to the headers 119, 120 of the driver 100b; for instance, where the headers 119, 120 of the driver 100b are 91614-303G headers as described above in connection with FIGS. 1A-1D, the headers 210, 211 of the modified AC decoder 200 may be 95293-101-03G headers, as manufactured by FCI Americas Technology, LLC of Carson City, Nev.

Figure 2E:
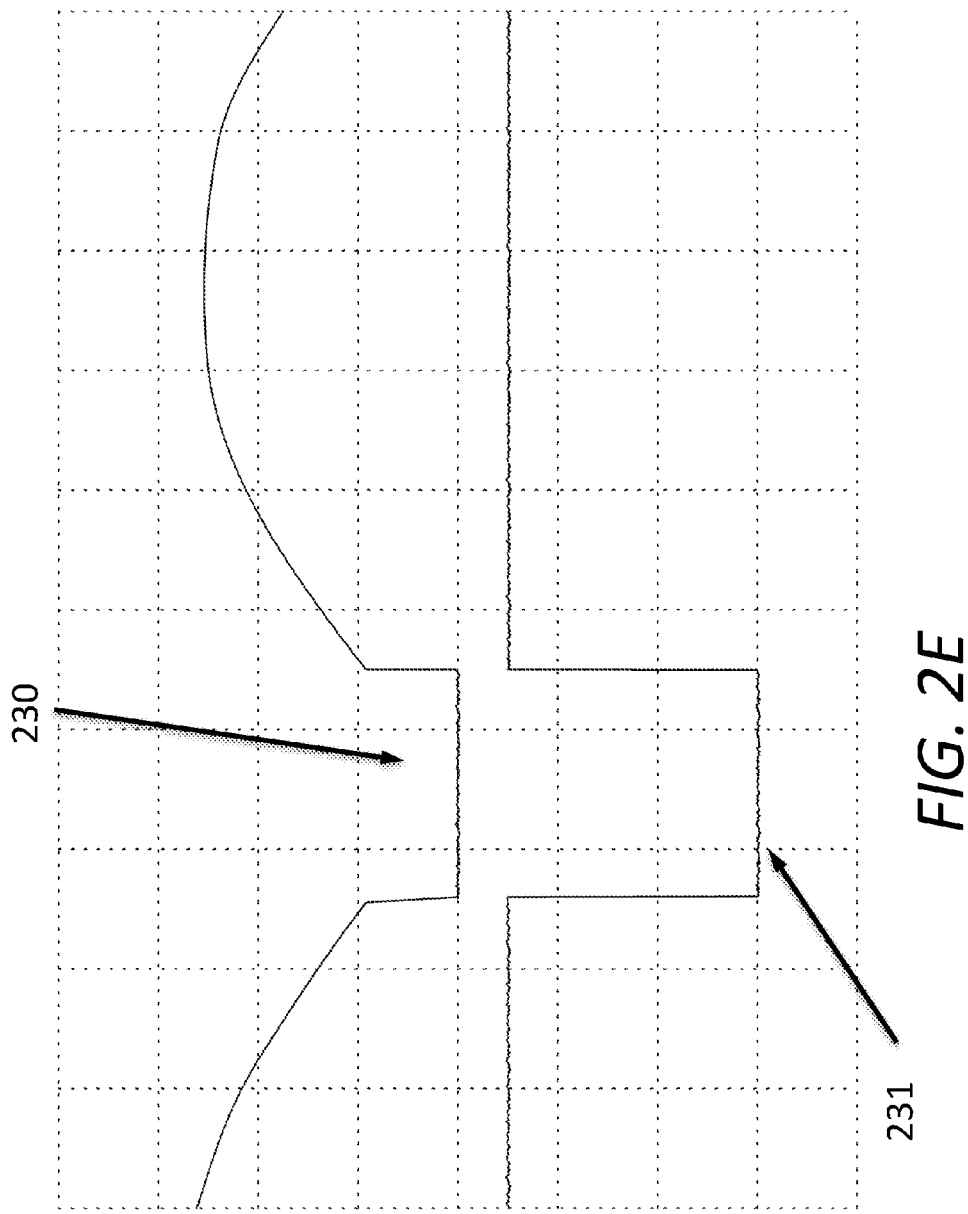
FIG. 2E is an oscilloscope display depicting an embodiment of a pulse-width modulated signal matched up with a corresponding rectified modified AC waveform as described herein.
Figure 3A:
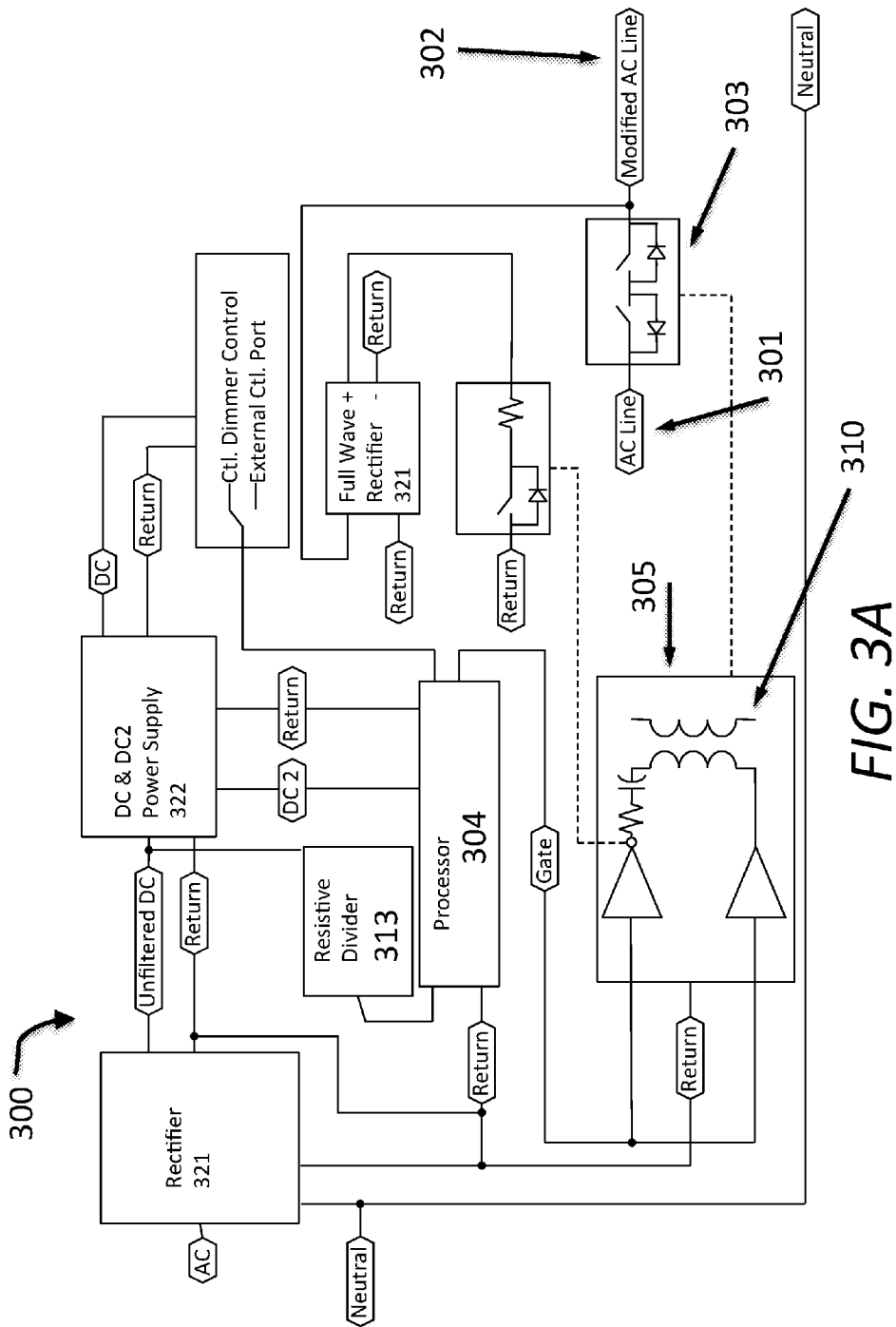
FIG. 3A is a block diagram depicting an embodiment of a modified AC encoder as described herein.

FIG. 3A illustrates a block diagram of a modified AC encoder 300. In some embodiments, the modified AC encoder 300 converts an AC signal received at an input port 301 into a modified AC signal that contains an off time as described above in reference to FIGS. 2A-2F, which output at an output port 302. In some embodiments, the modified AC signal has one off time per half-cycle. The off time may be a period of time during which the voltage of the modified AC signal is substantially zero. In some embodiments, the length of the off time corresponds to the information the modified AC encoder 300 is transmitting. The off time may be centered around the zero-crossing point of the substantially sinusoidal waveform of the modified AC signal. In some embodiments, centering the off time around the zero crossing point places the interruption in power that the off time creates at the point in the AC waveform where the power being transmitted is normally minimal; as a result, the modified AC signal may transmit an essentially undiminished amount of power to appliances driven by the modified AC signal. Furthermore, the placement of the off time around the zero crossing may minimize voltage transients caused by the off time, in contrast to the AC signals produced by conventional dimming devices such as triac dimmers.

Figure 3B:
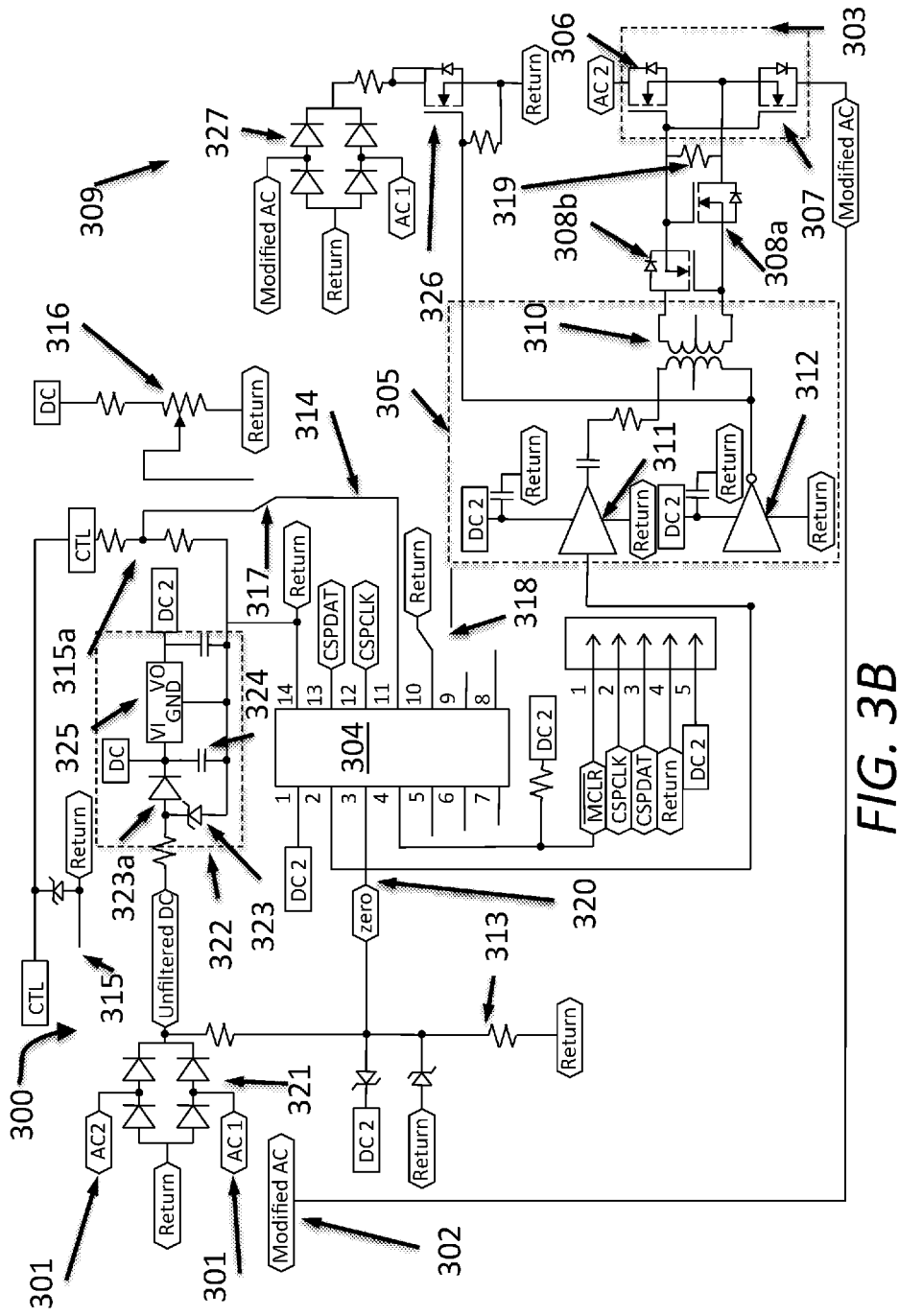
FIG. 3B is a schematic diagram depicting an embodiment of a modified AC encoder as described herein.

In some embodiments, the modified AC encoder 300 includes a bipolar switch 303 that switches off during the off time, preventing conduction of the AC signal, and switches on at other times, permitting the AC signal to transmit through the bipolar switch 303. In some embodiments, the bipolar switch 303 is controlled by a processor 304. The processor 304 may control the bipolar switch 303 by way of a gate drive circuit 305. In some embodiments, as shown in FIG. 3B, the bipolar switch 303 includes two transistors; in some embodiments, the bipolar switch 303 includes a first MOSFET 306 and a second MOSFET 307, the source of the first MOSFET 306 electrically connected to the source of the second MOSFET 307; the gate of the first MOSFET 306 may be electrically connected to the gate of the second MOSFET 307. In one embodiment, the drain of the first MOSFET 306 points in the opposite direction from the drain of the second MOSFET 307; as a result, during one half-cycle, the AC waveform may be conducted through the first MOSFET 306, if the first MOSFET 306 is on, and the freewheeling diode of the second MOSFET 307, and during the opposite half-cycle, the AC waveform may be conducted through the second MOSFET 307 and the freewheeling diode of the first MOSFET 306. As a non-limiting example, the first MOSFET 306 may be a IXFT24N80P, as produced by FCI Americas Technology, LLC of Carson City, Nev., or a similar product. In some embodiments, the second MOSFET is any MOSFET suitable for use as the first MOSFET. Although the first MOSFET 306 and second MOSFET 307 are described for the purposes of simplicity, any voltage-controlled transistor that can hold capacitance at its point of control (i.e. its gate, base, or similar component) essentially constantly for at least one half-cycle as deployed in the disclosed modified AC encoder 300 may be used for the first MOSFET 306 or the second MOSFET 307. The AC line input 301 may enter the drain of the first MOSFET 306, and the modified AC output 302 may exit the drain of the second MOSFET 307.

The first MOSFET 306 and second MOSFET 307 may switch on and off together in response to voltage pulse signals transmitted by the gate drive circuit 305; the voltage signals may correspond to the beginning and end of the off times calculated by the processor 304 as set forth in further detail below. When the first MOSFET 306 is conducting, the second MOSFET 307 may permit conduction through its freewheeling diode 307a. Likewise, when the second MOSFET 307 is conducting, the first MOSFET 306 may permit conduction through the freewheeling diode 306a of the first MOSFET 306. In some embodiments, the original AC waveform conducts through the bipolar switch 303 essentially unchanged except during the off time. When the first MOSFET 306 and second MOSFET 307 receive a positive voltage pulse from the gate drive circuit 305, the gate capacitance of each of the first MOSFET 306 and second MOSFET 307 charges up, causing the first MOSFET 306 and second MOSFET 307 to turn on and to remain on and conducting until the gate capacitances have discharged, either due to receiving a negative voltage pulse, due to a gradual discharge through a resistor in the absence of gate pulses, as described in further detail below. In some embodiments, the first MOSFET 306 and second MOSFET 307 receive a positive voltage pulse at the end of a programmed off time, causing the one of the first MOSFET 306 and second MOSFET 307 and the freewheeling diode of the other of the first MOSFET 306 and second MOSFET 307 to conduct the AC waveform essentially unmodified. When the first MOSFET 306 and second MOSFET 307 receive a negative voltage pulse, the negative pulse causes the gate capacitances of the first MOSFET 306 and second MOSFET 307 receiving the pulse to discharge, and the first MOSFET 306 and second MOSFET 307 shut off; in some embodiments, the first MOSFET 306 and second MOSFET 307 have been conducting the largely unmodified AC waveform during a programmed on time, and receive the negative pulse at the beginning of a programmed off time, shutting off the AC waveform until the first MOSFET 306 and second MOSFET 307 are activated by a new positive voltage pulse from the gate drive circuit 305 to allow the AC waveform, to resume transmission through the bipolar switch 303.

In some embodiments, the a pair of small switching transistors 308*a-b* prevents the gates of the first MOSFET 306 and second MOSFET 307 from discharging too quickly, while directing the pulses to the gates of the first MOSFET 307 and the second MOSFET 307. The switching transistors 308*a-b* may be MOSFETs. As a non-limiting example, the switching transistors 308*a-b* may be IRML2803 MOSFETs as produced by International Rectifier Corporation of El Segundo, Calif., or a similar product. In some embodiments, when the gate drive circuit 305 directs a pulse of a first polarity toward the switching transistors 308*a-b*, one switching transistor 308*a* conducts the pulse through its freewheeling diode; the pulse switches on the gate of the other transistor 308*b*, causing it to conduct the pulse as well, completing the circuit. When a pulse of the opposite polarity issues from the gate drive circuit 305, the freewheeling diode of the other transistor 308*b* conducts the pulse while the pulse opens the gate of the first transistor 308*a* to conduct the pulse as well. Between pulses, both switching transistors 308*a-b* are off, so that the gate capacitances of the first MOSFET 306 and second MOSFET 307 do not discharge through the switching transistors 308*a-b*. In some embodiments, a discharge circuit 309 drains parasitic capacitances from the first MOSFET 306 and second MOSFET 307 during the off times, as described in further detail below in connection with FIG. 3B.

Figure 3C:
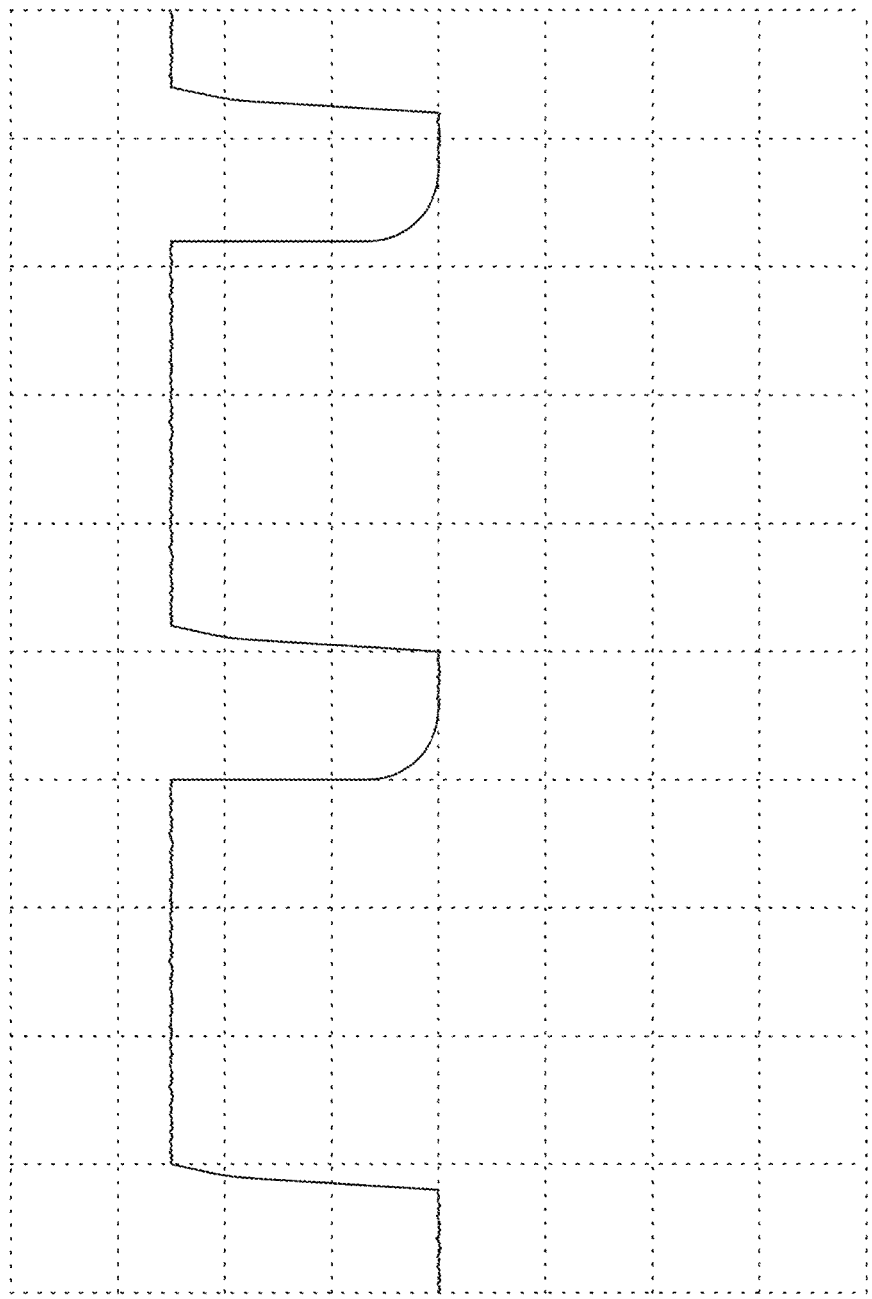
FIG. 3C is an oscilloscope display depicting an embodiment of a gate driving waveform as described herein.
Figure 3D:
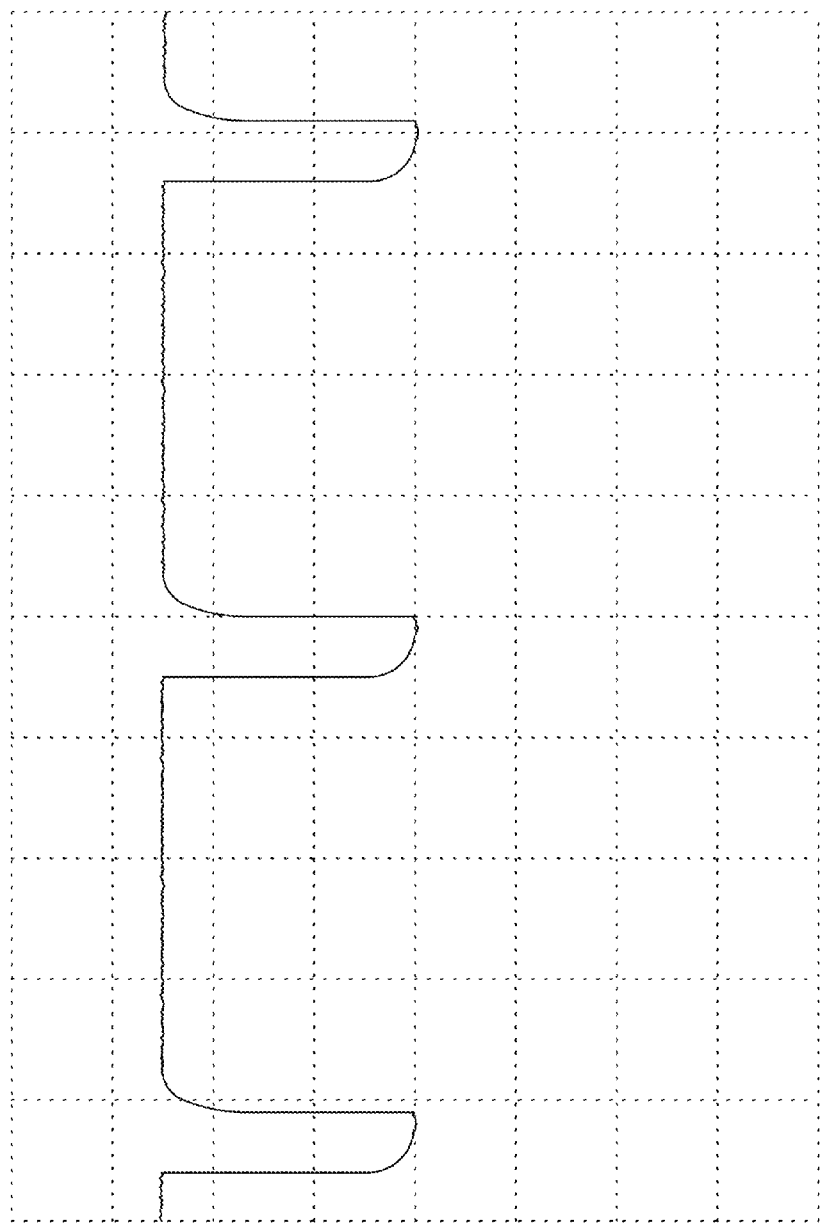
FIG. 3D is an oscilloscope display depicting an embodiment of a gate driving waveform as described herein.
Figure 3E:
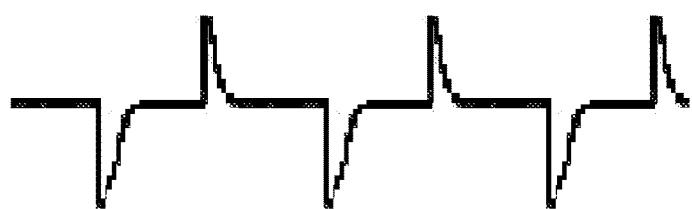
FIG. 3E is a diagram depicting an embodiment transformer output based on a gate drive signal.

In some embodiments, the gate drive circuit generates the voltage pulses by feeding a substantially square wave into a transformer 310. As a non-limiting example, the transformer may be a 78253/35JC transformer manufactured by Murata Power Solutions, Inc. of Mansfield, Mass., or a similar product. In some embodiments, the transformer 310 is designed to saturate very quickly, resulting in only brief pulses of opposite polarities occurring at the 0-1 and 1-0 transition points. FIGS. 3C and 3D illustrate two exemplary square waves as output by the processor 304. FIG. 3E illustrates an exemplary form of the transformer output; positive and negative square wave inputs cause a very brief positive or negative spike in output voltage, respectively, which almost immediately returns to zero as the transformer saturates. The square wave in FIG. 3C may correspond to an off time of approximately 2 milliseconds, while the square wave in FIG. 3D may correspond to an off time of approximately 1 millisecond. In some embodiments, the square wave is provided to one terminal of the transformer primary 310 by a non-inverting gate driver 311, such as a non-inverting MOSFET driver, and to the second terminal of the transformer primary 310 by an inverting gate driver 312, such as an inverting MOSFET driver. As a non-limiting example, the non-inverting gate driver 311 may be a TPS2829 non-inverting high-speed MOSFET driver, as manufactured by Texas Instruments Incorporated of Dallas, Tex., or a similar product. As a non-limiting example, the inverting gate driver 311 may be a TPS2828 inverting high-speed MOSFET driver, as manufactured by Texas Instruments Incorporated of Dallas, Tex., or a similar product. In some embodiments, both the inverting gate driver 312 and the non-inverting gate driver 311 generate their square waveforms in response to a square wave input from the processor 304. In some embodiments, the square wave output by the processor 304 has peaks at logic 1 and troughs at logic 0; the logic 1 portions of the processor 304 square wave output may be provided to the transformer primary by the non-inverting gate 311, while the logic 0 portions may be provided as a negative logic 1 pulse to the transformer primary, so that the transformer primary 310 is receiving a square wave that has twice the amplitude of the processor output, and that reverses polarity.

The processor 304 may be any suitable processor for performing the algorithm described in reference to FIGS. 3A-3H, using the components described in reference to FIGS. 3A-3H. The processor 304 may be any processor 201 as described above in reference to FIGS. 2A-2F. As a non-limiting example, the processor 304 may be a microprocessor. The processor 304 may be a microcontroller. The processor 304 may be a central processing unit (CPU). The processor 304 may be a neural net. The processor 304 may be any other kind of processor used in computing devices, including, for instance, a graphical processing unit (GPU). As a non-limiting example the processor 304 may be a PIC16F1823 8-bit microcontroller, as manufactured by Microchip Technology, Inc., of Chandler, Ariz., or a similar product.

In some embodiments, the processor 304 receives the rectified waveform of the AC line voltage and a control signal, calculates an off time corresponding to the control signal, and outputs a signal to the gate drive circuit 305 directing the gate drive circuit 305 to cause the bipolar switch 303 to switch off the modified AC voltage during the calculated off times. The control signal may be any control signal described above in connection with FIGS. 1A-2F. In some embodiments, the processor 304 places the off times near the zero-crossing point of the AC waveform. As noted above, placing the off times near the zero-crossing point of the AC waveform may eliminate voltage transients linked to load current interruption. In addition, loads being driven by the modified AC wave may receive negligible power during the portions of the AC waveform near to the zero-crossing points; for instance, where the load is an LED mesh, conduction may only occur near the peaks of the AC Line voltage waveform, causing modification to the waveform near the zero-crossing point to have essentially no effect on the performance of the LED mesh.

In some embodiments, the processor 304 determines the location of the zero voltage point in the AC input line. The processor 304 may determine the zero voltage point by calculating the instantaneous voltage as a function of time, using the frequency and peak voltage of the AC waveform, using the sinusoidal wave equation $V_{instantaneous} = V_{peak} \sin(\omega t)$, where $\omega$ is the angular frequency of the AC waveform. The processor 304 may determine an initial voltage by sampling the AC waveform instantaneous voltage. The peak voltage and angular frequency of the AC waveform may be stored in memory accessible to the processor 304. In other embodiments, the processor 304 detects the 0-crossing point by detecting a point at which the AC waveform falls to a logic zero beneath a threshold voltage; for a given waveform and threshold voltage, the processor 304 may be programmed to detect how soon before the actual zero-crossing point the logic 0 detection takes place. In some embodiments, the processor combines the logic 0 detection with the calculation of the zero-crossing point to determine how far in advance of the zero-crossing point the logic 0 detection takes place. The modified AC encoder 300 may include a resistive divider 313 that divides the voltage of the AC waveform down; the instantaneous voltage of the divided AC waveform may be calculated as $V_{instantaneous} =$ Divider Ratio $* V_{peak} \sin(\omega t)$, where the divider ratio is the fraction of the instantaneous voltage provided to the processor 304 by the resistive divider 313. In some embodiments, the smaller the divider ratio is, the closer to the actual zero-crossing point the logic 0 detection will take place, for a given threshold voltage. In some embodiments, the resistive divider 313 has at least one resistor selected to cause the logic 0 detection point to occur slightly more than 1 millisecond prior to the actual zero crossing point; for instance, a resistive divider creating a divider ratio of 1/51 may cause the zero detection point to occur slightly more than 1 millisecond prior to the zero crossing point. A different resistive divider may be selected to cause a logic 0 detection slightly more than 1 millisecond before the zero crossing point for a different AC line voltage such as a 230 V line or a 480 V line. In some embodiments, the resistive divider 313 is adjustable; for instance, a switch or potentiometer (not shown) may allow a user to calibrate the resistive divider as necessary to allow the modified AC encoder 300 to function with a given line voltage, as described above in reference to FIGS. 2A-2F.

Figure 3F:
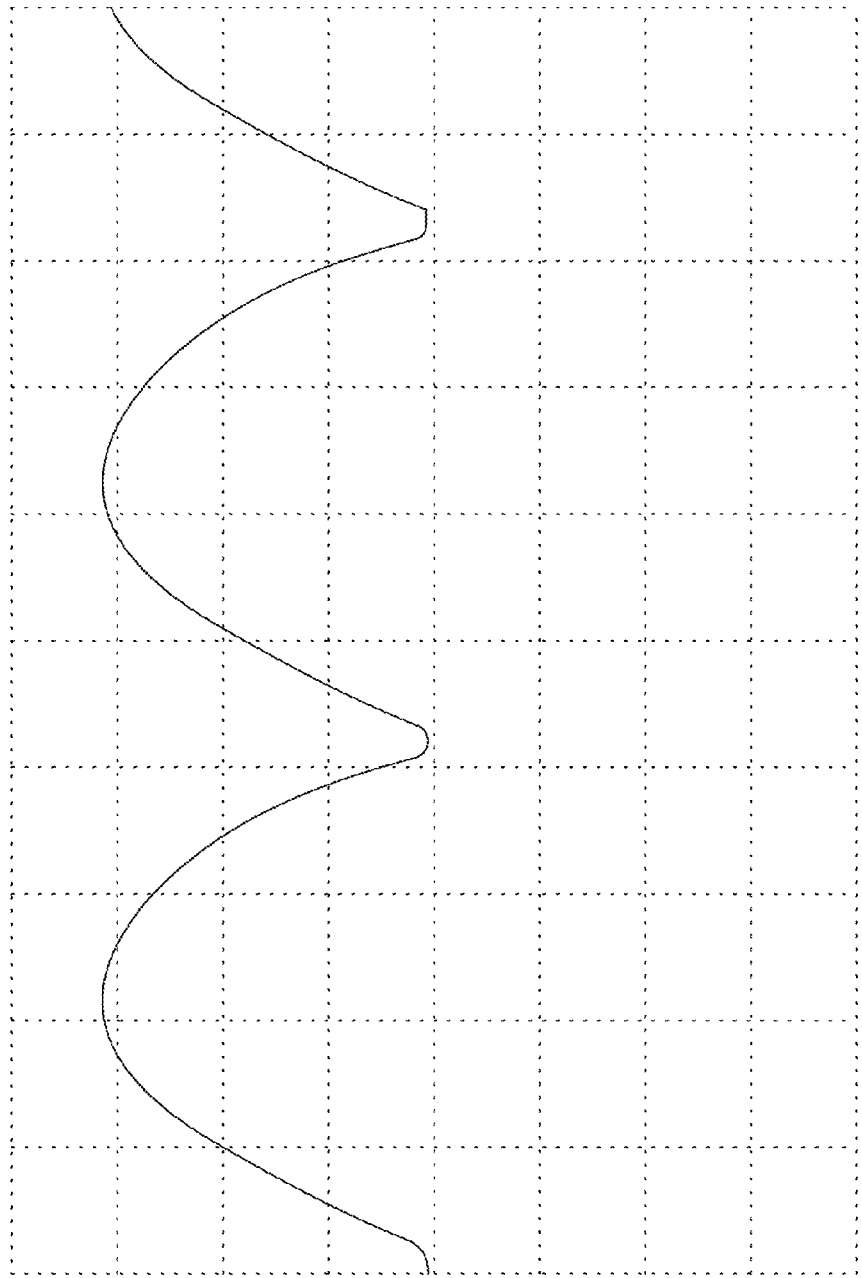
FIG. 3F is an oscilloscope display depicting an embodiment of an unmodified, rectified AC waveform as described herein.
Figure 3G:
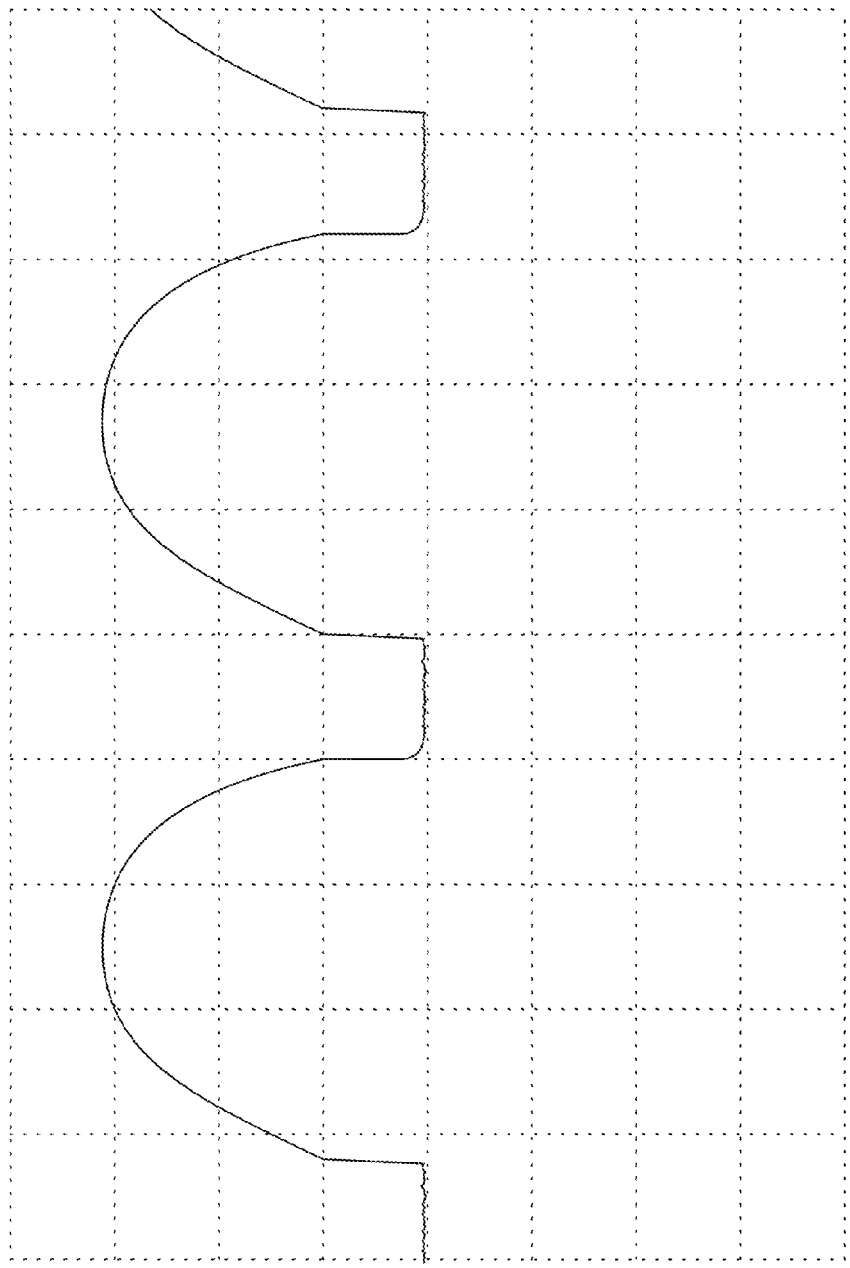
FIG. 3G is an oscilloscope display depicting an embodiment of a modified, rectified AC waveform as described herein.
Figure 3H:
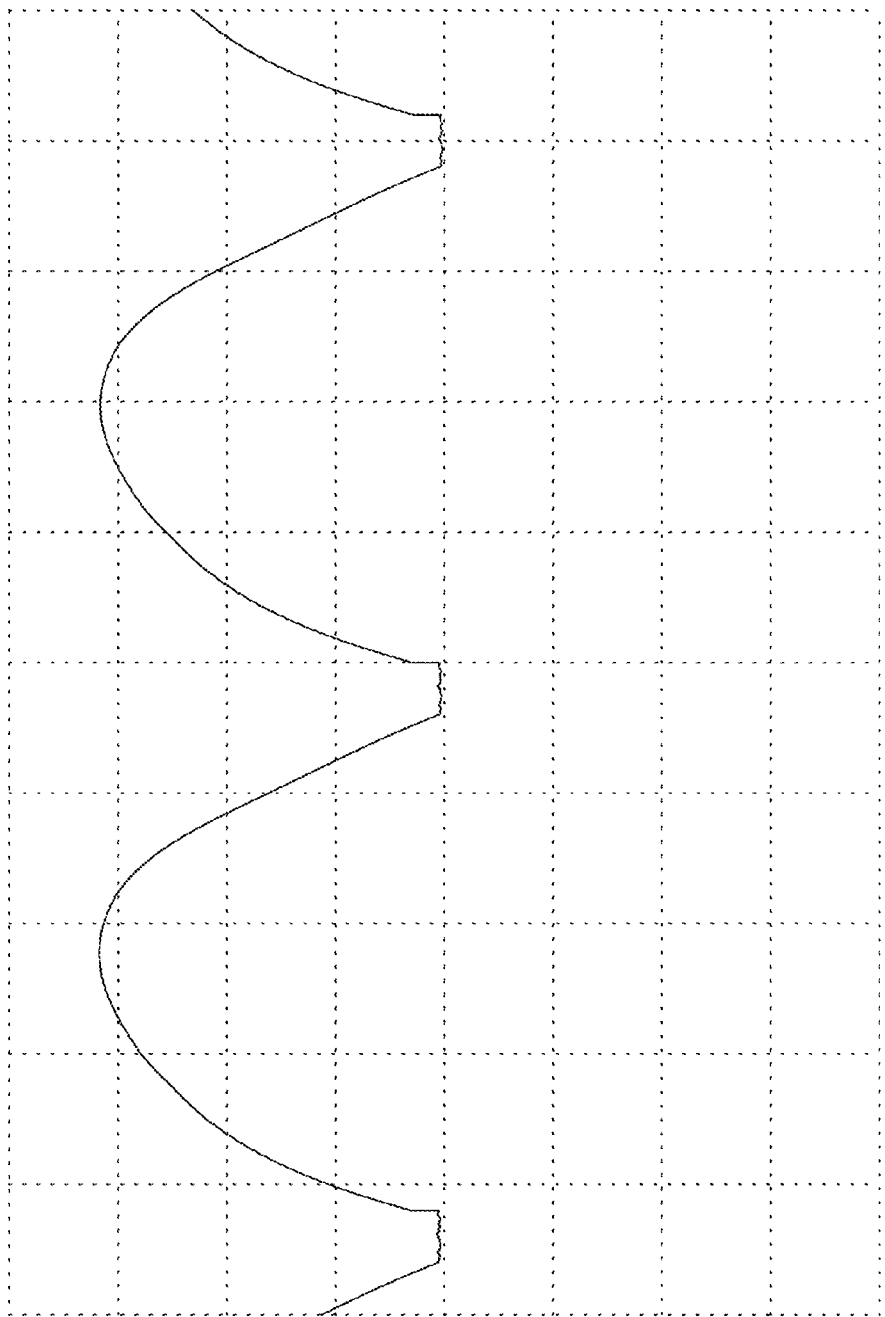
FIG. 3H is an oscilloscope display depicting an embodiment of a modified, rectified AC waveform as described herein.
Figure 31:
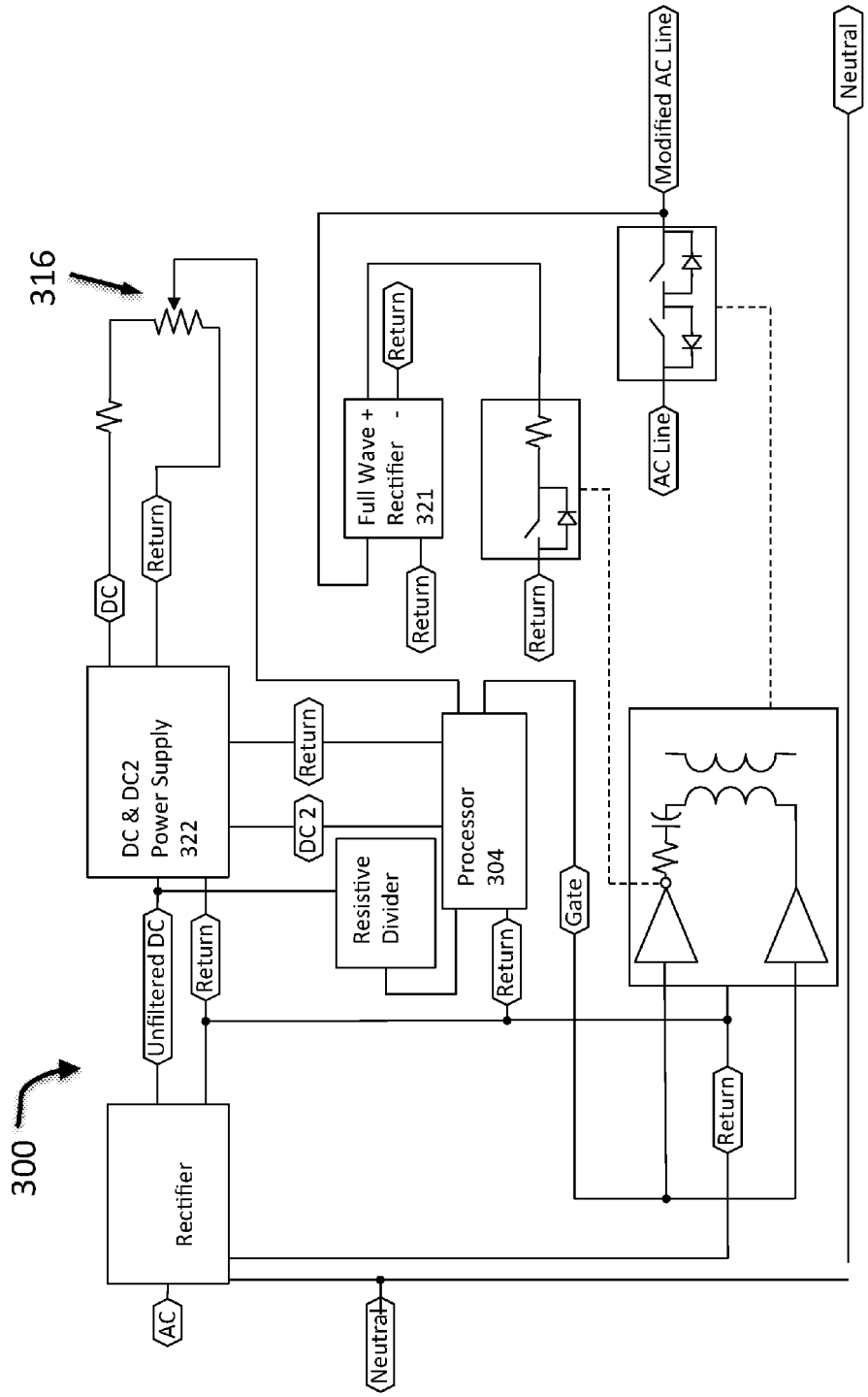

In some embodiments, the resistive divider 313 is selected to cause the logic 0 detection point to occur a known number of microseconds prior to the zero-crossing point. The processor 304 may be configured to compute a linear function of the control signal to determine how many microseconds after the logic 0 detection point to begin the off time; in some embodiments, the processor 304 calculates a second linear function of the control signal to determine how many microseconds after the logic 0 detection to end the off time. The processor 304 may calculate the off time by setting a beginning and an end for the off time, relative to the determined zero crossing point, as described above. In some embodiments, the time from the beginning to the zero crossing point is substantially the same as the time from the zero crossing point to the end time, so that the off time is substantially centered around the zero crossing point; the "OFF" period may move slightly left or right of center with AC Line voltage variations, but not enough to disrupt correct operation. In some embodiments, the duration of the off time, which is the time from the beginning to the end of the off time, is at least one millisecond long; in some embodiments, a minimum off time of 1 millisecond insures that the "ON-to-OFF" and "OFF-to-ON" transitions are easily detectable by devices, such as the modified AC decoder 200, that interpret the off time as a signal, as described in further detail above in connection with FIGS. 2A-2F. In some embodiments, the off time is at most 2 milliseconds; a maximum time of 2 milliseconds may ensure a minimal disruption of the modified AC waveform. In some embodiments, the processor 304 maps a control signal to the calculated off time. As a non-limiting example, where the control signal is a 0-10 VDC signal, the mapping function may be a linear function whereby a 0 VDC control signal causes the processor 304 to output an off time 2 milliseconds in duration (approximately 1 millisecond on either side of the zero crossing point), a 5 VDC control signal causes the processor to output a 1.5 millisecond off time (approximately 0.75 milliseconds on either side of the zero crossing point), and a 10 VDC control signal causes the processor 304 to output a 1-millisecond off time (approximately 0.5 milliseconds on either side of the zero crossing point); values between those three 0-10 VDC values may cause the processor 304 to output off times between the three off time values as determined by a linear function accomplishing the three mappings described. In some embodiments, an "off" input to the processor, provided by an on-off switch, as described in further detail below in connection with FIG. 3B, causes the processor to stop driving the gate driver, leading the bipolar switch 303 to shut off the modified AC line, cutting power to downstream devices, as described above in reference to FIGS. 3A-3B. FIG. 3F illustrates an unmodified rectified AC input; FIGS. 3G-3H illustrate two rectified modified AC waveforms having different off times. Alternatively, the on-off switch, which is used as a logic controller to the processor is replaced by an on-off (single-pole or three-way) switch that cuts power to the whole dimmer circuit.

Figure 3J:
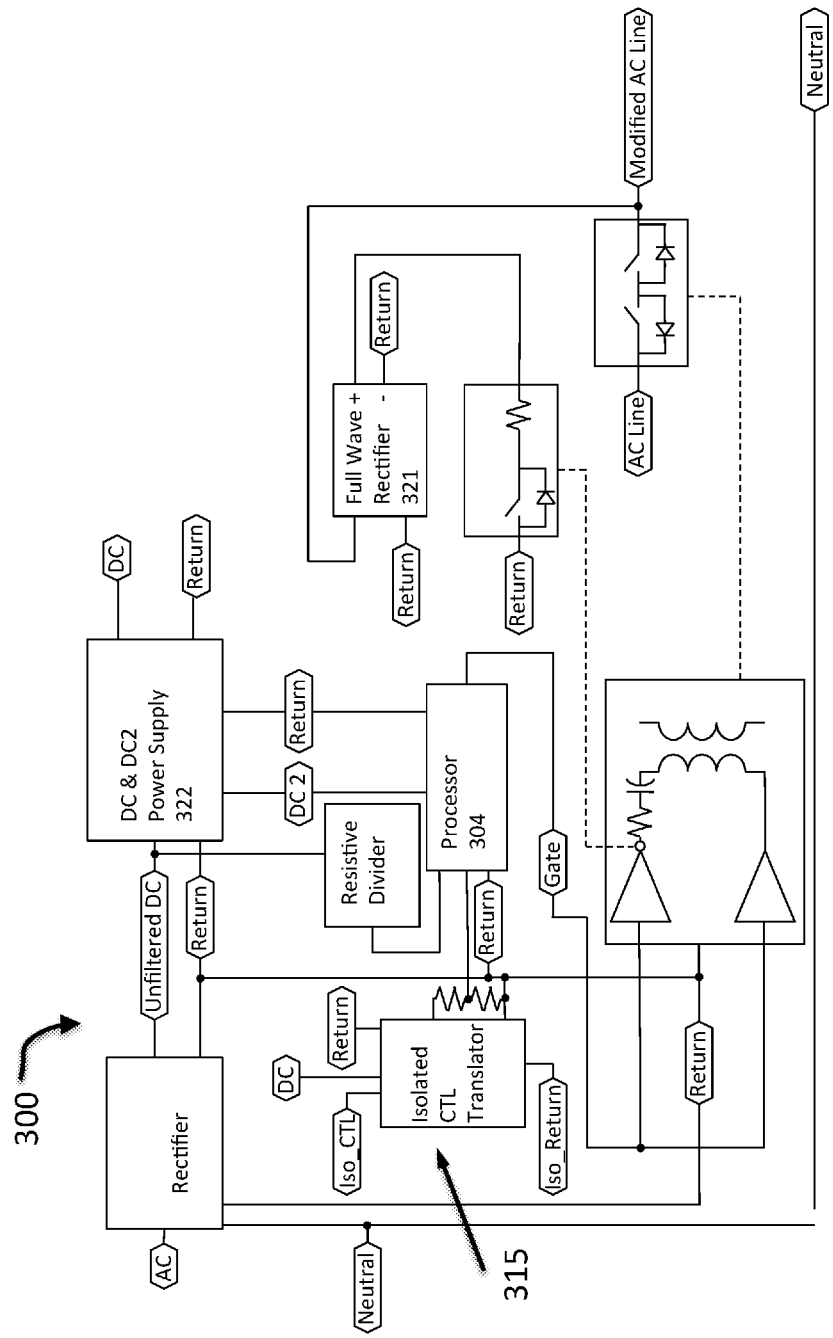
FIG. 3J is a schematic diagram depicting an embodiment of a modified AC encoder as described herein.

Inputs to the processor 304 may include at least one control signal input 314. The control signal input 314 may connect to an external port 315 that may accept an external control signal from any device capable of conveying a control signal; in some embodiments, the external port is connected to a wireless receiver that generates a control signal as described above. The external port 315 may be connected to any device that can generate a control signal, such as a dimmer switch such as a slide potentiometer, a potentiometer operated by a knob, a capacitive dimmer knob, a programmable logic controller, or other device. In some embodiments, the device supplying the control signal includes circuitry to isolate the device from the modified AC encoder 300; in other embodiments, the modified AC encoder 300 contains circuitry to isolate the external port 315 from the rest of the modified AC encoder 300. The external port 315 may be scaled by a resistive divider 315a to input a signal in a voltage range acceptable by the processor 304; for instance, where the processor 304 is configured to accept a 0-5 VDC control signal, the resistive divider 315a may divide the voltage of a 0-10 VDC control signal in half. The control signal input 314 may connect to a dimmer control 316 incorporated in the modified AC encoder 300. The dimmer control 316 may be a potentiometer, such as a dimmer slide potentiometer. The dimmer control 316 may also be calibrated to input a control signal over a range the processor 304 is configured to accept, such as a voltage control range from 0 to 5 VDC. In some embodiments, the modified AC encoder 300 includes both an external port 315 and a dimmer control 316 that can connect to the control signal input 314. The external port 315 and dimmer control 316 may connect via a switch 317 that enables one or the other to be chosen as the control signal source; the switch 317 may be a manual switch. In some embodiments, the modified AC encoder 300 has a dimmer control 316 and no external port 315; FIG. 3I is a block diagram depicting an embodiment of a modified AC encoder 300 having a dimmer control 316 and no external control signal port 315. In other embodiments, the modified AC encoder 300 has an external control signal port 315 and does not have a dimmer control 316; FIG. 3J is a block diagram depicting an embodiment of a modified AC encoder 300 that has an external control signal port 315 and no dimmer control 316. The control signal port 315 may connect to the rest of the modified AC encoder 300 via an isolated control signal translator, which electrically isolates the port 315 from the remainder of the circuitry in the modified AC encoder 300.

In some embodiments, the modified AC encoder 300 includes an on-off switch 318. In some embodiments, the processor 304 interprets the on-off switch 318 being placed in the "off" position as a command not to activate the gate drive circuit 305. In some embodiments, the bipolar switch 303 includes a resistor 319 that discharges the gate capacitance of each of the first MOSFET 306 and the second MOSFET 307 in the absence of pulses from the gate drive circuit 305; the discharge of the gate capacitance of both the first MOSFET 306 and the second MOSFET 307 may switch off both the first MOSFET 306 and the second MOSFET 307, causing the modified AC line to cease conducting, and cutting off power to all devices attached to the modified AC line, including drivers 100, loads 110 driven by the drivers 100, adapters 126 powered by the drivers 100, and modified AC decoders 200 powered by the drivers 100. In some embodiments, when the on-off switch 318 is in the "on" position, the processor converts the voltage at the control signal input 314 into on and off time signals as described above in reference to FIG. 3B.

Inputs to the processor 304 may include an AC line voltage sample input 320. In some embodiments, the line voltage sample input 320 provides a waveform representative of the AC line voltage waveform to the processor 304. In some embodiments, AC line voltage waveform is rectified by a rectifier 321 prior to being input to the AC line voltage sample input 320. The rectifier 321 may be any rectifier suitable for use as a rectifier 103 as disclosed above in reference to FIGS. 1A-1F. In some embodiments, the rectifier 321 is a full-wave rectifier. The rectifier 321 may be a bridge rectifier. The AC line voltage waveform may be reduced using a resistive divider 313 as described above in reference to FIG. 3B.

Inputs to the processor 304 may include a power supply 322. The power supply 322 may use a transient voltage suppressor 323 and capacitive filter 324 to produce a steady DC voltage from the AC line voltage, as described above in reference to FIGS. 1A-F. In some embodiments, the power supply 322 includes a diode 323a to further reduce the voltage to the required steady value. The steady DC voltage may be 10 VDC. In some embodiments, the AC line voltage is provided to the power supply 322 in rectified form by way of the rectifier 321. The power supply 322 may include a voltage converter 325 to convert the power supply voltage to a second voltage; the voltage converter 325 may be constructed as described above for a DC voltage converter 208 in reference to FIGS. 2A-2B. The voltage converter 325 may produce a 5 VDC voltage. In some embodiments, the voltage from the voltage converter 325 powers the processor. In some embodiments, the voltage from the voltage converter 325 powers the non-inverting gate driver 311. In some embodiments, the voltage from the voltage converter 325 powers the inverting gate driver 312. In some embodiments, the voltage from the power supply 322 itself powers the dimmer control 316.

In some embodiments, the discharge circuit 309 drains parasitic capacitances from the first MOSFET 306 and second MOSFET 307 during off times through a single transistor 326 connecting the modified AC line to return through a full-wave rectifier 327. The transistor 326 may conduct during the off time, connecting and discharging any non-zero voltage on the modified AC line across a resistor during off times. Any suitable circuit may switch the transistor 326 on during the off time. For instance, the transistor 326 may be switched on by positive voltages from the inverting gate driver 312, so that the transistor 326 switches on; when the non-inverting square wave is logic 1, and the inverting square wave is logic 0. As an example, the transistor 326 may be a MOSFET with a gate connected to the output of the inverting MOSFET driver. The drain circuit 309 may contain any other set of elements usable to drain the parasitic capacitances; for instance, instead of being rectified, the drain circuit 309 may contain a bipolar switch that opens during off-times, similarly to the bipolar switch 303 described above.

The modified AC encoder 300 may be contained in a housing (not shown). The housing may be shaped to fit in a wall recess. In some embodiments, the housing may be fastened in the wall recess; the housing may have screw holes or fastener-free engagement members allowing the housing to snap in place in a wall recess. The housing may include manual controls permitting the user to operate the dimmer 316 or the on-off switch 318; for instance, the on-off switch 318 may be a conventional light switch. The on-off switch 318 may be a push button switch. The dimmer 316 may connect to manual slide switch or to a rotatable knob.

Figure 1D:
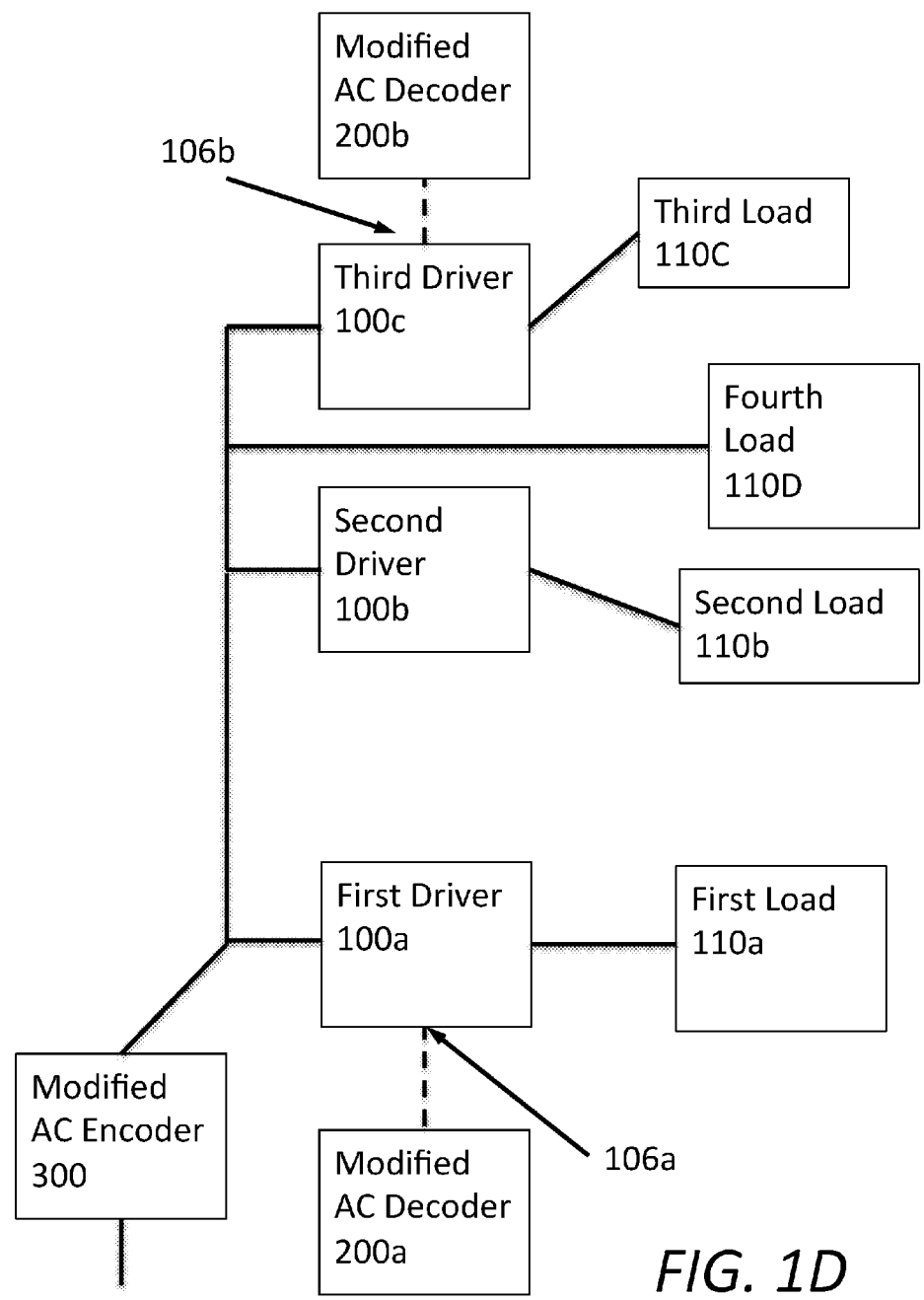
FIG. 1D is a schematic diagram depicting an embodiment of a network employing elements described herein.
Figure 1E:
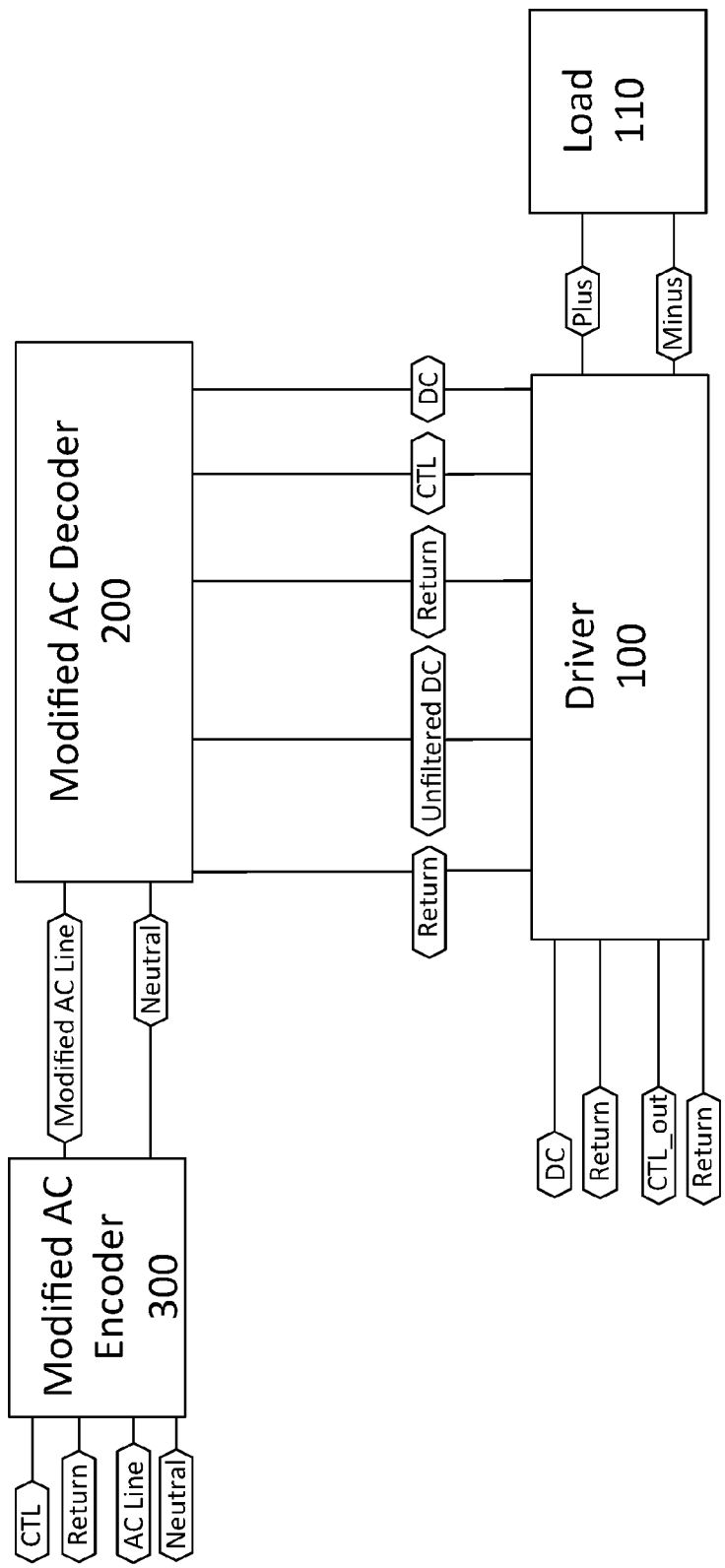
FIG. 1E is a block diagram depicting an embodiment of a network employing elements described herein.
Figure 1F:
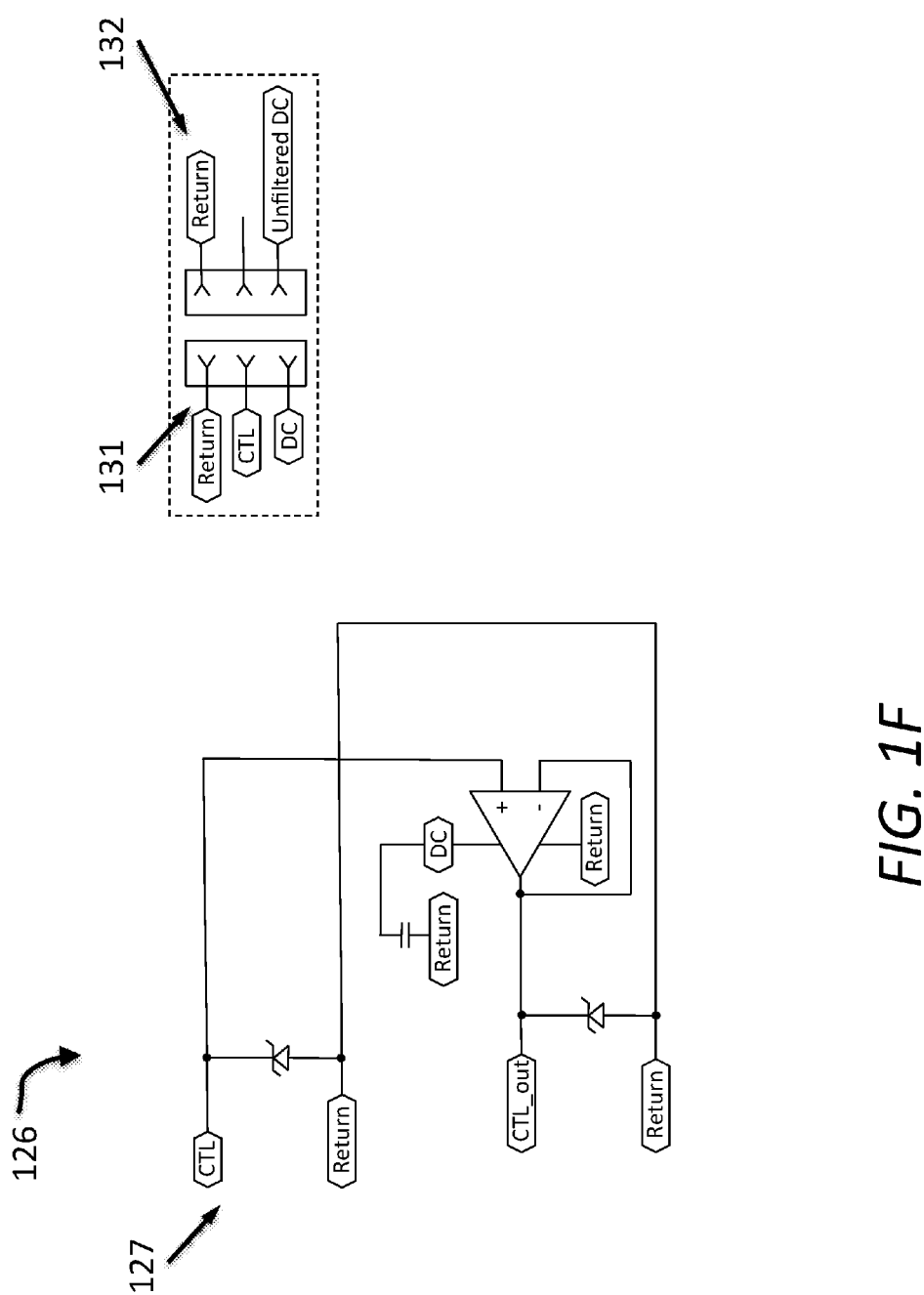
FIG. 1F is a schematic diagram depicting an embodiment of an adapter as described herein

FIG. 1D illustrates an exemplary network in which a modified AC encoder 300 feeds a modified AC signal to a first driver 100a driving a first load 110a, a second driver 100b driving a second load 110b, a third driver 100c driving a third load 110c, and a fourth load 110d that is directly connected to the modified AC line voltage. In the non-limiting example, the first driver 100a and third driver 100c are connected to modified AC decoders 200a-b, which convert the off times encoded by the modified AC encoder 300 into control signals. As a result, the first driver 100a and third driver 100c may reduce the current to the first load 110a and third load 110c as dictated by control signal encoded in the modified AC line by the modified AC encoder 300. Continuing the example, the second driver 100b is not connected to a modified AC decoder, and so it drives the second load 110b at full power. The fourth load 110d may be any AC appliance; for instance, the fourth load 110d may be an electric appliance that is not lighting. The other electric appliance may require a substantially normal AC signal to function, and may run effectively at any dimming level. The fourth load 110d may run off of the modified AC line exactly as if the modified AC line were a regular AC line. If the off switch of the modified AC encoder 300 is activated the modified AC line may cease to conduct electricity, and, the first driver 100a, first load 110a, second driver 100b, second load 110b, third driver 100c, third load 110c, and the fourth load 110d may all cease operating.

In some embodiments, the modified AC encoder 300, modified AC decoder 200, adapter 126, and driver 100 as described above presents a simple design requiring a minimal number of low cost components for implementation. By gating the AC Line "ON" and "OFF" based upon the commanded brightness, the modified AC line supplies power to dimmable and non-dimmable fixtures alike. Non-dimmable fixtures that are not configured to decode the signal from the modified AC encoder 300 may run at full power on the modified AC line, but turn on and off when the power to the fixtures is cut in response to operation of the on-off switch 318. The modified AC line functions essentially the same way as the unmodified AC line for any device not capable of decoding the off time signal produced by the modified AC encoder 300; thus, in some embodiments, when the modified AC encoder 300 commands devices capable of decoding the off time signal to dim, other devices driven by the modified AC line continue to run at full power as before.

Figure 4:
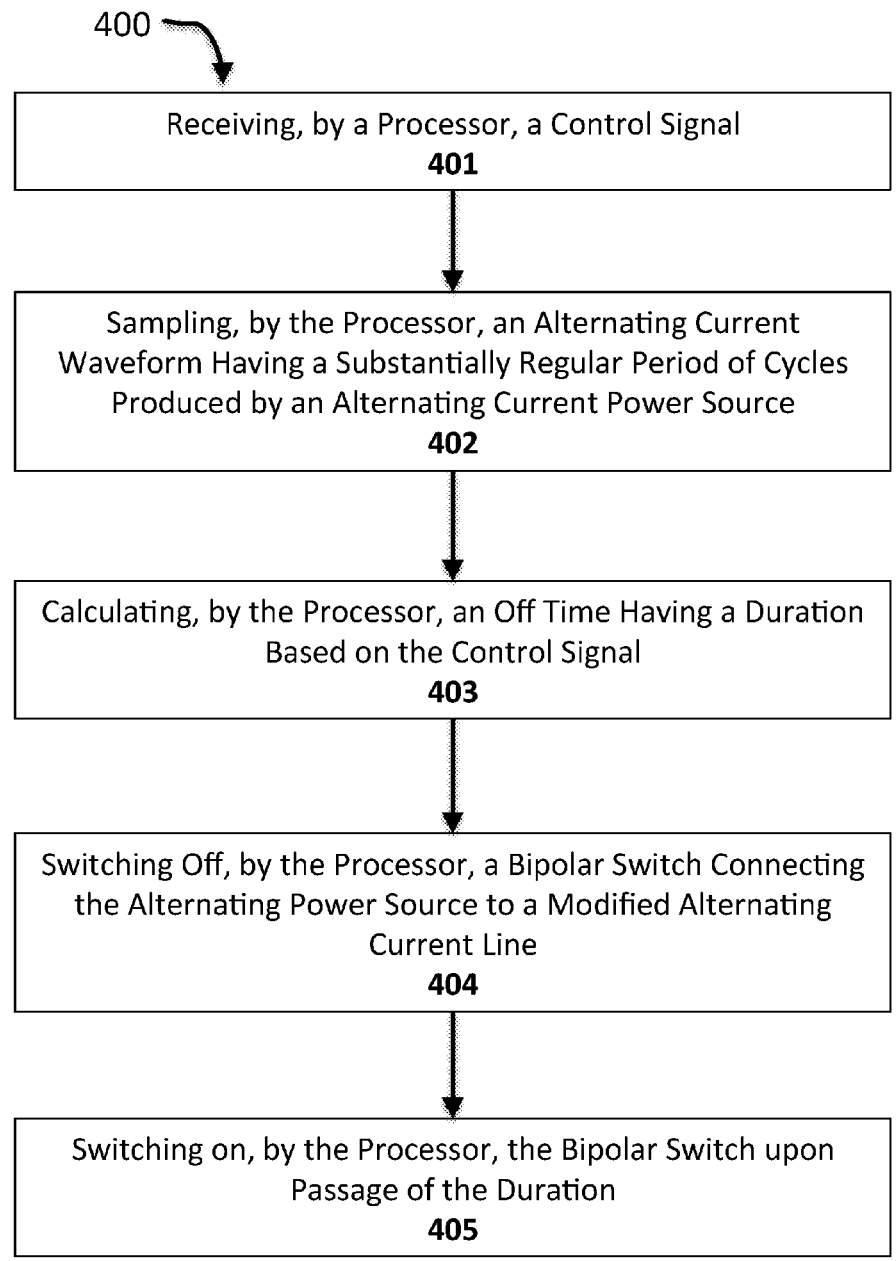
FIG. 4 is a flow diagram illustrating a method for encoding signals in a modified alternating current line.

FIG. 4 illustrates some embodiments of a method 400 for encoding signals in a modified alternating current line. The method 400 includes receiving, by a processor, a control signal (401). The method 400 includes sampling, by the processor, an alternating current waveform having a substantially regular period of cycles produced by an alternating current power source (402). The method 400 includes calculating, by the processor, an off time having a duration based on the control signal (403). The method 400 includes switching off, by the processor, a bipolar switch connecting the alternating power source to a modified alternating current (404). The method 400 includes switching on, by the processor, the bipolar switch upon passage of the duration (405).

Referring to FIG. 4 in greater detail, and by reference to FIGS. 1A-3J, the processor 304 receives a control signal (401). This may be implemented as described above in reference to FIGS. 1A-3J. The control signal may be any control signal as described above in connection with FIGS. 1A-3J. As a non-limiting example, the control signal may be a direct current voltage control signal, as described above in reference to FIGS. 1A-3J; the control signal may be a 0-10 VDC control signal. The processor 304 may receive the control signal via a control input 314 as described above in reference to FIGS. 3A-3J. The processor 304 may receive the control signal from the dimmer control 316. The processor 304 may receive the control signal from an external device, such as a wireless device.

The processor 304 samples an alternating current waveform having a substantially regular period of cycles produced by an alternating current power source (402). The processor 304 may sample the waveform using the AC line voltage sample input 320 as described above in connection with FIGS. 3A-3J.

The processor 304 calculates an off time having a duration based on the control signal (403). This may be implemented as described above in reference to FIGS. 3A-3J. In some embodiments, the processor 304 calculates the duration of the off-time by calculating a function of the control signal; for instance where the control signal is a 0-10 VDC signal, the processor 304 may calculate the duration using a linear function whereby 0 maps to an off time duration of 2 milliseconds, 1 maps to an off time duration of 1 millisecond, and control signal values in between map to durations between 1 and 2 milliseconds according to a linear function. In other embodiments, the processor 304 maps the control signal to a duration stored in memory of the processor 304.

The processor 304 switches off a bipolar switch 303 connecting the alternating power source to a modified alternating current (404). In some embodiments, the processor 304 switches off the bipolar switch 303 as described above in connection with FIGS. 3A-3J. In some embodiments, the processor 304 switches off the bipolar switch substantially half of the duration prior to a zero-crossing time in the alternating current waveform; for instance, where the off time duration is 2 milliseconds, the processor 304 may switch off the bipolar switch 1 millisecond prior to the zero-crossing time. The processor 304 may switch off the bipolar switch substantially half of the duration prior to the zero-crossing time by calculating the zero-crossing time, and switching the bipolar switch off approximately half the duration before the zero-crossing time. In some embodiments, the processor 304 calculates the zero-crossing time by detecting a voltage peak time in the alternating current waveform solving an equation describing the waveform for a zero-intercept time in the alternating current waveform; the equation may be a sinusoidal equation for the voltage of an alternating current power source, as described above in reference to FIGS. 3A-3J. Solving the equation may involve adding a quarter of the period to the voltage peak time; for instance, a regular sine wave has a zero-intercept 1 quarter of the period of the sine wave following a voltage peak. The voltage peak may be a local minimum voltage. The voltage peak may be a local maximum voltage.

In other embodiments, the processor 304 detects a logic zero time at which the sampled alternating current waveform drops to logic zero, retrieves a stored value substantially equal to the difference between the logic zero time and the zero-crossing point, subtracts half of the duration from the difference to obtain a switch-off time, and switches off the bipolar switch at the switch-off time. The logic zero detection point may be set to precede the zero-crossing point by the stored value using the resistive divider 313, as described above in reference to FIGS. 1A-3J; in some embodiments, where the resistive divider 313 is adjustable, a user may adjust the resistive divider so that the logic zero detection point occurs an amount of time substantially equal to the stored value prior to the zero-crossing point.

The processor 304 switches on the bipolar switch 303 upon passage of the duration (405); that is, when an amount of time equal to the duration has passed since the processor 304 has switched off the bipolar switch 303, the processor 304 may switch the bipolar switch 303 back on. In some embodiments, the processor 304 switches on the bipolar switch 303 as described above in connection with FIGS. 1A-3J. The processor 304 may switch the bipolar switch 303 off, and back on after the duration has elapsed, multiple times; for instance, the processor 304 may switch the bipolar switch 303 off prior to each zero-crossing point, and back on after each zero-crossing point. In some embodiments, interrupting the modified AC waveform around each zero-crossing point enables devices such as the decoder 200 described above in reference to FIGS. 2A-2F to determine the off time duration accurately despite voltage transients or other temporary phenomena affecting the AC waveform.

FIG. 5 illustrates some embodiments of a method 500 for decoding a modified alternating current signal. The method 500 includes sensing, by a processor coupled to a modified alternating current line having a modified alternating current signal, an off time in the modified alternating current signal (501). The method 500 includes emitting, by the processor, a control signal based on the detected off time (502).

Referring to FIG. 5 in greater detail, and by reference to FIGS. 1A-3J, the processor 201 senses an off time in the modified alternating current signal (501). In some embodiments, the processor 201 senses the off time as described above in reference to FIGS. 2A-2F. As a non-limiting example, the processor 201 may sense the off time by detecting when the modified alternating current signal drops below a first threshold and detecting when the modified alternating current signal subsequently exceeds above a second threshold. The threshold may be a positive or negative number; for instance, the threshold may represent an absolute value, so that a negative or positive voltage that has an absolute value exceeding the threshold exceeds the threshold.

The processor 201 emits a control signal based on the detected off time (502). In some embodiments, the processor 201 emits the control signal as described above in reference to FIGS. 2A-2F. As a non-limiting example, the processor 201 may emit the control signal by emitting a pulse width modulated signal. In some embodiments, the processor 201 maps the off time to a voltage level of a voltage control signal. The processor 201 may transmit a series of pulses having an average voltage level substantially equal to the mapped voltage level; where there is a PWM to DC converter 202, the converter 202 may convert the signal to a voltage control signal, as described above in reference to FIGS. 2A-2F. In some embodiments, the processor 201 executes a running averaging filter as described above in reference to FIGS. 2A-2F. For instance, the processor 201 may sense a plurality of off-times in the modified alternating current signal, and calculate an average of the plurality of off times. The processor 201 may emit the control signal based on the calculated average.

Figure 6:
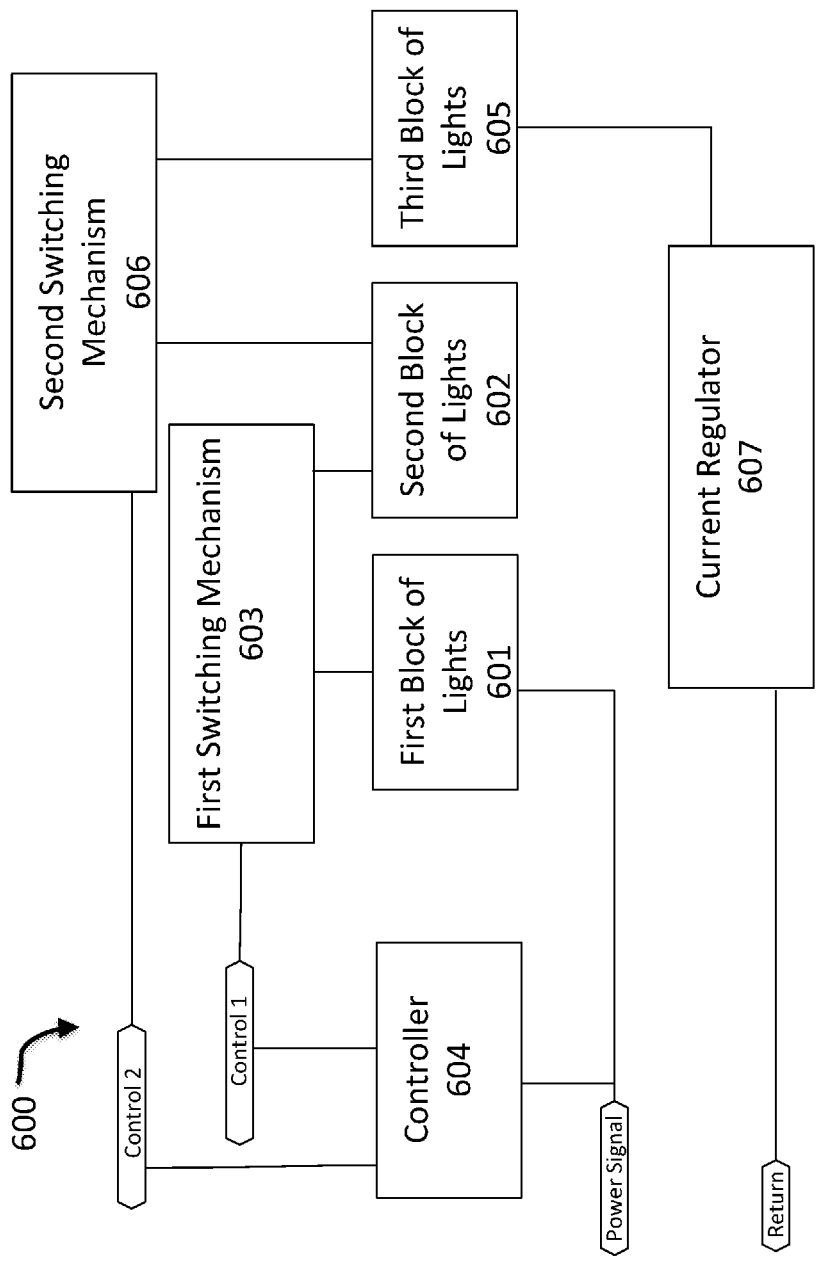
FIG. 6 is a block diagram illustrating an embodiment of an automatically reconfiguring light-emitting circuit.

FIG. 6 presents a block diagram of an embodiment of an automatically reconfiguring light-emitting circuit 600. The circuit 600 includes a first block of electric lights 601. The circuit includes a second block of electric lights 602. The circuit includes a first switching mechanism 603. The first switching mechanism 603 has a first state in which the first switching mechanism electrically connects the first block of electric lights 601 in parallel with the second block of electric lights 602. The first switching mechanism 603 has a second state in which the first switching mechanism 603 electrically connects the first block of electric lights 601 in series with the second block of electric lights 602. The circuit 600 includes a controller 604 electrically connected to the first switching mechanism 603, the controller 604 configured to sample the voltage of a power signal to the first block of electric lights 601 and the second block of electric lights 602, to switch the first switching mechanism 603 to the first state when the voltage falls below a first threshold voltage, and to switch the first switching mechanism 603 to the second state when the voltage exceeds the first threshold voltage.

Viewing FIG. 6 in further detail, the circuit 600 includes a first block of electric lights 601. As further illustrated in FIG. 7A, the first block of electric lights 601 includes at least one electric light 701. The at least one electric light 701 may be any device that converts electrical energy to light; light may include visible light, as well as infra-red and ultraviolet light. Without limitation, the at least one electric light 701 may be fluorescent, incandescent, or electroluminescent. The at least one electric light 701 may be a light-emitting diode (LED). The at least one electric light 701 may be an organic light-emitting diode (OLED). In some embodiments, the first block of electric lights includes multiple electric lights; for instance, the first block 601 may include a plurality of LEDs, which may range to dozens or hundreds of LEDs. In some embodiments, where the at least one electric light 701 is a device that only functions when current flows in one direction, all of the electric lights are connected to accept current flow in a single direction. Where electrical lights in the first block are arranged to accept only one direction of current flow, the power signal may be rectified to cause current only to flow in that one direction; the rectification may be performed with any rectification circuit, including without limitation a half-wave rectifier, a full-wave rectifier, or a bridge rectifier. Where the current through the first block of lights 601 always flows in the same direction, the end of the first block 601 of lights into which positive current enters may be denoted the "positive end" of the first block of lights, while the end of the first block of lights 601 from which positive current exits may be denoted the "negative end" of the first block of lights.

The circuit includes a second block of electric lights 602. The second block of electric lights 602 may include any electric lights suitable for use in the first block of electric lights 601. The second block of lights 602 may include any number or configuration of electric lights suitable for the first block of lights 601. In some embodiments, the number of electric lights in the second block 602 differs from the number of electric lights in the first block 601; for instance, the number of lights in the second block 601 may be chosen to have a different total forward operating voltage, defined as the minimum voltage at which the block is emitting light, than the first block 602. In some embodiments, the number of lights in the first and second blocks are chosen so that switching the two blocks into a parallel configuration, in the first state of the first switching mechanism 603, causes a forward operating voltage that is a desired fractional value of the forward operating voltage of the series configuration produced by the second state of the first switching mechanism 603; as a non-limiting example, the desired fractional value may be one half of the forward operating voltage of the configuration in the second state of the first switching mechanism 603. Where the current through the second block of lights 602 always flows in the same direction, the end of the second block 602 of lights into which positive current enters may be denoted the "positive end" of the second block of lights 602, while the end of the second block of lights 602 from which positive current exits may be denoted the "negative end" of the second block of lights 602. Similarly, the entire portion of the circuit containing the first and second block of lights may be denoted the "light circuit"; the point where the positive current enters the light circuit may be denoted the "positive end" of the light circuit, while the point where the positive current exits the light circuit may be denoted the "negative end" of the light circuit.

In some embodiments, the first block of lights 601 is connected to the second block of lights 602 by one or more diodes 702 that permit current to flow between the first and second blocks of lights when the first switching mechanism 603 is one of the first and second states, but do not permit current to flow between the first and second blocks of lights when the first switching mechanism 603 is in the other of the first and second states. The one or more diodes 702 may be positioned so that the one or more diodes is forward biased, and conducting, when the first block of lights 601 is in series with the second block of lights 602, and reverse-biased, and therefore not conducting, when the first block of lights 601 is in parallel with the second block of lights 602. For example, in the embodiment illustrated in FIG. 7A, negative end of first block of lights 601 is connected to the positive end of the second block of lights by a diode 702 that forward biases in the same direction as the LEDs depicted in the first and second block of lights, so that when no other connection is made between the first block of lights 601 and the second block of lights 602, the diode is forward-biased, and current flows from the first block of lights 601 through the second block of lights 602; continuing the example, if the positive end of the second block of lights 602, denoted "2" in FIG. 7A, is connected to the positive end, denoted "plus," of the light circuit, and the negative end the first block of lights 601, denoted "1" is connected to the negative end for the light circuit, denoted "minus," the potential difference between the first block of lights 601 and the second block of lights 602 is no longer sufficient to forward-bias the diode 702, which will not conduct.

Referring again to FIG. 6, the circuit includes a first switching mechanism 603. The first switching mechanism 603 has a first state in which the first switching mechanism electrically connects the first block of electric lights 601 in parallel with the second block of electric lights 602. The first switching mechanism 603 has a second state in which the first switching mechanism 603 electrically connects the first block of electric lights 601 in series with the second block of electric lights 602. In some embodiments, as illustrated for example in FIG. 7A, the first switching mechanism 603, when in the first state, connects the positive end of the first block of lights 601 to the positive end of the second block of lights 602; the connection may be direct, or may pass through one or more additional circuit elements. Each of the first block of lights 601 and second block of lights 602 may be connected to the negative end of the light circuit, either directly or by way of one or more additional circuit elements. For instance, where the second block of lights 602 is be connected in series or in parallel with a third light circuit as set forth in further detail below, the second block of lights 602 may be connected to the negative end of the light circuit by way of the third block of lights.

In the second state of the first switching mechanism 603 the first switching mechanism may connect the negative end of the first block of lights 601 to the positive end of the second block of lights 602; where there is a diode connecting the negative end of the first block of lights 601 to the positive end of the second block of lights 602, the switching mechanism may accomplish the series connection by blocking connection between the positive end of the first block of lights 601 and the positive end of the second block of lights 602, forward-biasing the diode 702 to electrically connect the negative end of the first block of lights 601 to the positive end of the second block of lights 602 as described above. The switching mechanism may alternatively effect the connection using a transistor or other device.

In some embodiments, the first switching mechanism 603 includes at least one transistor. For instance, as illustrated in FIG. 7A, the first switching mechanism 603 may include a first transistor 703 that switches on to connect the positive end of the first block of lights 601 to the positive end of the second block of lights 602, as described above. The first transistor 703 may be any transistor suitable for transmitting a power signal from one portion of a circuit to another. For example, the first transistor 703 may be a MOSFET, such as a power MOSFET. The first transistor 703 may be a p-channel MOSFET or an n-channel MOSFET. In some embodiments, the first transistor 703 receives gate voltage directly from an output from the controller 604. In other embodiments, the first transistor 703 receives its gate voltage from a control transistor 704, which is in turn controlled by a signal from the controller 604. As a non-limiting example, the controller 604 may send a signal to switch on the control transistor 704, which may be any suitable transistor. The current through the control transistor 704 may act to set the voltage of the first transistor 703 gate to turn on the first transistor 703; for instance, where the first transistor 703 is a p-channel MOSFET, the control transistor 704 may provide a path to return that pulls down the voltage at the gate of the first transistor 703, turning the first transistor 703 on so that the first transistor 703 conducts, and connects the positive end of the first block of lights 601 to the positive end of the second block of lights 602.

The first switching mechanism 603 may include a second transistor 705 that connects the negative end of the first block of lights 601 to the negative end of the light circuit when the first switching mechanism 603 is in the first state. The second transistor 705 may be any transistor suitable for transmitting a power signal from one portion of a circuit to another. For example, the second transistor 705 may be a MOSFET, such as a power MOSFET. The second transistor 705 may be a p-channel MOSFET or an n-channel MOSFET. In some embodiments, the second transistor 705 receives gate voltage directly from an output from the controller 604. In other embodiments, the second transistor 705 receives its gate voltage from a control transistor 704, which is in turn controlled by a signal from the controller 604. As a non-limiting example, the controller 604 may send a signal to switch on the control transistor 704, which may be any suitable transistor. The current through the control transistor 704 may act to set the voltage of the second transistor 705 gate to turn on the second transistor 705; for instance, where the second transistor 705 is a p-channel MOSFET, the control transistor 704 may provide a path to return that pulls down the voltage at the gate of the second transistor 705, turning the second transistor 705 on so that the second transistor 705 conducts, and connects the negative end of the first block of lights 601 to the negative end of the light circuit (here denoted "minus"). In some embodiments, as illustrated in FIG. 7A, a single control transistor 704 controls both the first transistor 703 and the second transistor 705; alternatively each of the first transistor 703 and second transistor 705 may have its own control transistor.

In some embodiments, as described above, the first switching mechanism 603 enters the second state by severing the connection between the positive end of the first block of lights 601 and the positive end of the second block of lights 602; the diode 702 may then be forward-biased, permitting a series connection. In other embodiments, the first switching mechanism 603 includes one or more transistors (not shown) that connect the first block of lights 601 and second block of lights 602 in series; for instance, a transistor may connect the negative end of the first block of lights 601 to the positive end of the second block of lights 602.

Referring again to FIG. 6, the circuit 600 includes a controller 604 electrically connected to the first switching mechanism 603. The controller 604 may be any device suitable for use as a controller 201 as described in reference to FIG. 2B or as a controller 304 as described in reference to FIG. 3B. The controller 604 is configured to sample the voltage of a power signal to the first block of electric lights 601 and the second block of electric lights 602. The power signal may be variable. In some embodiments, the power signal may be modeled by a substantially periodic waveform. The power signal may be substantially sinusoidal; for instance, the power signal may be in the form of alternating current. In other embodiments, the power signal is a rectified alternating current waveform; for instance, the power signal may be a half-wave rectified waveform. In other embodiments, the power signal is a full-wave rectified wave form, for instance reasonably approximated by $|\sin(\omega t+\phi)|$. As illustrated in FIG. 7C, the power signal may be produced by way of a rectifier 103, which may be a half-wave, full-wave, or bridge rectifier as described above in reference to FIGS. 1A-1C.

In some embodiments, as illustrated in FIG. 7C, the controller 604 samples the power signal by sampling the voltage of a resistive divider 706. The resistive divider 706 may act to scale the amplitude of the power signal so that the amplitude of the power signal is within a tolerable range for the input of the controller 604. The resistive divider 706 may also be connected to a voltage-limiting device 707 that acts to clamp the voltage within a safe range for the controller 604 inputs. The voltage-limiting device 707 may be a zener diode. The voltage-limiting device 707 may include a dual Schottky diode that limits the voltage to within a safe range between the DC 2 and return.

In some embodiments, the controller 604 samples the power signal by converting the waveform using an analog-to digital converter; the analog to digital converter may be incorporated in the controller 604 itself; for instance, the controller 604 may be configured to convert the input from a pin (e.g. the pin denoted "5" in the controller in FIG. 7C) to digital using an analog to digital conversion protocol. The controller 604 is configured to switch the first switching mechanism 603 to the first state when the voltage falls below a first threshold voltage, and to switch the first switching mechanism 603 to the second state when the voltage exceeds the first threshold voltage. The controller 604 may be configured to detect when the voltage level represented by the converted waveform falls below the first voltage threshold, and to activate the first switching device 603 to switch to the first state; this may be accomplished by sending a voltage signal to the first transistor 703, second transistor 705, or control transistor 704 as described above in reference to FIG. 7A. Likewise, the controller 604 may be configured to determine that the converted waveform has exceeded the first threshold voltage and to switch the first switching device 603 to the second state; this may be accomplished, for instance, by setting voltage at the gate of the first transistor 703, second transistor 705, or control transistor 704 so that the first transistor 703 and second transistor 705 switch off, as described above.

In some embodiments, when a waveform such as a rectified AC waveform supplies power to the first block of lights 601 and second block of lights 602, the controller 604 samples the waveform. In such embodiments, when the waveform is at its minimum value, the first block of lights 601 and second block of lights 602 are in parallel, and as a result have a lower total forward operating voltage than they would have if in series; as a result, the first and second block of lights being emitting light when the waveform voltage is still low. In such embodiments, as the waveform rises, the voltage being supplied to the first and second block of lights increases, reaching the first threshold; the controller 604, detecting the arrival at the threshold, uses the first switching mechanism 603 to place the first block of lights 601 and second block of lights 602 in series. If the threshold voltage is correctly selected, the series arrangement will occur when the waveform voltage is high enough to cause light emission at the higher forward operating voltage of the series configuration. As the waveform descends again from its peak, the controller 604 may sense the waveform's passage below the first threshold, and switch the first block of lights 601 and second block of lights 602 back into parallel, so that they continue emitting light as the voltage decreases.

Referring again to FIG. 6, in some embodiments the circuit 600 includes a third block of electric lights 605. The third block of electric lights 605 may be any block of lights suitable for use as the first block of lights 601 or the second block of lights 602. The end of the third block of lights 605 into which positive current enters may be referred to as the "positive end." The end of the third block of lights 605 out of which positive current flows may be referred to as the "negative end." The circuit 600 may also include a second switching mechanism 606. The second switching mechanism 606 may be able to switch between a first state in which the second switching mechanism 606 electrically connects the second block of electric lights 602 in parallel with the third block of electric lights 605 and a second state in which the second switching mechanism 606 electrically connects the second block of electric lights 602 in series with the third block of electric lights 605.

Figure 7B:
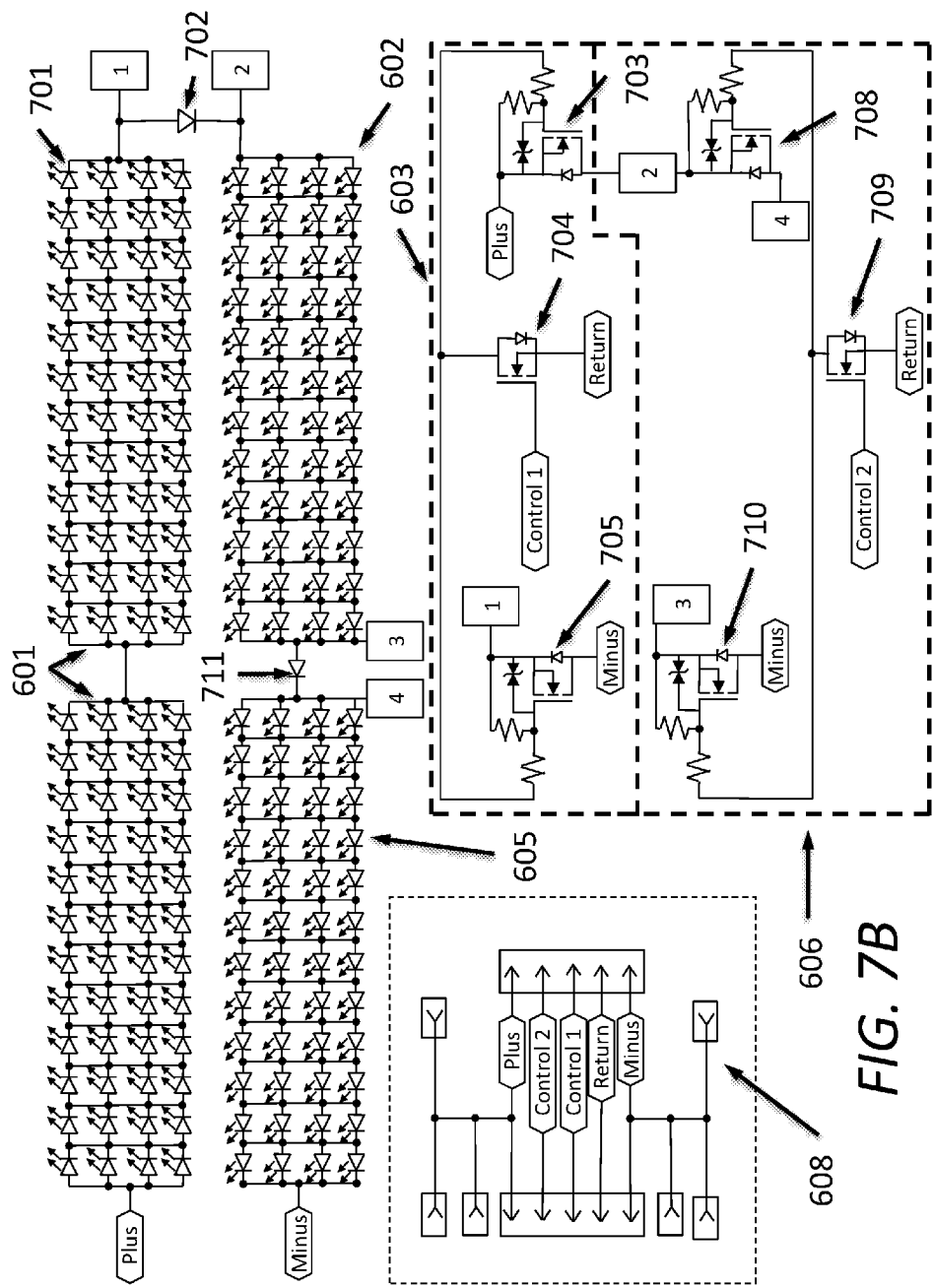
FIG. 7B is a schematic diagram illustrating part of an embodiment of an automatically reconfiguring light-emitting circuit.
Figure 7C:
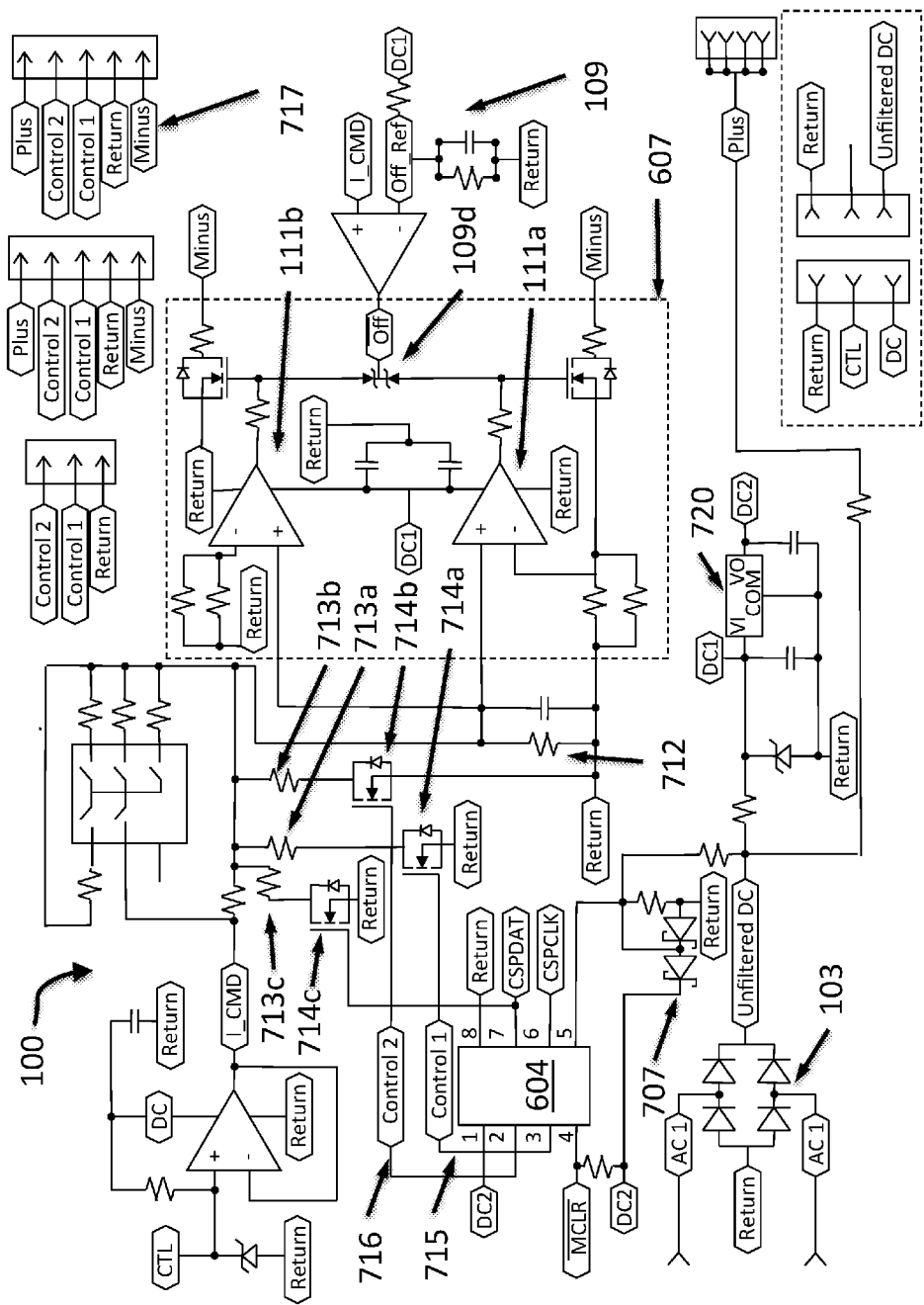
FIG. 7C is a schematic diagram illustrating part of an embodiment of an automatically reconfiguring light-emitting circuit.

Referring now to FIG. 7B, in some embodiments, the second switching mechanism 606 includes at least one transistor. For instance the second switching mechanism 606 may include a third transistor 708 that switches on to connect the positive end of the third block of lights 605 to the positive end of the second block of lights 602, as described above. The third transistor 708 may be any transistor suitable for transmitting a power signal from one portion of a circuit to another. For example, the third transistor 708 may be a MOSFET, such as a power MOSFET. The third transistor 708 may be a p-channel MOSFET or an n-channel MOSFET. In some embodiments, the third transistor 708 receives gate voltage directly from an output from the controller 604. In other embodiments, the third transistor 708 receives its gate voltage from a control transistor 709, which is in turn controlled by a signal from the controller 604. As a non-limiting example, the controller 604 may send a signal to switch on the control transistor 709, which may be any suitable transistor. The current through the control transistor 709 may act to set the voltage of the third transistor 708 gate to turn on the third transistor 708; for instance, where the third transistor 708 is a p-channel MOSFET, the control transistor 709 may provide a path to return that pulls down the voltage at the gate of the third transistor 708, turning the third transistor 708 on so that the third transistor 708 conducts, and connects the positive end of the second block of lights 602, denoted in the figure by the number 2, to the positive end of the third block of lights 605, denoted in the figure by the number 4.

The second switching mechanism 606 may include a fourth transistor 710 that connects the negative end of the second block of lights 602 to the negative end of the third block of lights 605 when the second switching mechanism 606 is in the first state. The fourth transistor 710 may be any transistor suitable for transmitting a power signal from one portion of a circuit to another. For example, the fourth transistor 710 may be a MOSFET, such as a power MOSFET. The fourth transistor 710 may be a p-channel MOSFET or an n-channel MOSFET. In some embodiments, the fourth transistor 710 receives gate voltage directly from an output from the controller 604. In other embodiments, the fourth transistor 710 receives its gate voltage from a control transistor 709, which is in turn controlled by a signal from the controller 604. As a non-limiting example, the controller 604 may send a signal to switch on the control transistor 709, which may be any suitable transistor. The current through the control transistor 709 may act to set the voltage of the fourth transistor 710 gate to turn on the fourth transistor 710; for instance, where the fourth transistor 710 is a p-channel MOSFET, the control transistor 709 may provide a path to return that pulls down the voltage at the gate of the fourth transistor 710, turning the fourth transistor 710 on so that the fourth transistor 710 conducts, and connects the negative end of the second block of lights 602 to the negative end of the third block of lights 605, which in some embodiments is the same as the negative end of the light circuit (here denoted "minus"). In some embodiments, as illustrated in FIG. 7B, a single control transistor 709 controls both the third transistor 708 and the fourth transistor 710; alternatively each of the third transistor 708 and fourth transistor 710 may have its own control transistor.

In some embodiments, the second block of lights 602 is connected to the third block of lights 605 by one or more diodes 711 that permit current to flow between the second and third blocks of lights when the second switching mechanism 606 is one of the first and second states, but do not permit current to flow between the second and third blocks of lights when the second switching mechanism 606 is in the other of the first and second states. The one or more diodes 711 may be positioned so that the one or more diodes is forward biased, and conducting, when the second block of lights 602 is in series with the third block of lights 605, and reverse-biased, and therefore not conducting, when the second block of lights 602 is in parallel with the third block of lights 605. For example, in the embodiment illustrated in FIG. 7B, negative end of second block of lights 602 is connected to the positive end of the third block of lights 605 by a diode 711 that forward biases in the same direction as the LEDs depicted in the second and third block of lights, so that when no other connection is made between the second block of lights 602 and the third block of lights 605, the diode 711 is forward-biased, and current flows from the second block of lights 602 through the third block of lights 605; continuing the example, if the positive end of the second block of lights 602, denoted "2" in FIG. 7A, is connected to the positive end, denoted "4" of the third block of lights 605, and the negative end the third block of lights 605, denoted "minus," is connected to the negative end of the second block of lights 602, denoted "3," the potential difference between the second block of lights 602 and the third block of lights 605 is no longer sufficient to forward-bias the diode 711, which will not conduct.

In some embodiments, as described above, the second switching mechanism 606 enters the second state by severing the connection between the positive end of the third block of lights 605 and the positive end of the second block of lights 602. Where there is a diode 711 connecting the two blocks, the diode 711 may then be forward-biased, permitting a series connection. In other embodiments, the second switching mechanism 606 includes one or more transistors (not shown) that connect the third block of lights 605 and second block of lights 602 in series; for instance, a transistor may connect the negative end of the second block of lights 602 to the positive end of the third block of lights 605.

In some embodiments, the controller 604 is further configured to detect that the voltage of the power signal is below a second threshold, and to switch the second switching mechanism 606 to the first state. In some embodiments, the controller 604 is also configured to detect that the power signal is above the second threshold, and to switch the second switching mechanism 606 to the second state. The threshold detection may be performed in the same manner as the detection of the first threshold, as described above.

In some embodiments, the controller 604 is further configured to switch the second switching mechanism 606 to the first state when the voltage waveform falls below the first threshold. For instance, the controller could be configured to keep the third block of lights 605 and second block of lights 602 in series with each other but in parallel with the first block of lights 601 while the waveform is below the first threshold and to switch the second switching mechanism 606 to place the second block of lights 602 and third block of lights 605 in parallel while switching the first switching mechanism 603 to place the second block of lights 602 and third block of lights 605 in parallel with each other when the waveform is above the first threshold; as a result, the second 602 and third 605 block of lights may each be in series with the first block of lights 601. The controller 604 may be further configured to switch the second switch 606 to the second position when the power signal voltage exceeds the second threshold (which may be higher than the first threshold), so that at the peak of the waveform, the first 601, second 602, and third 605 blocks of lights are all in series.

Continuing the above example, the forward operating voltages of the first 601, second 602 and third 603 blocks of lights may be chosen so that the three series and parallel combinations described above produce desired fractional values of the forward operating voltage of the three blocks in series. For instance, if each of the second block of lights 602 and the third block of lights 605 has one half the forward operating voltage of the first block of lights 601, then in the above example the light circuit will have twice the forward operating voltage of the first block of lights 601 when the signal voltage is above the second threshold and all three blocks are in series; thus, below the first threshold, when the second and third blocks in series are parallel with the first block 601, the light circuit forward operating voltage may be at 50% forward operating voltage of the full series configuration, or equal to the forward operating voltage of the first block 601. Continuing the example, above the first threshold but below the second threshold, when the first block 601 is in series with a parallel combination of the second 602 and third 605 blocks, the forward operating voltage of the light circuit will be 75% of the forward operating voltage of the full series configuration, or 1.5 times the forward operating voltage of the first block of lights 601.

Returning again to FIG. 6, the circuit 600 may include a current regulator 607. The current regulator 607 may act to limit the current supplied to the light circuit by the power signal. The current regulator 607 may be any suitable current regulator, including a current sink. In some embodiments, the current regulator 607 is an embodiment of the current regulator 105 described above in reference with FIGS. 1A-1D. The controller 604 may be configured to adjust the current regulator 607 to increase or decrease the current supplied to the light circuit in response to changes in the voltage waveform of the power signal. In some embodiments, the controller 604 changes the current level permitted by the current regulator 607 upon the detection that the voltage waveform of the power signal has exceeded or fallen below at least one threshold. The at least one threshold may include the first threshold. The at least one threshold may include the second threshold. The at least one threshold may include one or more thresholds that are above, below, or between the first and second thresholds. For instance, the controller 604 may have a first current-changing threshold between zero volts and the first threshold, a second current-changing threshold at the first threshold, a third current-changing threshold between the first threshold and the second threshold, a fourth current-changing threshold at the second threshold, and a fifth current-changing threshold between the second current-changing threshold and the peak of the power signal voltage waveform.

In some embodiments, the controller 604 causes the current regulator 607 to change the current level based on the voltage waveform crossing the one or more current thresholds. The current regulator may have a default setting from the perspective of the controller 604; that is, absent a command from the controller 604, the current regulator 607 may be set to allow a certain amount of current. The default setting of the current regulator 607 may be the default setting to which the current regulator reverts when receiving no input. The default setting of the current regulator 607 may be a current level to which the current regulator is set by another device; for instance, the default setting current regulator 607 may be set manually by a switch, such as the resistive divider switch 108. The default setting of the current regulator 607 may be set using a control signal as described above for the current regulator 105 in connection with FIGS. 1A-C. Thus, for instance, a user may set the dimmer control signal input 314 using a manual dimmer switch or remote device, causing the control signal to the current regulator 607 to establish the default current setting.

In some embodiments, the controller 604 modifies the current level permitted by the current regulator 607 in response to the waveform crossing the one or more thresholds by setting the current level to a percentage of the default setting. In some embodiments, the default setting is the maximum level to which the controller 604 may set the current regulator 607, and the percentages to which the controller 604 sets the current regulator 607 are 100% or less. For example, when the waveform is below the first current change threshold, for instance because the controller 604 detected that the waveform had fallen below the first current change threshold, the controller 604 may set the current regulator 607 to a first percentage of the default setting, which may be a relatively low percentage; for the purposes of illustration, the low percentage may be 20%. Continuing the example, when the waveform exceeds the first current change threshold, the controller 604 may set the current regulator 607 to a second percentage of the default setting, which may be greater than the first percentage; the higher percentage may, as a non-limiting example, be 30% of the default setting. Further continuing the example, when the voltage waveform of the power signal exceeds the second current change threshold, which may be the first threshold described above, the controller 604 may set the current regulator 607 to a third percentage of the default setting; the third percentage may be greater than the second percentage. As a non-limiting example, the third percentage may be 45% of the default setting. Still further continuing the example, when the voltage waveform exceeds the third current change threshold, the controller 604 may set the current regulator 607 to a fourth percentage of the default setting; the fourth percentage may be greater than the third percentage. As a non-limiting example, the fourth percentage may be 54% of the default setting. Continuing the example, when the voltage waveform exceeds the fourth current change threshold, which may be the second threshold described above regarding commands to the switching mechanisms 603, 606, the controller 604 may set the current regulator 607 to a fifth percentage of the default setting; the fifth percentage may be greater than the fourth percentage. As a non-limiting example, the fifth percentage may be 83% of the default setting. Further continuing the example, when the voltage waveform exceeds the fifth current change threshold, the controller 604 may set the current regulator 607 to a sixth percentage of the default setting; the sixth percentage may be 100% of the default setting.

The controller 604 may also modify current levels in response to a descending power signal voltage waveform. The commands to modify the current levels in response to the descending waveform may complement the commands to modify the current levels in response to the ascending waveform. As a non-limiting example, when the voltage waveform descends below the fifth current change threshold, the controller 604 may set the current regulator 607 to the fifth percentage. Continuing the example, when the voltage waveform descends below the fourth current change threshold, the controller 604 may set the current regulator 607 to the fourth percentage. Further continuing the example, when the voltage waveform descends below the third current change threshold, the controller 604 may set the current regulator 607 to the third percentage. Still further continuing the example, when the voltage waveform descends below the second current change threshold, the controller 604 may set the current regulator 607 to the second percentage. Continuing the example yet again, when the voltage waveform descends below the first current change threshold, the controller 604 may set the current regulator 607 to the first percentage.

In some embodiments, where the current regulator 607 sets its current level according to a control signal as described above in reference to FIGS. 1A-C, the controller 604 modifies the current level of the current regulator 607 by modifying the control signal. For instance, as illustrated in 7C, the current regulator 607 may set one or more transistors to a given resistance level, based on the voltage difference between a feedback network at the inverting input terminal of one or more operational amplifiers and a voltage proportional to the control signal voltage at the non-inverting input terminal of the one or more operational amplifiers, as described above in reference to FIGS. 1B-C. Continuing the example, the controller 604 may modify the voltage level produced by the control signal, to change the setting of the power transistors. For instance, the default setting of the current regulator 607 may use the voltage across a default resistor 712 as the voltage at the positive terminal of the one or more operational amplifiers. The controller 604 may reduce the voltage across the default resistor 712 by putting the default resistor 712 in parallel with one or more signal modifying resistors 713a-c. For instance, the controller 604 may modify the control terminal voltage of a first signal modifying transistor 714a to allow current to flow through a first current modifying resistor 713a. The controller 604 may modify the control terminal voltage of a second signal modifying transistor 714b to allow current to flow through a second current modifying resistor 713b. The controller 604 may modify the control terminal voltage of a third signal modifying transistor 714c to allow current to flow through a third current modifying resistor 713c. Although three signal modifying resistors 713a-c are depicted in FIG. 7C, there may be more or fewer signal modifying resistors and signal modifying transistors 714a-c in other embodiments.

The controller 604 may place the default resistor 712 and one or more of the signal modifying resistors 713a-c in parallel in any combination that produces the desired control signal to set the current regulator to the desired percentage. As a non-limiting example, the controller 604 may place a first signal modifying resistor 713a in parallel with the default resistor 712 when the voltage waveform is below the first threshold, and a second signal modifying resistor 713b in parallel with the default resistor when the voltage waveform is above the first threshold and below the second threshold; continuing the example, the controller 604 may use a third signal modifying resistor 713c to set the current at intermediate levels between those established by the default resistor 712, the first signal modifying resistor, and the second signal modifying resistor 713b, by placing the third signal modifying resistor 713c in parallel with combinations of the default resistor 712, first signal modifying resistor 713a and second signal modifying resistor 713b. As a further illustration of the example, and referring to the example above for setting the current at percentages of the default current, the controller 604 may set the current regulator 607 at a first, lowest percentage of the default current by placing the third signal modifying resistor 713c in parallel with the default resistor 712. Further continuing the example, the controller may set the current regulator 607 at the second percentage by placing the first signal modifying resistor 713a in parallel with the third signal modifying resistor 713c and the default resistor 712. Still further continuing the example, the controller 604 may set the current regulator 607 at the third percentage by removing the third signal modifying resistor 713c and leaving the first signal modifying resistor 713a in parallel with the default resistor 712. Continuing the example again, the controller 604 may set the current regulator 607 at the fourth percentage by placing the third signal modifying resistor 713c and second signal modifying resistor 713b in parallel with the default resistor 712 (and removing the first signal modifying resistor 713a from the parallel combination). Continuing the example yet again, the controller 604 may set the current regulator 607 to the fifth percentage by removing the third signal modifying resistor 713c from the parallel combination, leaving the second signal modifying resistor 713b in parallel with the default resistor 712. Further continuing the example, the controller 604 may set the current regulator 607 to the sixth percentage by removing the second signal modifying resistor 713b from the parallel combination, leaving the default resistor 712 to regulate the current level without further modification.

Where a current change threshold is the same as a threshold to change the voltage by reconfiguring the light circuit as described above, the controller 604 may use the same wire to command both the change in current and the reconfiguration. For instance, the first control signal may be conveyed by a first control signal wire 715. The first control signal wire 715 may be electrically connected both to the first switching mechanism 603 and to the first signal modifying transistor 714*a*. Likewise, the second control signal may be transmitted by the controller 604 on a second control signal wire 716, which may be electrically connected to the second switching mechanism 606 and to the second signal modifying transistor 714*b*. In some embodiments, a header 717 connects the current regulator 607 and controller 604 to a corresponding header 608 incorporated in the light circuit and first and second switching mechanisms 603, 606. The headers 717, 608 may use any kind of connector to join them, including a ribbon cable, compact connector, or a soldered connection. In some embodiments, the header 608 of the light circuit and switching mechanisms has multiple terminals 608*a*, 608*b*, so that multiple such circuits may be connected in parallel or in series; in some embodiments, the current or voltage supplied by the current regulator 607 is adjusted to account for the greater current or voltage required by daisy-chained lighting circuits.

Persons skilled in the art will be aware that further combinations of the signal modifying resistors 713*a-c* and the default resistor 712 may be used to set differing levels of current, by modifying the programming of the controller 604; likewise, one or more of the above-described resistor combinations may be omitted, omitting one or more of the above-described percentages, without deviating from the concepts described herein. In other embodiments, one or more of the signal modifying resistors 713*a-c* may include a circuit element with variable resistance. For instance, one or more of the signal modifying transistors 714*a-c* may be turned partially on by the controller 604, creating a variable resistance the controller 604 modifies; the controller 604 may convey a varying voltage to the one or more signal modifying transistors 714*a-c* using a digital to analog converter (not shown) or a capacitive averaging network such as the PMW to DC converter 202 described above in reference to FIGS. 2A-2B. As a non-limiting example, the third signal modifying transistor 714*c* may be controlled to have a variable resistance, allowing substantially continuous interpolation of the current waveform output by the current regulator 607.

Embodiments of the above-described automatically reconfiguring light-emitting circuit are able to reduce total harmonic distortion by changing the forward voltage of the light circuit to approximate the voltage waveform of an alternating current power signal. The circuit may also modify the current to the light circuit to reduce total harmonic distortion; where the current modification is performed by altering a control signal to a current regulator, the disclosed circuit may have the novel effect of permitting the user to control the overall intensity of the emitted light by setting the current level, while still modifying the current according to the waveform to reduce distortion.

Figure 8:
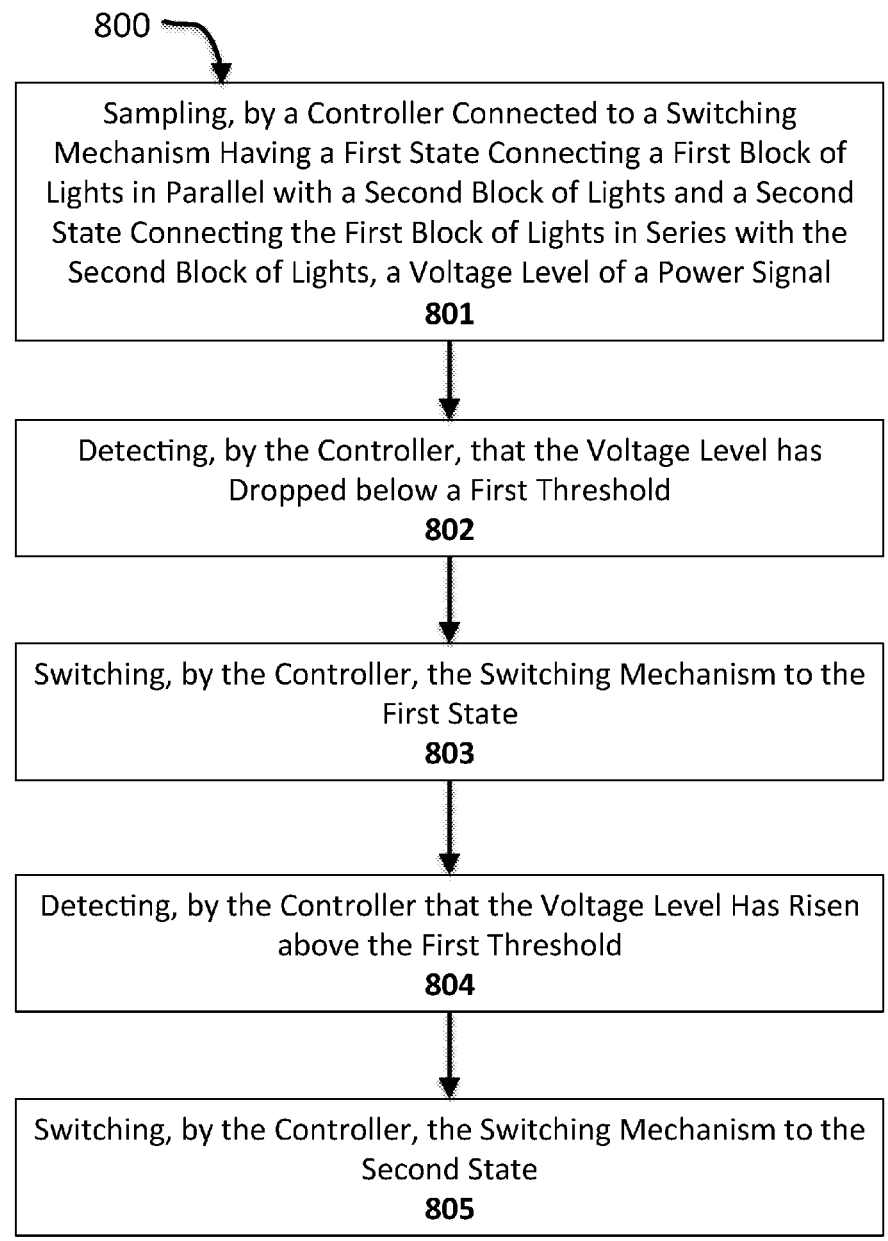
FIG. 8 is flow diagram illustrating a method for automatically reconfiguring a light-emitting circuit.

FIG. 8 illustrates some embodiments of a method 800 for reconfiguring a light-emitting diode mesh in response to a voltage signal. The method 800 includes sampling, by a controller connected to a first switching mechanism having a first state connecting a first block of lights in parallel with a second block of lights and a second state connecting the first block of lights in series with the second block of lights, a voltage level of a power signal (801). The method 800 includes detecting, by the controller, that the voltage level has dropped below a first threshold (802). The method 800 includes switching, by the controller, the first switching mechanism to the first state (803). The method 800 includes detecting, by the controller that the voltage level has risen above the first threshold (804). The method 800 includes switching, by the controller, the first switching mechanism to the second state (805).

Viewing FIG. 8 in further detail, and by reference to FIGS. 6-7C, the controller 604 samples the voltage level of a power signal (801). In some embodiments, this is implemented as described above in reference to FIGS. 6-7C.

The controller 604 detects that the voltage level has dropped below a first threshold (802). In some embodiments, this is implemented as described above in reference to FIGS. 6-7C.

The controller 604 switches the first switching mechanism 603 to the first state (803). In some embodiments, this is implemented as described above in reference to FIGS. 6-7C.

The controller 604 detects that the voltage level has risen above the first threshold (804). In some embodiments, this is implemented as described above in reference to FIGS. 6-7C.

The controller 604 switches the switching mechanism to the second state (805). In some embodiments, this is implemented as described above in reference to FIGS. 6-7C.

In some embodiments, as described above, the circuit includes a second switching mechanism 606 able to switch between a first state in which the second switching mechanism 606 electrically connects the second block of electric lights 602 in parallel with the third block of electric lights 605 and a second state in which the second switching mechanism 606 electrically connects the second block of electric lights 602 in series with the third block of electric lights 605; the controller 604 may detect that the voltage of the power signal is below a second threshold, and switch the second switching mechanism 606 to the first state. In some embodiments, this is implemented as described above in reference to FIGS. 6-7C. In some embodiments, the controller 604 detects that the power signal is above the second threshold, and switches the second switching mechanism 606 to the second state. This may be performed as described above in reference to FIGS. 6-7C.

In some embodiments, the controller 604 detects at least one current change threshold, and causes a current regulator 607 regulating the power signal to change from a first current level to a second current level in response to the detection. This may be implemented as described above in reference to FIGS. 6-7C. The at least one current change threshold may include one or more of the first and second thresholds, as described above. The at least one current threshold may also include one or more intermediate thresholds as described above.

Figure 9:
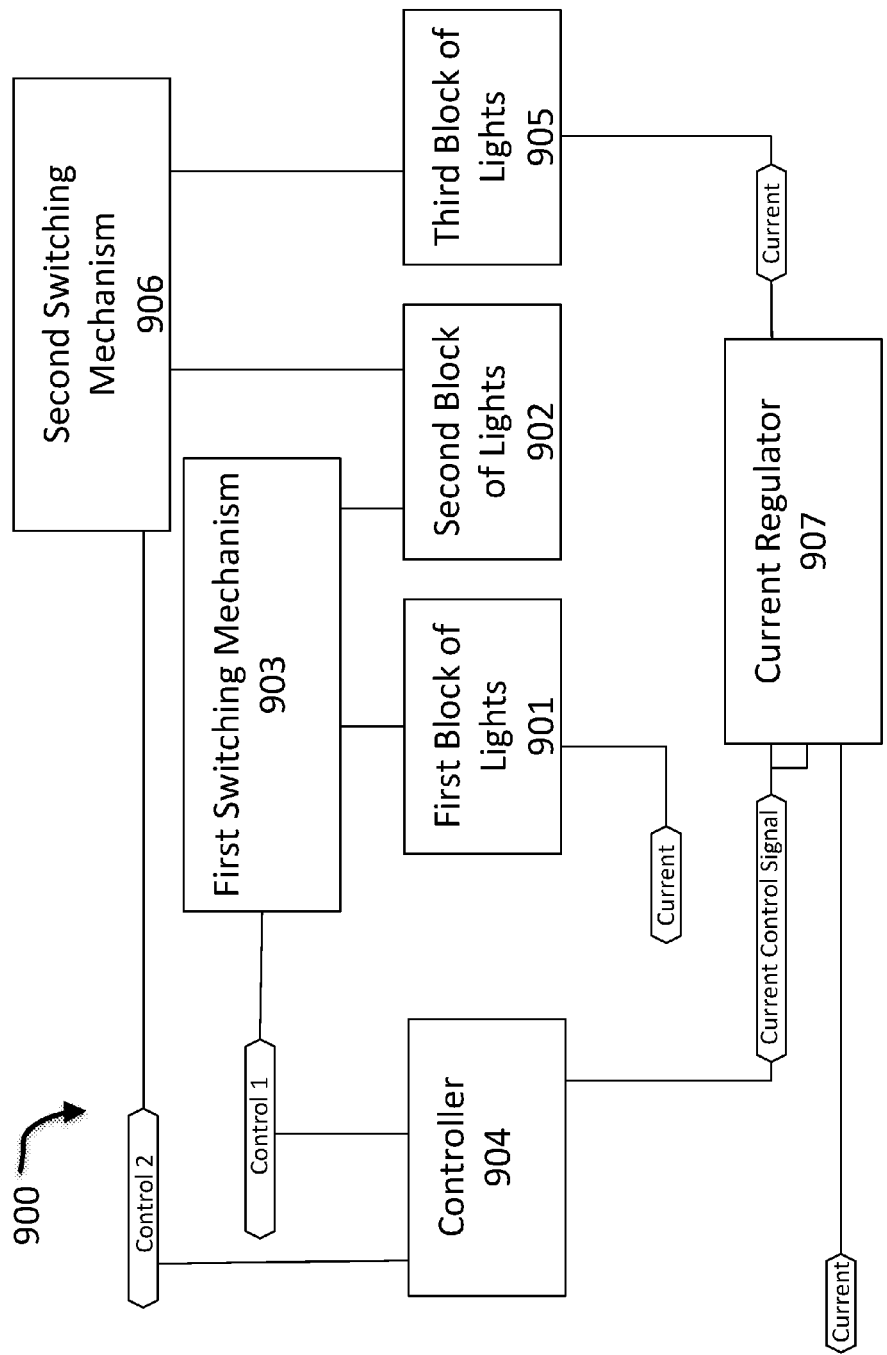
FIG. 9 is a block diagram illustrating an embodiment of an automatically reconfiguring light-emitting circuit.

FIG. 9 presents a block diagram of an embodiment of an automatically reconfiguring light-emitting circuit 900. The circuit 900 includes a first block of electric lights 901. The circuit includes a second block of electric lights 902. The circuit includes a first switching mechanism 903. The first switching mechanism 903 has a first state in which the first switching mechanism electrically connects the first block of electric lights 901 in parallel with the second block of electric lights 902. The first switching mechanism 903 has a second state in which the first switching mechanism 903 electrically connects the first block of electric lights 901 in series with the second block of electric lights 902. The circuit 900 includes a current regulator 907 that generates a current control signal in response to a current in the first block of lights 901 and second block of lights 902. The circuit 900 includes a controller 904 electrically connected to the first switching mechanism 903, the controller 904 configured to switch the switching mechanism 903 between the first state and the second state based on the current control signal.

Viewing FIG. 9 in further detail, the circuit 900 includes a first block of electric lights 901. The first block of electric lights 901 may be any block of lights suitable for use as the first block of electric lights 601 described above in connection with FIGS. 6-7C. The second block of lights 602 may be any block of lights suitable for use as the second block of electric lights 602 described above in connection with FIGS. 6-7C. The switching mechanism 903 may be any switching mechanism suitable for use as the switching mechanism 603 described above in connection with FIGS. 6-7C.

The circuit 900 includes a current regulator 907. The current regulator 907 may be any current regulator as described above in reference to FIGS. 1A-8; as a non-limiting example, the current regulator 907 may be a current sink. The current regulator 907 generates a current control signal. The current control signal may be a signal that regulates a component of the current regulator 907 through which the current flows, such as a power transistor as described in further detail below.

Figure 10A:
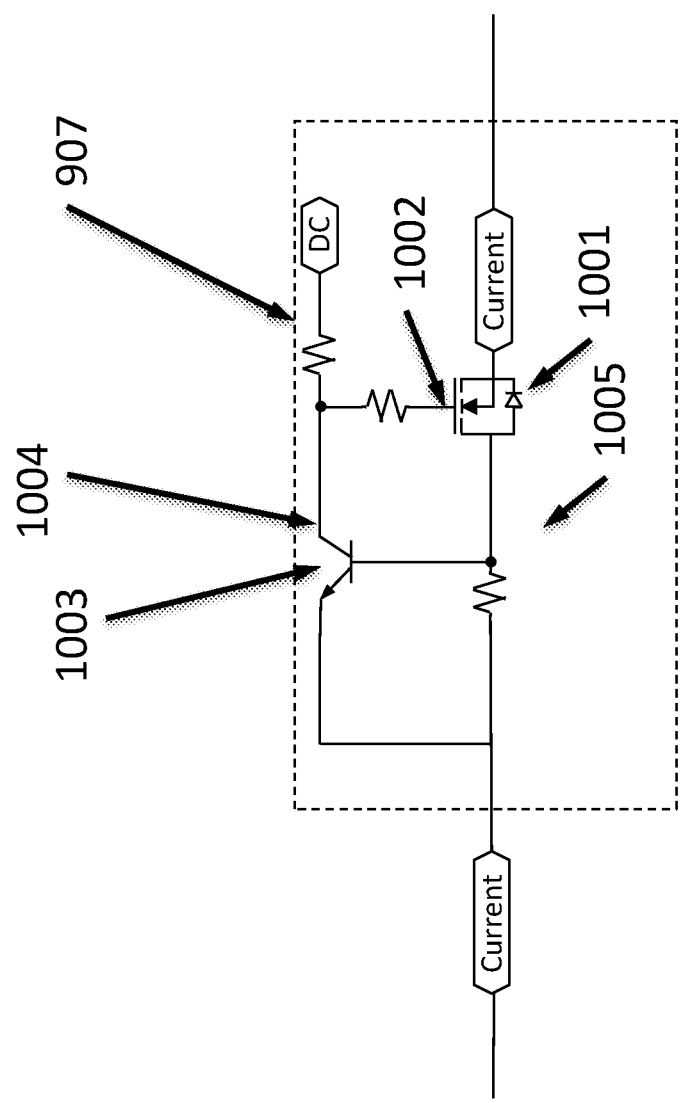
FIG. 10A is a schematic diagram illustrating an embodiment of a current regulator.

In some embodiments, as illustrated in FIG. 10A, the current regulator 907 includes at least one power transistor 1001 through which the current in the first group of lights and second group of lights flows. The at least one power transistor 1001 may be any transistor suitable for use as the at least one transistor 117 described above in reference to FIG. 1A. For instance, and without limitation, the at least one power transistor 1001 may include a MOSFET; the power transistor 1001 include a power MOSFET, designed to regulate current at high amperages. The at least one power transistor 1001 may have a control terminal 1002, as defined above in connection with FIGS. 1A-B. In some embodiments, the current control signal is a signal at the control terminal 1002 of the at least one power transistor 1001. In some embodiments, the current control signal causes the at least one power transistor 1001 to increase or decrease the effective resistance of the at least one power transistor 1001 to increase or decrease the amount of current that flows through the first block of lights 901 and second block of lights 902*b*.

Figure 10B:
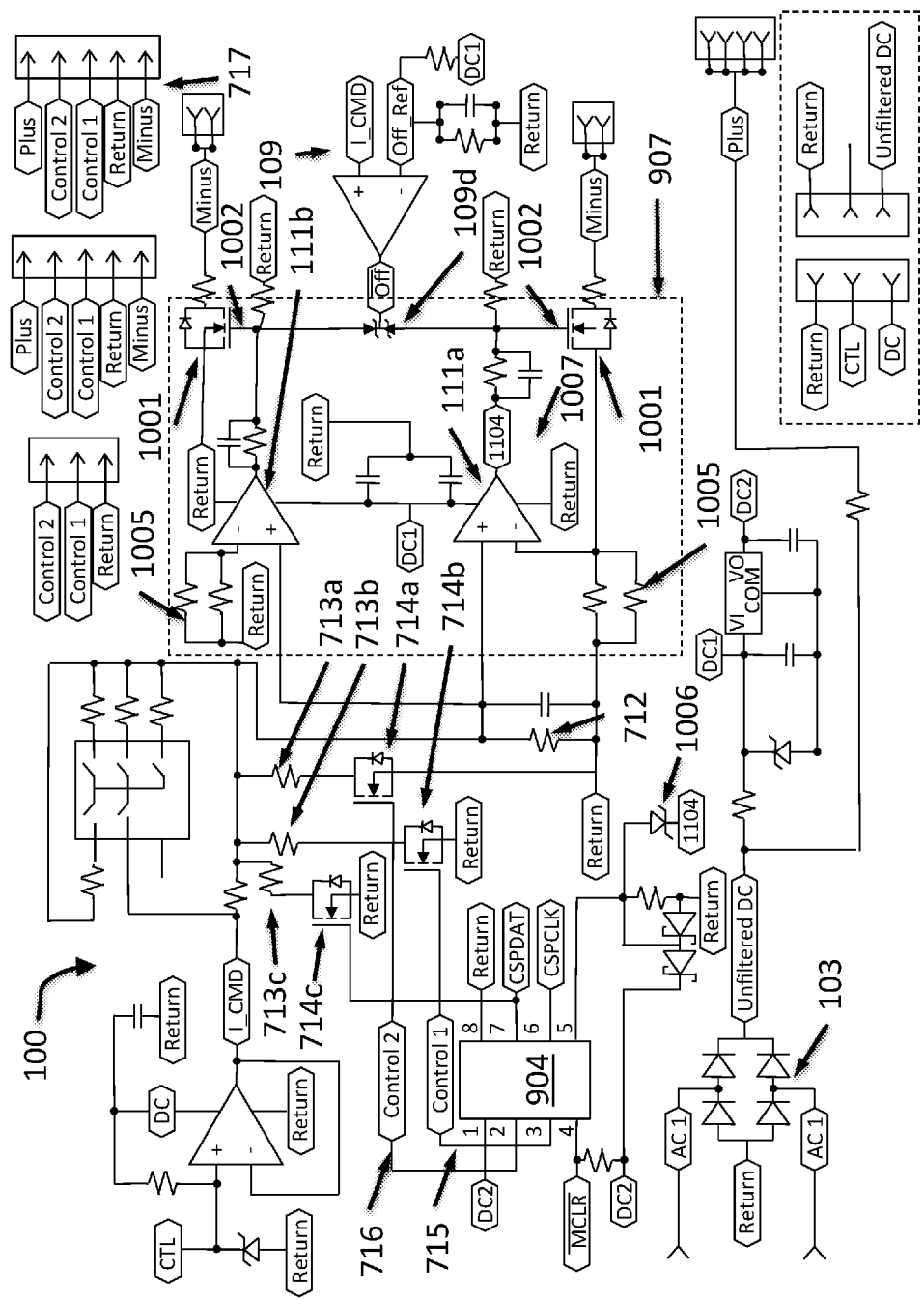
FIG. 10B is a schematic diagram illustrating part of an embodiment of an automatically reconfiguring light-emitting circuit.

The current regulator 907 may include at least one regulator transistor 1003*b*. The at least one regulator transistor 1003 may be any transistor suitable for use as a transistor 117 as described above in reference to FIGS. 1A-B. For instance, and without limitation, the at least one regulator transistor 1003 may be include bipolar junction transistor, a field-effect transistor, or a MOSFET. The at least one regulator transistor 1003 may have an output terminal 1004. The output terminal 1004 may a terminal through which current flows when the at least one regulator transistor 1003 is turned "on"; as a non-limiting example, the output terminal 1004 may be a source or drain terminal if the at least one regulator transistor 1003 is a MOSFET, or a collector or emitter terminal if the at least one regulator transistor 1003 is a bipolar junction transistor. In some embodiments, the current control signal is a signal generated at the output port 1004 of the at least one regulator transistor 1003. The at least one regulator transistor 1003 may be combined with one or more additional circuit elements to make up the current regulator 907. For instance, as shown in FIG. 10B, in some embodiments, the at least one current regulator includes at least one operational amplifier 111*a-b*. The at least one operational amplifier 111*a-b* may incorporate the at least one regulator transistor, for instance as one or more of the transistors making up the operational amplifier's circuitry.

As illustrated in FIGS. 10A-B, the current regulator 907 may include a negative feedback network 1005 supplying negative feedback based on the current to the current regulator 907. The negative feedback network 1005 may include one or more resistors. In some embodiments, the negative feedback network 1005 causes the current regulator 907 to act to decrease the current when the current increases, and to act to increase the current when the current decreases. For instance, where the current regulator 907 includes an operational amplifier 111*a-b* as shown in FIG. 10B, an increase of current through the negative feedback network 1005 causes the voltage at the inverting terminal of the amplifier 111*a-b* to increase, reducing the voltage difference between the inverting and non-inverting terminals of the amplifier 111*a-b*, causing the voltage output at the output terminal of the operational amplifier 111*a-b* to decrease, decreasing the gate voltage of the power transistor 1001 and increasing the effective resistance of the power transistor 1001. This may function as described above regarding current regulators in connection with FIGS. 1A-8.

The controller 904 may be any device suitable for use as a controller 604 as described above in reference to FIGS. 6-7C. One or more wires or circuit elements may convey the current control signal to the controller 904. The one or more wires or circuit elements may include resistors or resistive dividers (not shown) that reduce the voltage of the current control signal so that the voltage of the current control signal is within the voltage range for inputs to the controller 904. The one or more wires or circuit elements may include a Zener diode 1006 or similar device that reduces the voltage input to the controller 904 to a particular range; for instance, the Zener diode 1006 may drop the voltage output to the controller 904 to a value that the controller 904 interprets as between digital 1 and digital zero. Alternatively, a comparator (not shown) may convert the voltage output to a digital one or digital zero value based on a reference voltage. The connection from the current regulator 907 to the controller 904 may also include voltage clamping elements such as Schottkey diodes as described above in reference to FIGS. 6-7C.

Referring again to FIG. 9, in some embodiments the circuit 900 includes a third block of electric lights 905. The third block of electric lights 905 may be any block of lights suitable for use as the first block of lights 901 or the second block of lights 902. The third block of electric lights 905 may connect to the second 902 and first 901 blocks of lights The circuit 900 may also include a second switching mechanism 906. The second switching mechanism 906 may be able to switch between a first state in which the second switching mechanism 906 electrically connects the second block of electric lights 902 in parallel with the third block of electric lights 905 and a second state in which the second switching mechanism 906 electrically connects the second block of electric lights 902 in series with the third block of electric lights 905. The second switching mechanism 906 may be any switching mechanism suitable for use as the second switching mechanism 606 described above.

The controller 904 may be connected to one or more signal-modifying transistors 714*a-c* that permit current to flow through one or more signal-modifying resistors 713*a-c* as described above in reference to FIGS. 6-7C, to modify the control signal being conveyed to the current regulator 907.

In some embodiments, sampling the current control signal within a current regulator 907 enables the controller 904 to determine the state of the power waveform far more accurately than conventional methods that sample one or more parameters of the waveform itself to determine its state; this is because high-noise environments may cause samples of voltage or current in the power waveform to be inaccurate. Inaccurate readings may lead to the improper configuration of LEDs and associated current levels resulting in inconsistent brightness levels and unacceptable levels of THD in the current waveform, in conventional methods. In contrast, configuration of the LEDs and associated current levels based solely upon timing considerations triggered by the onset of LED conduction after the zero crossing of the power signal, as determined from the current control signal, results in stable, repeatable, and superior operation in high noise environments.

FIG. 11A illustrates some embodiments of a method 1100 for reconfiguring a light-emitting diode mesh in response to a voltage signal. The method 1100 includes receiving, by a controller connected to a switching mechanism having a first state connecting a first block of lights in parallel with a second block of lights and a second state connecting the first block of lights in series with the second block of lights, a current control signal generated by a current regulator in response to a current in the first group of lights and second group of lights (1101). The method 1100 includes switching, by the controller, the switching mechanism between the first state and the second state based on the current control signal (1102).

Viewing FIG. 11 in further detail, and by reference to FIGS. 9-10B, the controller 904 receives a current control signal generated by the current regulator 907 in response to the current in the first group of lights 901 and second group of lights 902. The controller 904 may sample the current control signal to gain a representation of the current control signal waveform. In some embodiments, the controller 904 samples the current control signal using an analog to digital converter as described above in reference to FIGS. 6-7C.

Figure 11B:
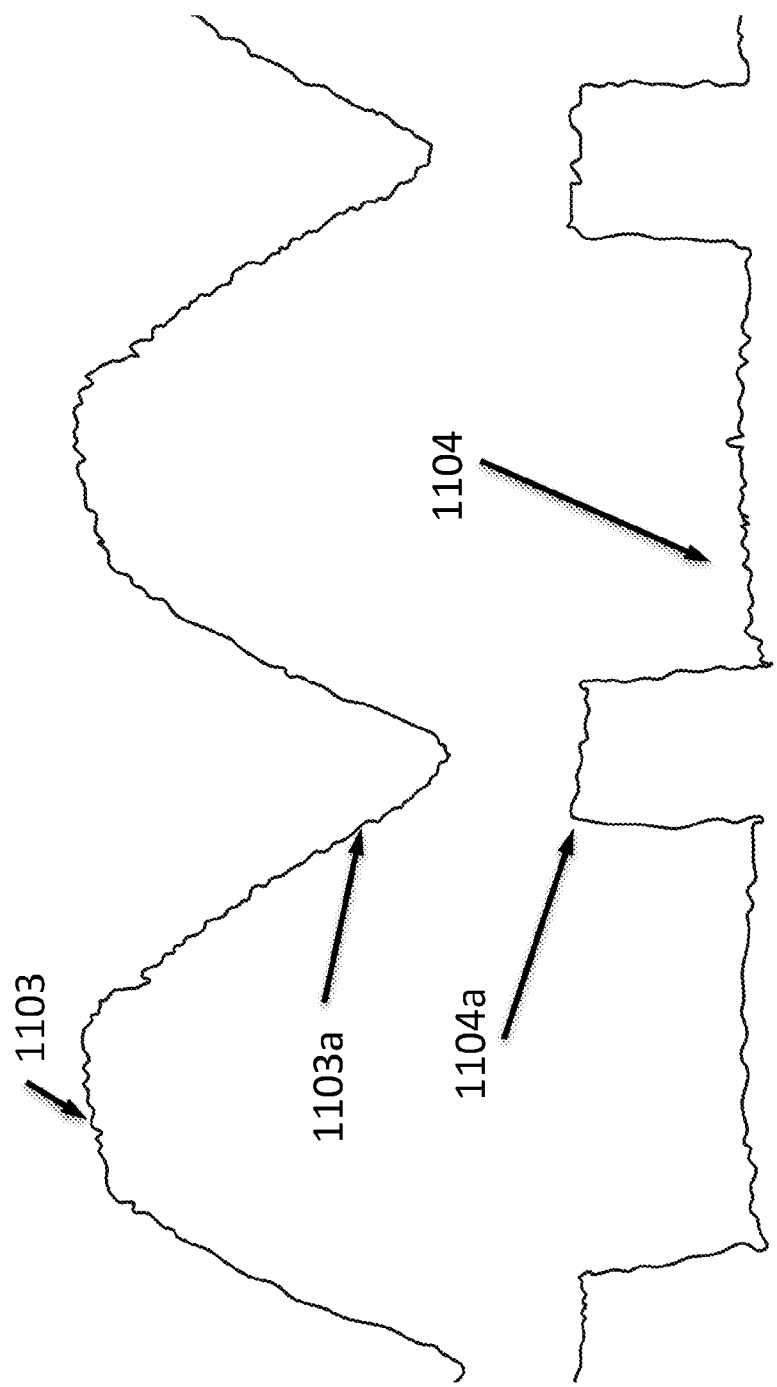
FIG. 11B is a schematic diagram illustrating an embodiment of voltage and current control signal waveforms.

In other embodiments, where the current has a substantially periodic waveform with zero-voltage points, the controller 904 detects when the waveform arrives at a point near the zero-voltage point of the waveform based on the received current control signal; the substantially periodic waveform may be a rectified alternating current waveform. Where the current control signal is generated by the current regulator based on negative feedback based on the current, and the controller 904 may detect a point near the zero-voltage point of the waveform by detecting that the current control signal has reached a maximal level. For instance, as illustrated in FIG. 11B, where the current regulator 907 includes an operational amplifier reading the current through a negative feedback network, where the rectified voltage AC waveform 1103 passes below a certain level 1103a, the first 901 and second 902 light blocks may cease conducting, because the waveform has dropped below the forward operating voltage, so the current falls to zero; as a result, the operational amplifier output 1104 may increase suddenly to the positive rail voltage of the amplifier 1104b. As illustrated, the positive rail voltage of the amplifier may be several times the voltage that the current control signal 1104 has while the current is flowing.

In some embodiments, the controller 904 detects that the current control signal 1104 has reached a maximal level by detecting that a voltage based on the current control signal 1104 is a digital 1 voltage. In some embodiments, where the controller receives the control signal 1104 by way of a Zener diode 1006, the breakdown voltage of the Zener diode shifts the control signal 1104 to range from digital 1 to digital 0; in that case, the controller 904 may receive a digital 1 signal from the control signal 1104 while the current is not flowing, and a lower voltage corresponding to a digital zero signal, when the current begins to flow. The controller 904 may also detect that the current control signal has fallen from the maximal level; the controller 904 may accomplish this by detecting that a voltage based on the current control signal is a digital zero voltage.

The controller 904 switches the switching mechanism 903 between the first state and the second state based on the current control signal. In some embodiments, the controller 904 maintains in the memory of the controller 904 time intervals from a detected transition between digital one and digital zero to times at which the AC waveform likely has a voltage exceeding one or more of the thresholds described above in reference to FIGS. 6A-8. The controller 904 may use a clock or similar timing device to determine when each of the thresholds has been crossed in the positive and negative directions, and cause the switching mechanism 903 to switch between the first and second states; the switching may be implemented as described above in reference to FIGS. 6A-8. Where the circuit 900 includes a second switching mechanism 906 and third block of lights 905, the controller 904 may likewise switch the second switching mechanism 906 between its first and second states as described above in reference to FIGS. 6A-8.

Figure 11C:
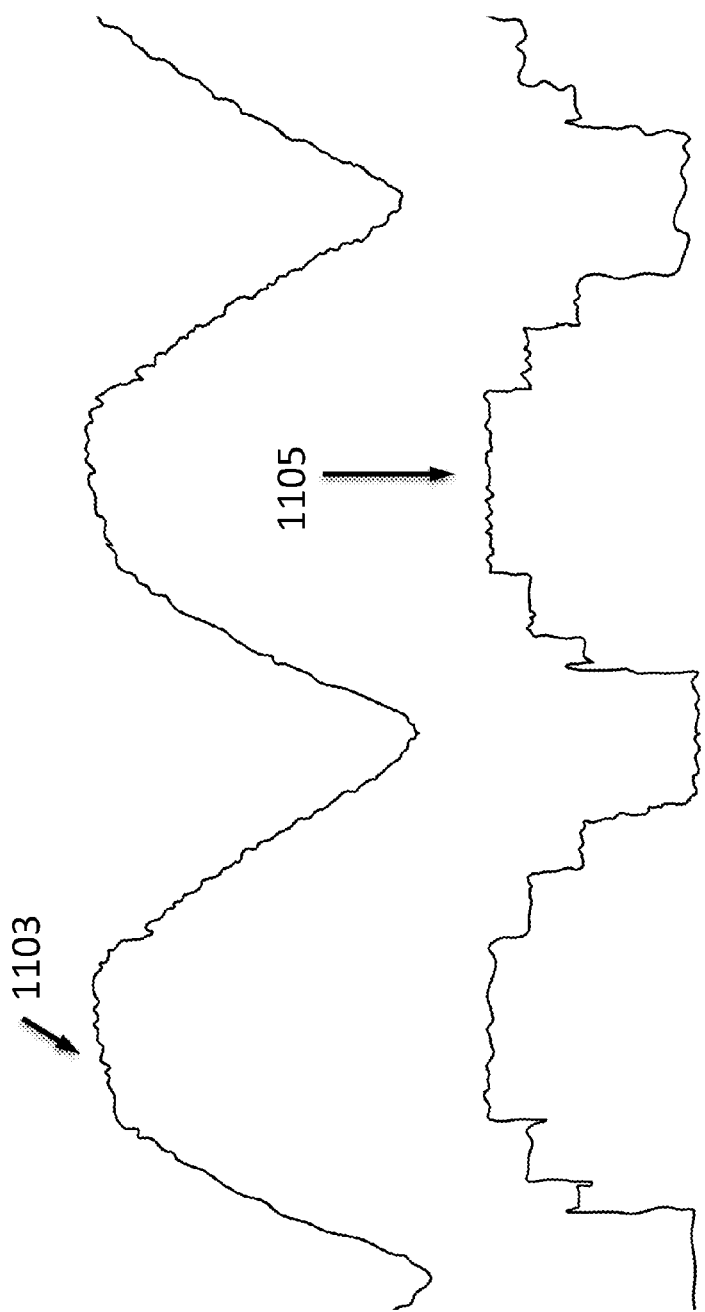
FIG. 11C is a schematic diagram illustrating an embodiment of voltage and stepped current waveforms.

In some embodiments, the controller 904 modifies the current level permitted by the current regulator 907 in response to the waveform crossing one or more thresholds, as determined by time that has passed since a given transition in the detected current control signal, by setting the current level to a percentage of the default setting. The controller 904 may set current levels upon the waveform crossing thresholds as described above in reference to FIGS. 6A-8. FIG. 11C shows an exemplary stepped current waveform 1105 as regulated by the controller 904 and current regulator 907, along with an exemplary corresponding voltage waveform 1103.

In some embodiments, the controller 904 determines the frequency of the AC waveform supplying power to the circuit 900 by measuring the time between like transitions in the current control signal 1104. For instance, in some embodiments, the controller 904 detects that the control signal 1104 has reached a maximal level a first time, detects that the current control signal 1104 has fallen from the maximal level, detects that the current control signal 1104 has reached a maximal level a second time, and measures the time elapsed between the first time and the second time. The controller 904 may match the elapsed time to a number describing a period; for instance, where the elapsed time corresponds to the wavelength of a full-wave rectified signal of 60 hertz, the controller 904 may match the elapsed time to a stored value representing a 60 hertz full-wave rectified signal. The controller 904 may then use a stored, idealized 60 hertz full-wave rectified wave to determine when the AC power signal has exceeded or fallen below thresholds, set current levels, and change the states of the switching mechanisms 903, 906 as described above in reference to FIGS. 6-7C.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An automatically reconfiguring light-emitting circuit, the circuit comprising:
   a first block of electric lights;
   a second block of electric lights;

a switching mechanism, the switching mechanism having (i) a first state in which the switching mechanism electrically connects the first block of electric lights in parallel with the second block of electric lights and (ii) a second state in which the switching mechanism electrically connects the first block of electric lights in series with the second block of electric lights;

a current regulator that generates a current control signal in response to a current in the first group of lights and second group of lights; and a controller electrically connected to the switching mechanism, the controller configured to switch the switching mechanism between the first state and the second state based on the current control signal; wherein the current regulator comprises at least one power transistor through which the current in the first group of lights and second group of lights flows, the at least one power transistor having a control terminal; and the current control signal is a signal at the control terminal of the at least one power transistor.

2. The circuit of claim 1, wherein:

the current regulator further comprises at least one regulator transistor having an output terminal; and the current control signal is a signal generated at the output terminal of the at least one regulator transistor.

3. The circuit of claim 2, wherein the at least one current regulator further comprises at least one operational amplifier incorporating the at least one regulator transistor.

4. The circuit of claim 1, further comprising a negative feedback network supplying negative feedback based on the current to the current regulator.

5. The circuit of claim 1, wherein the current regulator is a current sink.

6. The circuit of claim 5, further comprising a control signal scaler.

7. A method for automatically reconfiguring light-emitting circuit, the method comprising:

receiving, by a controller connected to a switching mechanism having a first state connecting a first block of lights in parallel with a second block of lights and a second state connecting the first block of lights in series with the second block of lights, a current control signal generated by a current regulator in response to a current in the first group of lights and second group of lights; and switching, by the controller, the switching mechanism between the first state and the second state based on the current control signal; wherein the current has a substantially periodic waveform with zero-voltage points, and further comprising detecting, by the controller a zero-voltage point of the waveform based on the received current control signal.

8. The method of claim 7, wherein the substantially periodic waveform is a rectified alternating current waveform.

9. The method of claim 7, wherein the current control signal is generated by the current regulator based on negative feedback based on the current, and wherein detecting the zero-voltage point of the waveform further comprises detecting that the current control signal has reached a maximal level.

10. The method of claim 9, wherein detecting that the current control signal has reached a maximal level further comprises detecting that a voltage based on the current control signal is a digital 1 voltage.

11. The method of claim 9, further comprising detecting that the current control signal has fallen from the maximal level.

12. The method of claim 11, wherein detecting that the current control signal has fallen from the maximal level further comprises detecting that a voltage based on the current control signal is a digital zero voltage.

* * * * *